(12) United States Patent
Lu et al.

(10) Patent No.: US 11,140,037 B2
(45) Date of Patent: *Oct. 5, 2021

(54) COMMUNICATION METHOD, NETWORK DEVICE, AND SYSTEM

(71) Applicant: HUAWEI TECHNOLOGIES CO., LTD., Guangdong (CN)

(72) Inventors: Wei Lu, Shenzhen (CN); Shuigen Yang, Shanghai (CN); Wenqi Sun, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/663,618

(22) Filed: Oct. 25, 2019

(65) Prior Publication Data

US 2020/0059407 A1    Feb. 20, 2020

Related U.S. Application Data

(63) Continuation of application No. PCT/CN2018/083854, filed on Apr. 20, 2018.

(30) Foreign Application Priority Data

Apr. 26, 2017  (CN) .......................... 201710283572.9

(51) Int. Cl.
*H04L 12/24* (2006.01)
(52) U.S. Cl.
CPC ...... *H04L 41/0893* (2013.01); *H04L 41/0631* (2013.01); *H04L 41/0836* (2013.01); *H04L 41/0896* (2013.01); *H04L 41/28* (2013.01)
(58) Field of Classification Search
CPC . H04L 41/28; H04L 41/0631; H04L 41/0836; H04L 41/0893; H04L 41/0896
See application file for complete search history.

(56) References Cited

U.S. PATENT DOCUMENTS

| 10,667,179 | B1* | 5/2020 | Young | .................... H04W 76/12 |
| 2013/0339495 | A1* | 12/2013 | Mower | ............... H04L 41/0803 709/220 |

(Continued)

FOREIGN PATENT DOCUMENTS

| CN | 106550410 A | 3/2017 |
| WO | 2017032280 A1 | 3/2017 |

OTHER PUBLICATIONS

Huawei,"Adding network slicing management related functions",3GPP TSG SA WG5 (Telecom Management} Meeting #111 Bis S5A-170282, Feb. 13-17, 2017,total 2 pages.

(Continued)

*Primary Examiner* — Azizul Choudhury
(74) *Attorney, Agent, or Firm* — Womble Bond Dickinson (US) LLP

(57) ABSTRACT

This application provides a communication method, a network device, and a system. The method includes: receiving, by a first network device that manages a network slice subnet instance, requirement description information of the network slice subnet instance from a second network device that manages a network slice instance, where the requirement description information of the network slice subnet instance is used to indicate a service requirement for the network slice subnet instance, and the network slice instance includes the network slice subnet instance; and creating or configuring, by the first network device, the network slice subnet instance based on configuration information of the network slice subnet instance, where the configuration information of the network slice subnet instance is determined based on the requirement description information of the network slice subnet instance. The communication method in the embodiments of this application can improve management efficiency of a network slice instance.

15 Claims, 23 Drawing Sheets

(56) References Cited

U.S. PATENT DOCUMENTS

| | | | |
|---|---|---|---|
| 2015/0155968 A1* | 6/2015 | Grube | H04L 65/80 |
| | | | 714/776 |
| 2015/0155969 A1* | 6/2015 | Volvovski | H03M 13/29 |
| | | | 714/776 |
| 2016/0353367 A1 | 12/2016 | Vrzic et al. | |
| 2017/0164212 A1* | 6/2017 | Opsenica | H04W 24/02 |
| 2018/0206152 A1 | 7/2018 | Zhang et al. | |

OTHER PUBLICATIONS

Intel,"Add UC on Self-Configuration of NSI",3GPP TSG SA WG5 (Telecom Management) Meeting #112 S5-171552, Mar. 27-31, 2017, Guilin, P. R. China,total 2 pages.

3GPP TR 28.801 V1.0.0 (Mar. 2017),3rd Generation Partnership Project;Technical Specification Group Services and System Aspects;Telecommunication management;Study on management and orchestration of network slicing for next generation network (Release 14),total 52 pages.

S5-171879 Nokia:"Minutes of the breakout session on modelling approach in network slicing", 3GPP TSG SA WG5 (Telecom Management) Meeting #112, Mar. 27-31, 2017, Guilin (China). Total 5 pages.

S5A-170067 Ericsson:"Requirements for network slice subnet management ", 3GPP TSG SA WG5 (Telecom Management) Meeting #111Bis, Feb. 13-17, 2017, Munich (Germany). Total 4 pages.

S5-173050 Orange:"pCR 28.801 Adding notes on constituents of Network Slice and Network Slice Subnet", 3GPP TSG SA WG5 (Telecom Management) Meeting #113,West Palm Beach, Florida (US), May 8-12, 2017. total 4 pages.

S5A-170165 Ericsson,"Use case and requirements for change capacity network slice subnet instance",3GPP TSG SA WG5 (Telecom Management) Meeting #111Bis, Feb. 13-17, 2017, Munich (Germany),total 4 pages.

S5A-170120 Huawei,"Modify use case and requirements for monitoring performance of network slice instance",3GPP TSG SA WG5 (Telecom Management) Meeting #111Bis, Feb. 13-17, 2017, Munich (Germany),total 3 pages.

3GPP TR 28.801 V1.1.0 (Mar. 2017),3rd Generation Partnership Project;Technical Specification Group Services and System Aspects;Telecommunication management;Study on management and orchestration of network slicing for next generation network (Release 14),total 60 pages.

Cisco Systems Inc et al.,"pCR to 28.801 Network slice subnet concept clarification",3GPP TSG SA WG5 (Telecom Management) Meeting #112 S5-171975, Mar. 27-31, 2017, Guilin (China),total 2 pages.

Cisco Systems Inc et al.,"pCR to 28.801 Network slice subnet concept clarification",3GPP TSG SA WG5 (Telecom Management) Meeting #112 S5-171846, Mar. 27-31, 2017, Guilin (China),total 2 pages.

* cited by examiner

COMMUNICATION METHOD, NETWORK DEVICE, AND SYSTEM

CROSS-REFERENCE TO RELATED APPLICATIONS

This application is a continuation of International Application No. PCT/CN2018/083854, filed on Apr. 20, 2018, which claims priority to Chinese Patent Application No. 201710283572.9, filed on Apr. 26, 2017, The disclosures of the aforementioned applications are hereby incorporated by reference in their entireties.

TECHNICAL FIELD

This application relates to the communications field, and more specifically, to a communication method, a network device, and a system.

BACKGROUND

With rapid development of mobile communication, diversified service requirements need to be met in a future mobile communications system, such as enhanced mobile broadband, massive machine type communication, and ultra-reliable and low-latency communication. Therefore, a concept of a network slice is proposed in a next-generation mobile communications system. A network slicing technology logically abstracts a network as one or more network slices, each network slice includes a series of logical network functions, and one network slice may meet a type of connection communication service requirement or a connection communication service requirement in one case. The next-generation mobile communications system may include a large quantity of network slices that meet different connection capabilities.

In a communications network, with the emergence of the network slicing technology, how to manage a network slice simply and efficiently is an urgent problem to be resolved in the industry.

SUMMARY

This application provides a communication method, a network device, and a system, so as to improve network slice instance management efficiency.

According to a first aspect, a communication method is provided, including: receiving, by a first network device that manages a network slice subnet instance, requirement description information of the network slice subnet instance from a second network device that manages a network slice instance, where the requirement description information of the network slice subnet instance is used to indicate a service requirement for the network slice subnet instance, and the network slice instance includes the network slice subnet instance; and creating or configuring, by the first network device, the network slice subnet instance based on configuration information of the network slice subnet instance, where the configuration information of the network slice subnet instance is determined based on the requirement description information of the network slice subnet instance.

In this embodiment of this application, the requirement description information of the network slice subnet instance sent by the second network device that manages the network slice instance only needs to indicate the service requirement for the network slice subnet instance. The first network device that manages the network slice subnet instance may independently determine the configuration information of the network slice subnet instance based on the requirement description information of the network slice subnet instance, and the second network device does not need to directly indicate the configuration information of the network slice subnet instance, thereby implementing hierarchical management of network slice instances, reducing network slice instance management complexity, and improving network slice instance management efficiency.

In one embodiment, the method further includes: sending, by the first network device to a third network device, requirement description information of a nested network slice subnet instance included in the network slice subnet instance, where the third network device is configured to manage the nested network slice subnet instance, and the requirement description information of the nested network slice subnet instance is generated based on the requirement description information of the network slice subnet instance.

In this embodiment of this application, the first network device may determine the requirement description information of the nested network slice subnet instance based on the requirement description information of the network slice subnet instance, and send the requirement description information of the nested network slice subnet instance to the third network device, so as to improve network slice instance management efficiency.

In one embodiment, the method further includes: sending, by the first network device, capability report information to the second network device, where the capability report information is used to indicate a capability of the network slice subnet instance supported by the first network device.

In one embodiment, the capability report information includes at least one of the following: a type of the network slice subnet instance supported by the first network device, a quantity of network slice subnet instances supported by the first network device, a capacity of the network slice subnet instance, a function supported by the network slice subnet instance, and performance of the network slice subnet instance.

In one embodiment, the requirement description information of the network slice subnet instance includes at least one of the following: a service type of the network slice subnet instance, a service performance requirement for the network slice subnet instance, a service coverage area of the network slice subnet instance, a serving time requirement for the network slice subnet instance, a service volume supported by the network slice subnet instance, a service management requirement for the network slice subnet instance, a service security level of the network slice subnet instance, and a service isolation requirement for the network slice subnet instance.

According to a second aspect, a communication method is provided, including: receiving, by a second network device that manages a network slice instance, requirement description information of the network slice instance, where the requirement description information of the network slice instance is used to indicate a service requirement for the network slice instance; and sending, by the second network device, requirement description information of the network slice subnet instance to a first network device that manages the network slice subnet instance, where the requirement description information of the network slice subnet instance is used to indicate a service requirement for the network slice subnet instance, so that the first network device creates or configures the network slice subnet instance, and the requirement description information of the network slice subnet instance is generated based on the requirement description information of the network slice instance.

In this embodiment of this application, the requirement description information of the network slice subnet instance sent by the second network device that manages the network slice instance only needs to indicate the service requirement for the network slice subnet instance, so that the first network device that manages the network slice subnet instance may autonomously determine the configuration information of the network slice subnet instance based on the requirement description information of the network slice subnet instance, and the second network device does not need to directly indicate the configuration information of the network slice subnet instance, thereby implementing hierarchical management of the network slice instance, reducing network slice instance management complexity, and improving network slice instance management efficiency.

In one embodiment, the method further includes: sending, by the second network device to a third network device, requirement description information of a nested network slice subnet instance included in the network slice subnet instance, where the third network device is configured to manage the nested network slice subnet instance, and the requirement description information of the nested network slice subnet instance is determined based on the requirement description information of the network slice subnet instance.

In one embodiment, the method further includes: receiving, by the second network device, capability report information sent by the first network device, where the capability report information is used to indicate a capability of the network slice subnet instance supported by the first network device.

In one embodiment, the capability report information includes at least one of the following: a type of the network slice subnet instance supported by the first network device, a quantity of network slice subnet instances supported by the first network device, a capacity of the network slice subnet instance, a function supported by the network slice subnet instance, and performance of the network slice subnet instance.

In one embodiment, the requirement description information of the network slice subnet instance includes at least one of the following: a service type of the network slice subnet instance, a service performance requirement for the network slice subnet instance, a service coverage area of the network slice subnet instance, a serving time requirement for the network slice subnet instance, a service volume supported by the network slice subnet instance, a service management requirement for the network slice subnet instance, a service security level of the network slice subnet instance, and a service isolation requirement for the network slice subnet instance.

According to a third aspect, a communication method is provided, including: receiving, by a first network device that manages a network slice subnet instance, termination request information for the network slice subnet instance from a second network device that manages a network slice instance, where the termination request information for the network slice subnet instance is used to instruct to terminate the network slice subnet instance, and the network slice instance includes the network slice subnet instance; and when the network function and/or the nested network slice subnet instance need/needs to be terminated, sending, by the first network device, termination request information for the network function and/or the nested network slice subnet instance to a third network device that manages the network function and/or the nested network slice subnet instance, where the termination request information for the network function and/or the nested network slice subnet instance is used to request to terminate the network function and/or the nested network slice subnet instance.

In this embodiment of this application, in a case of terminating a network slice instance, the first network device that manages the network slice subnet instance may determine whether to terminate a network function and/or a nested network slice subnet instance that are/is included in the network slice subnet instance. The second network device that manages the network slice instance does not need to determine whether to terminate the network function and/or the nested network slice subnet instance that are/is included in the network slice subnet instance. Therefore, network slice hierarchical management is implemented, and network slice instance management efficiency is improved.

In one embodiment, the method further includes: determining, by the first network device, whether the network function and/or the nested network slice subnet instance that are/is included in the network slice subnet instance need/needs to be terminated.

In one embodiment, the determining, by the first network device, whether the network function and/or the nested network slice subnet instance that are/is included in the network slice subnet instance need/needs to be terminated includes: when the network function and/or the nested network slice subnet instance are/is a dedicated network function and/or nested network slice subnet instance, determining to terminate the network function and/or the nested network slice subnet instance; when the network function and/or the nested network slice subnet instance are/is a shared network function and/or nested network slice subnet instance, determining that there is no need to terminate the network function and/or the nested network slice subnet instance.

In one embodiment, the determining, by the first network device, whether the network function and/or the nested network slice subnet instance that are/is included in the network slice subnet instance need/needs to be terminated includes: when the network function and/or the nested network slice subnet instance are/is a dedicated network function and/or nested network slice subnet instance, terminating, by the first network device, a correlation relationship between the network slice instance and the network function and/or the nested network slice subnet instance, and reserving functions/a function of the network function and/or the nested network slice subnet instance, so that the network function and/or the nested network slice subnet instance can be provided to another network slice instance for use.

According to a fourth aspect, a communication method is provided, including: receiving, by a second network device that manages a network slice instance, termination request information for the network slice instance, where the termination request information for the network slice instance is used to request to terminate the network slice instance, the network slice instance includes a network slice subnet instance, and the network slice subnet instance includes a nested network slice subnet instance; and when the nested network slice subnet instance needs to be terminated, sending, by the second network device, termination request information for the nested network slice subnet instance to a third network device that manages the nested network slice instance, where the termination request information for the nested network slice subnet instance is used to request to terminate the nested network slice subnet instance.

In this embodiment of this application, in a case of network slice hierarchical management, the second network device that manages the network slice instance may determine whether to terminate the nested network slice subnet instance included in the network slice subnet instance. When the nested network slice subnet instance needs to be terminated, the second network device sends the termination request information for the nested network slice subnet instance to the third network device that manages the nested network slice subnet instance, thereby improving network slice instance management efficiency.

In one embodiment, the method further includes: after receiving the termination request information for the network slice instance, determining, by the second network device, whether the nested network slice subnet instance needs to be terminated.

According to a fifth aspect, a communication method is provided, including: receiving, by a first network device that manages a network slice subnet instance, modification requirement information for the network slice subnet instance from a second network device that manages a network slice instance, where the modification requirement information for the network slice subnet instance is used to indicate a service modification requirement for the network slice subnet instance, and the network slice instance includes the network slice subnet instance; and modifying, by the first network device, target configuration information of the network slice subnet instance based on the modification requirement information.

In this embodiment of this application, the modification requirement information for the network slice subnet instance sent by the second network device that manages the network slice instance only needs to indicate the modification requirement for the network slice subnet instance. The first network device that manages the network slice subnet instance may independently determine, based on the modification requirement information for the network slice subnet instance, the target configuration information of the network slice subnet instance that needs to be modified, and the second network device does not need to directly indicate the configuration information of the network slice subnet instance that needs to be modified, thereby implementing hierarchical management of the network slice instance, reducing network slice instance management complexity, and improving network slice instance management efficiency.

In one embodiment, the modifying, by the first network device, target configuration information of the network slice subnet instance based on the modification requirement information includes: determining, by the first network device based on the modification requirement information for the network slice subnet instance, that the target configuration information of the network slice subnet instance needs to be modified; and modifying, by the first network device, the target configuration information of the network slice subnet instance.

In one embodiment, the first network device determines, based on the modification requirement information for the network slice subnet instance, modification requirement information for a nested network slice subnet instance included in the network slice subnet instance, where the modification requirement information for the nested network slice subnet instance is used to indicate a service modification requirement for the nested network slice subnet instance, and the network slice subnet instance includes the nested network slice subnet instance; and the first network device sends the modification requirement information for the nested network slice subnet instance to the third network device that manages the nested network slice subnet instance.

In one embodiment, the modification requirement information for the network slice subnet instance includes at least one of the following: modification information of a service type of the network slice subnet instance, modification information of a service performance requirement for the network slice subnet instance, modification requirement information for a service coverage area and/or serving time of the network slice subnet instance, modification requirement information for a service volume supported by the network slice instance, modification information of a service management requirement for the network slice subnet instance, modification requirement information for a service security level of the network slice subnet instance, and modification information of a service isolation requirement for the network slice subnet instance.

According to a sixth aspect, a communication method is provided, including: determining, by a second network device that manages a network slice instance, modification requirement information for the network slice instance, where the modification requirement information for the network slice instance is used to indicate a modification requirement for the network slice instance, and the network slice instance includes the network slice subnet instance; and sending, by the second network device, modification requirement information for the network slice subnet instance to a first network device that manages the network slice subnet instance, so that the first network device modifies the network slice subnet instance, where the modification requirement information for the network slice subnet instance is used to indicate a modification requirement for the network slice subnet instance, and the modification requirement information for the network slice subnet instance is determined based on the modification requirement information for the network slice instance.

In this embodiment of this application, the modification requirement information for the network slice subnet instance sent by the second network device that manages the network slice instance only needs to indicate the modification requirement for the network slice subnet instance. The second network device independently generates the modification requirement information for the network slice subnet instance based on the modification requirement information for the network slice instance, and sends the modification requirement information for the network slice subnet instance to the first network device. This implements hierarchical management on the network slice instance, reduces network slice instance management complexity, and improves network slice instance management efficiency.

In one embodiment, the method further includes: sending, by the second network device, modification requirement information for a nested network slice subnet instance to the third network device that manages the nested network slice subnet instance, where the modification requirement information for the nested network slice subnet instance is used to indicate a modification requirement for the nested network slice subnet instance, and the network slice subnet instance includes the nested network slice subnet instance.

In one embodiment, the modification requirement information for the network slice subnet instance includes at least one of the following: modification information of a service type of the network slice subnet instance, modification information of a service performance requirement for the network slice subnet instance, modification requirement information for a service coverage area and/or serving time of the network slice subnet instance, modification requirement information for a service volume supported by the network slice instance, modification information of a service management requirement for the network slice subnet instance, modification requirement information for a service security level of the network slice subnet instance, and modification information of a service isolation requirement for the network slice subnet instance.

According to a seventh aspect, a communication method is provided, including: receiving, by a first network device that manages a network slice subnet instance, status monitoring request information for the network slice subnet instance from a second network device that manages a network slice instance, where the status monitoring request information for the network slice subnet instance is used to instruct to measure and/or monitor performance of the network slice subnet instance, the network slice instance includes the network slice subnet instance, and the network slice subnet instance includes a network function and/or a nested network slice subnet instance; and sending, by the first network device, status monitoring request information for the network function and/or the nested network slice subnet instance to a third network device that manages the network function and/or the nested network slice subnet instance, where the status monitoring request information for the network function and/or the nested network slice subnet instance is used to instruct to measure and/or monitor performance of the network function and/or the nested network slice subnet instance.

In this embodiment of this application, the second network device that manages the network slice instance does not need to monitor performance information of the network function and/or the nested network slice subnet instance that are/is included in the network slice subnet instance, and the first network device that manages the network slice subnet instance autonomously generates the status monitoring information for the network function and/or the nested network slice subnet instance based on the status monitoring request information for the network slice subnet instance, thereby implementing hierarchical management of the network slice instance, reducing network slice instance management complexity, and improving network slice instance management efficiency.

In one embodiment, the method further includes: receiving, by the first network device, status monitoring feedback information that is for the network function and/or the nested network slice subnet instance and that is sent by the third network device, where the status monitoring feedback information for the network function and/or the nested network slice subnet instance is used to indicate a result of measuring and/or monitoring the performance of the network function and/or the nested network slice subnet instance.

In one embodiment, the method further includes: sending, by the first network device, status feedback information for the network slice subnet instance to the second network device, where the status feedback information for the network slice subnet instance is used to indicate a result of measuring and/or monitoring the performance of the network slice subnet instance.

According to an eighth aspect, a communication method is provided, including: receiving, by a second network device that manages a network slice instance, performance subscription request information for the network slice instance, where the performance subscription request information for the network slice instance is used to request to obtain performance information of the network slice instance, and the network slice instance includes the network slice subnet instance; and sending, by the second network device, status monitoring request information for the network slice subnet instance to the first network device that manages the network slice subnet instance, where the status monitoring request information for the network slice subnet instance is used to instruct to measure and/or monitor performance of the network slice subnet instance, and the status monitoring request information for the network slice subnet instance is determined based on the performance subscription request information for the network slice instance.

In this embodiment of this application, the second network device that manages the network slice instance does not need to monitor performance information of a network function and/or a nested network slice subnet instance that are/is included in the network slice subnet instance, and the second network device autonomously generates the status monitoring request information for the network slice subnet instance based on the performance subscription request information for the network slice instance, and sends the status monitoring request information to the first network device that manages the network slice subnet instance, thereby implementing hierarchical management of the network slice instance, reducing network slice instance management complexity, and improving network slice instance management efficiency.

In one embodiment, the network slice subnet instance further includes a nested network slice subnet instance. The method further includes: sending, by the second network device, status monitoring request information for the nested network slice subnet instance to a third network device that manages the nested network slice subnet instance, where the status monitoring request information for the nested network slice subnet instance is used to instruct to measure and/or monitor performance of the nested network slice subnet instance.

In one embodiment, the method further includes: receiving, by the second network device, status monitoring feedback information for the nested network slice subnet instance sent by the third network device, where the status feedback information for the nested network slice subnet instance is used to indicate a result of measuring and/or monitoring the performance of the nested network slice subnet instance.

In one embodiment, the method further includes: receiving, by the second network device, status feedback information for the network slice subnet instance sent by the first network device, where the status feedback information for the network slice subnet instance is used to indicate a result of measuring and/or monitoring the performance of the network slice subnet instance.

According to a ninth aspect, a communication method is provided, including: determining, by a first network device that manages a network slice subnet instance, fault alarm information of a network function and/or a nested network slice subnet instance, where the fault alarm information of the network function and/or the nested network slice subnet instance is used to indicate that the network function and/or the nested network slice subnet instance that are/is included in the network slice subnet instance are/is faulty; and sending, by the first network device, fault alarm information of the network slice subnet instance to the second network device that manages the network slice instance, where the network slice instance includes the network slice subnet instance, and the fault alarm information of the network slice subnet instance is used to indicate that the network slice subnet instance is faulty.

In this embodiment of this application, the second network device that manages the network slice instance does not need to perceive fault information of the network function and/or the nested network slice subnet instance that are/is included in the network slice subnet instance, and after obtaining the fault alarm information of the network function and/or the nested network slice subnet instance, the first network device that manages the network slice subnet instance autonomously generates the fault alarm information of the network slice subnet instance, and sends the fault alarm information to the second network device, thereby implementing hierarchical management of the network slice instance, reducing network slice instance management complexity, and improving network slice instance management efficiency.

In one embodiment, the method further includes: receiving, by the first network device, alarm reporting request information for the network slice subnet instance from the second network device that manages the network slice instance, where the alarm reporting request information for the network slice subnet instance is used to instruct the first network device to report the fault alarm information of the network slice subnet instance.

According to a tenth aspect, a communication method is provided, including: receiving, by a second network device that manages a network slice instance, fault alarm information of a network slice subnet instance sent by a first network device that manages the network slice subnet instance, where the fault alarm information of the network slice subnet instance is used to indicate that the network slice subnet instance is faulty, and the network slice instance includes the network slice subnet instance; and sending, by the second network device, fault alarm information of the network slice instance to a fourth network device, where the fault alarm information of the network slice instance is used to indicate that the network slice instance is faulty.

In this embodiment of this application, the second network device that manages the network slice instance does not need to perceive fault information of the network function and/or the nested network slice subnet instance that are/is included in the network slice subnet instance. After receiving the fault alarm information of the network slice subnet instance sent by the first network device, the second network device autonomously generates the fault alarm information of the network slice subnet instance, and sends the fault alarm information to the fourth network device, thereby implementing hierarchical management of the network slice instance, reducing network slice instance management complexity, and improving network slice instance management efficiency.

In one embodiment, the method further includes: receiving, by the second network device, fault subscription request information for the network slice instance from the fourth network device, where the fault subscription request information for the network slice instance is used to request to obtain the fault alarm information of the network slice instance; and sending, by the second network device, an alarm reporting request information for the network slice subnet instance to the first network device, where the alarm reporting request information for the network slice subnet instance is used to instruct the first network device to report the fault alarm information of the network slice subnet instance.

According to an eleventh aspect, a network device is provided, and is configured to perform the method in any one of the first aspect or the embodiments of the first aspect. Specifically, the network device includes a unit configured to perform the method in any one of the first aspect or the embodiments of the first aspect.

According to a twelfth aspect, another network device is provided, and is configured to perform the method in any one of the second aspect or the embodiments of the second aspect. Specifically, the network device includes a unit configured to perform the method in any one of the second aspect or the embodiments of the second aspect.

According to a thirteenth aspect, another network device is provided, and is configured to perform the method in any one of the third aspect or the embodiments of the third aspect. Specifically, the network device includes a unit configured to perform the method in any one of the third aspect or the embodiments of the third aspect.

According to a fourteenth aspect, another network device is provided, and is configured to perform the method in any one of the fourth aspect or the embodiments of the fourth aspect. Specifically, the network device includes a unit configured to perform the method in any one of the fourth aspect or the embodiments of the fourth aspect.

According to a fifteenth aspect, another network device is provided, and is configured to perform the method in any one of the fifth aspect or the embodiments of the fifth aspect. Specifically, the network device includes a unit configured to perform the method in any one of the fifth aspect or the embodiments of the fifth aspect.

According to a sixteenth aspect, another network device is provided, and is configured to perform the method in any one of the sixth aspect or the embodiments of the sixth aspect. Specifically, the network device includes a unit configured to perform the method in any one of the sixth aspect or the embodiments of the sixth aspect.

According to a seventeenth aspect, another network device is provided, and is configured to perform the method in any one of the seventh aspect or the embodiments of the seventh aspect. Specifically, the network device includes a unit configured to perform the method in any one of the seventh aspect or the embodiments of the seventh aspect.

According to an eighteenth aspect, another network device is provided, and is configured to perform the method in any one of the eighth aspect or the embodiments of the eighth aspect. Specifically, the network device includes a unit configured to perform the method in any one of the eighth aspect or the embodiments of the eighth aspect.

According to a nineteenth aspect, another network device is provided, and is configured to perform the method in any one of the ninth aspect or the embodiments of the ninth aspect. Specifically, the network device includes a unit configured to perform the method in any one of the ninth aspect or the embodiments of the ninth aspect.

According to a twentieth aspect, another network device is provided, and is configured to perform the method in any one of the tenth aspect or the embodiments of the tenth aspect. Specifically, the network device includes a unit configured to perform the method in any one of the tenth aspect or the embodiments of the tenth aspect.

According to a twenty-first aspect, a network system is provided, where the system includes the network devices in the eleventh aspect and the twelfth aspect, or includes the network devices in the thirteenth aspect and the fourteenth aspect, or includes the network devices in the fifteenth aspect and the sixteenth aspect, or includes the network devices in the seventeenth aspect and the eighteenth aspect, or includes the network devices in the nineteenth aspect and the twentieth aspect.

According to a twenty-second aspect, a network device is provided, where the network device includes a communications interface, a memory, a processor, and a bus system. The communications interface, the memory, and the processor are connected by using the bus system. The memory is configured to store an instruction. The processor is configured to execute the instruction stored in the memory, to control the communications interface to receive a signal and/or send a signal. In addition, when the processor executes the instruction stored in the memory, the execution enables the processor to perform the method in any one of the first aspect or the embodiments of the first aspect.

According to a twenty-third aspect, a network device is provided, where the network device includes a communications interface, a memory, a processor, and a bus system. The communications interface, the memory, and the processor are connected by using the bus system. The memory is configured to store an instruction. The processor is configured to execute the instruction stored in the memory, to control the communications interface to receive a signal and/or send a signal. In addition, when the processor executes the instruction stored in the memory, the execution enables the processor to perform the method in any one of the second aspect or the embodiments of the second aspect.

According to a twenty-fourth aspect, a network device is provided, where the network device includes a communications interface, a memory, a processor, and a bus system. The communications interface, the memory, and the processor are connected by using the bus system. The memory is configured to store an instruction. The processor is configured to execute the instruction stored in the memory, to control the communications interface to receive a signal and/or send a signal. In addition, when the processor executes the instruction stored in the memory, the execution enables the processor to perform the method in any one of the third aspect or the embodiments of the third aspect.

According to a twenty-fifth aspect, a network device is provided, where the network device includes a communications interface, a memory, a processor, and a bus system. The communications interface, the memory, and the processor are connected by using the bus system. The memory is configured to store an instruction. The processor is configured to execute the instruction stored in the memory, to control the communications interface to receive a signal and/or send a signal. In addition, when the processor executes the instruction stored in the memory, the execution enables the processor to perform the method in any one of the fourth aspect or the embodiments of the fourth aspect.

According to a twenty-sixth aspect, a network device is provided, where the network device includes a communications interface, a memory, a processor, and a bus system. The communications interface, the memory, and the processor are connected by using the bus system. The memory is configured to store an instruction. The processor is configured to execute the instruction stored in the memory, to control the communications interface to receive a signal and/or send a signal. In addition, when the processor executes the instruction stored in the memory, the execution enables the processor to perform the method in any one of the fifth aspect or the embodiments of the fifth aspect.

According to a twenty-seventh aspect, a network device is provided, where the network device includes a communications interface, a memory, a processor, and a bus system. The communications interface, the memory, and the processor are connected by using the bus system. The memory is configured to store an instruction. The processor is configured to execute the instruction stored in the memory, to control the communications interface to receive a signal and/or send a signal. In addition, when the processor executes the instruction stored in the memory, the execution enables the processor to perform the method in any one of the sixth aspect or the embodiments of the sixth aspect.

According to a twenty-eighth aspect, a network device is provided, where the network device includes a communications interface, a memory, a processor, and a bus system. The communications interface, the memory, and the processor are connected by using the bus system. The memory is configured to store an instruction. The processor is configured to execute the instruction stored in the memory, to control the communications interface to receive a signal and/or send a signal. In addition, when the processor executes the instruction stored in the memory, the execution enables the processor to perform the method in any one of the seventh aspect or the embodiments of the seventh aspect.

According to a twenty-ninth aspect, a network device is provided, where the network device includes a communications interface, a memory, a processor, and a bus system. The communications interface, the memory, and the processor are connected by using the bus system. The memory is configured to store an instruction. The processor is configured to execute the instruction stored in the memory, to control the communications interface to receive a signal and/or send a signal. In addition, when the processor executes the instruction stored in the memory, the execution enables the processor to perform the method in any one of the eighth aspect or the embodiments of the eighth aspect.

According to a thirtieth aspect, a network device is provided, where the network device includes a communications interface, a memory, a processor, and a bus system. The communications interface, the memory, and the processor are connected by using the bus system. The memory is configured to store an instruction. The processor is configured to execute the instruction stored in the memory, to control the communications interface to receive a signal and/or send a signal. In addition, when the processor executes the instruction stored in the memory, the execution enables the processor to perform the method in any one of the ninth aspect or the embodiments of the ninth aspect.

According to a thirty-first aspect, a network device is provided, where the network device includes a communications interface, a memory, a processor, and a bus system. The communications interface, the memory, and the processor are connected by using the bus system. The memory is configured to store an instruction. The processor is configured to execute the instruction stored in the memory, to control the communications interface to receive a signal and/or send a signal. In addition, when the processor executes the instruction stored in the memory, the execution enables the processor to perform the method in any one of the tenth aspect or the embodiments of the tenth aspect.

According to a thirty-second aspect, a network system is provided, where the system includes the network devices in the twenty-second aspect and the twenty-third aspect, or includes the network devices in the twenty-fourth aspect and the twenty-fifth aspect, or includes the network devices in the twenty-sixth aspect and the twenty-seventh aspect, or includes the network devices in the twenty-eighth aspect and the twenty-ninth aspect, or includes the network devices in the thirtieth aspect and the thirty-first aspect.

According to a thirty-third aspect, a computer readable medium is provided, and is configured to store a computer program, where the computer program includes an instruction used to perform the method in any one of the first aspect or the embodiments of the first aspect.

According to a thirty-fourth aspect, a computer readable medium is provided, and is configured to store a computer program, where the computer program includes an instruction used to perform the method in any one of the second aspect or the embodiments of the second aspect.

According to a thirty-fifth aspect, a computer readable medium is provided, and is configured to store a computer program, where the computer program includes an instruction used to perform the method in any one of the third aspect or the embodiments of the third aspect.

According to a thirty-sixth aspect, a computer readable medium is provided, and is configured to store a computer program, where the computer program includes an instruction used to perform the method in any one of the fourth aspect or the embodiments of the fourth aspect.

According to a thirty-seventh aspect, a computer readable medium is provided, and is configured to store a computer program, where the computer program includes an instruction used to perform the method in any one of the fifth aspect or the embodiments of the fifth aspect.

According to a thirty-eighth aspect, a computer readable medium is provided, and is configured to store a computer program, where the computer program includes an instruction used to perform the method in any one of the sixth aspect or the embodiments of the sixth aspect.

According to a thirty-ninth aspect, a computer readable medium is provided, and is configured to store a computer program, where the computer program includes an instruction used to perform the method in any one of the seventh aspect or the embodiments of the seventh aspect.

According to a fortieth aspect, a computer readable medium is provided, and is configured to store a computer program, where the computer program includes an instruction used to perform the method in any one of the eighth aspect or the embodiments of the eighth aspect.

According to a forty-first aspect, a computer readable medium is provided, and is configured to store a computer program, where the computer program includes an instruction used to perform the method in any one of the ninth aspect or the embodiments of the ninth aspect.

According to a forty-second aspect, a computer readable medium is provided, and is configured to store a computer program, where the computer program includes an instruction used to perform the method in any one of the tenth aspect or the embodiments of the tenth aspect.

DESCRIPTION OF EMBODIMENTS

Figure 1:
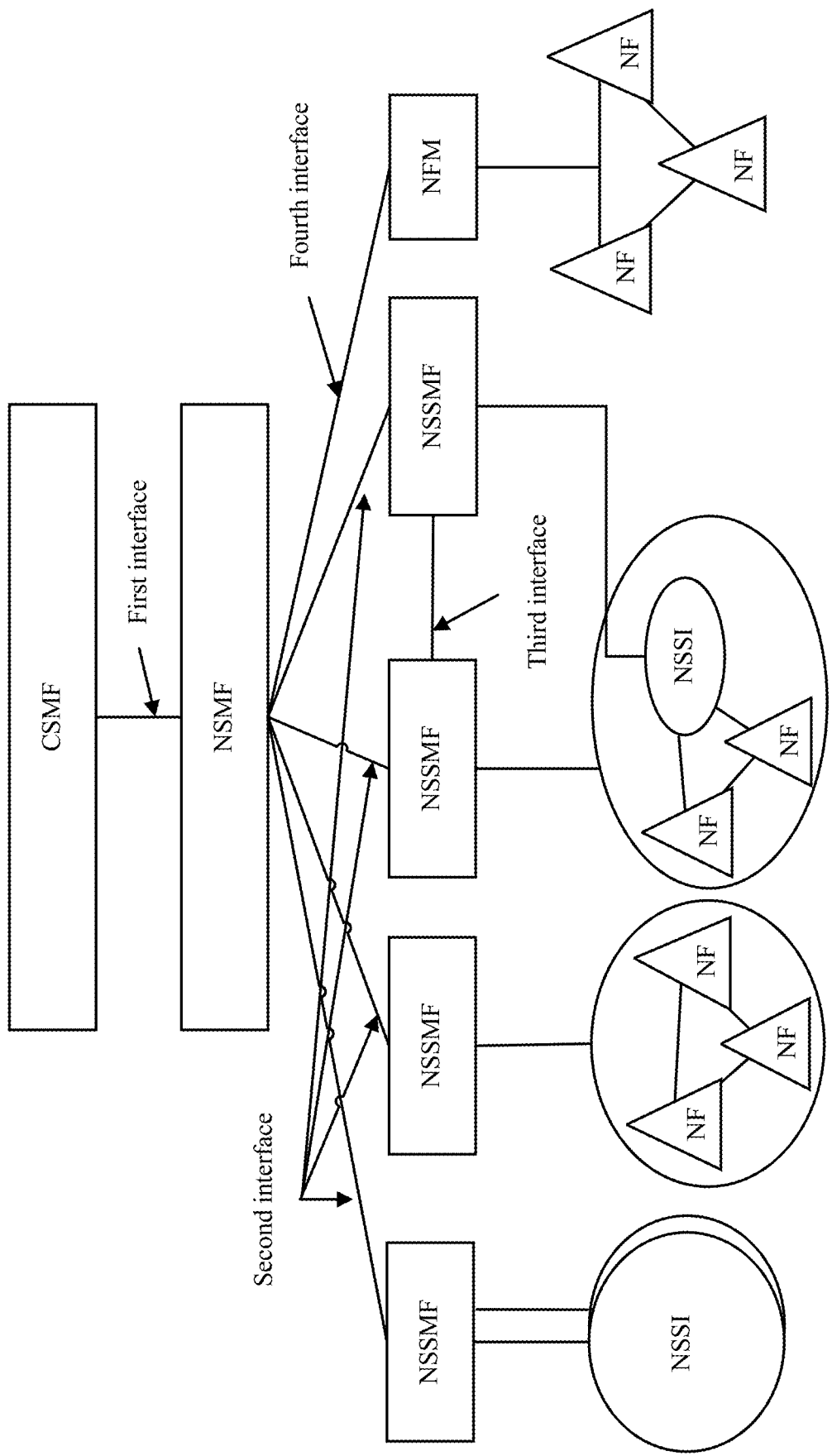
FIG. 1 is a schematic diagram of a network management system according to an embodiment of this application.

The following describes technical solutions of this application with reference to accompanying drawings.

Before the communication method, the apparatus, and the system in this application are described, to facilitate understanding of the content of this application, some terms and a network slice management system in this specification are first described.

A network slice is a logical network that has a different network capability and network feature and that is customized based on a different service requirement on a physical or virtual network infrastructure. The network slice may be a complete end-to-end network that includes a terminal, an access network, a transmission network, a core network, and an application server, can provide a telecommunications service, and has a specific network capability. The network slice may also be any combination of the foregoing terminal, access network, transmission network, core network, and application server, for example, the network slice includes only the access network and the core network. The network slice may have one or more of the following characteristics: The access network may be sliced, or may not be sliced. The access network may be shared by a plurality of network slices. Different network slices have different characteristics and different network functions that are included in the different network slices.

Network slice subnet: A network slice subnet is a logical network that is configured by combining a plurality of network functions and corresponding network resources, and the network slice subnet can provide a network service. The network slice subnet is an integral part of the network slice.

A network slice instance (NSI) is an actual deployed logical network that can meet a specific network characteristic or service requirement. One network slice instance may provide one or more services. The network slice instance may be created by a network management system. One network management system may create a plurality of network slice instances and manage the plurality of network slice instances at the same time, including performance monitoring, fault management, and the like in a running process of the network slice instances. When a plurality of network slice instances coexist, the network slice instances may share some network resources and network functions. The network slice instance may be created from a network slice template, or may not be created from a network slice template. A network slice instance may provide a complete end-to-end network service, and the network slice instance may be formed by a network slice subnet instance (NSSI) and/or a network function. The network function may include a physical network function and/or a virtual network function. The physical network function and/or the virtual network function are/is collectively referred to as a network function in the following.

Network slice subnet instance: The network slice subnet instance may not need to provide a complete end-to-end network service. The network slice subnet instance may be a set of network functions of a same device vendor in a network slice instance, or may be a set of network functions divided according to domains, such as a core-network network slice subnet instance, an access-network network slice subnet instance, or a set formed in another manner. A network slice subnet instance may be shared by a plurality of network slice instances. The network slice subnet instance is proposed to facilitate management by a network management system. One network slice instance may include a plurality of network slice subnet instances, and each network slice subnet instance includes a plurality of network functions and/or a plurality of network slice subnet instances. One network slice instance may include a plurality of network slice subnet instances and network functions that are not grouped into network slice subnet instances. One network slice instance may alternatively include only a plurality of network functions.

A network function (NF) is a processing function in a network, and defines a functional behavior and an interface. The network function may be implemented by using dedicated hardware, or may be implemented by running software on dedicated hardware, or may be implemented in a form of a virtual function on a common hardware platform. Therefore, from a perspective of implementation, network functions may be classified into a physical network function and a virtual network function. From a perspective of use, network functions may be classified into a dedicated network function and a shared network function. Specifically, a plurality of (sub) network slice instances may independently use different network functions, which are referred to as dedicated network functions, or may share a same network function, which is referred to as a shared network function.

A customer service management function (CSMF) module is responsible for converting a telecommunications service requirement of an operator and/or a third-party customer into a requirement for a network slice, sending the requirement for the network slice to an NSMF, receiving a subscription requirement of the operator and/or the third-party customer for network slice management data (for example, performance data, fault data, and fault repair data), and obtaining management data and the like of the network slice from the NSMF.

The network slice management function (NSMF) module is responsible for receiving a network slice requirement sent by a CSMF, managing a lifecycle, performance, a fault, and the like of a network slice instance (lifecycle, performance, and fault management is referred to as management in the following), orchestrating a composition of the network slice instance, decomposing a requirement for the network slice instance into requirements for network slice subnet instances, sending a network slice subnet instance management request to each NSSMF, and sending a network function management request to an NFM.

The network slice subnet management function (NSSMF) module receives a requirement for a network slice subnet instance from the NSMF, so as to manage a lifecycle, performance, a fault, and the like of the network slice subnet instance (lifecycle, performance, and fault management is referred to as management in the following), and orchestrate a composition of a network slice instance.

The network function management (NFM) module is configured to manage an NF, for example, manage a lifecycle of the NF, and allocate a network resource to the NF.

A network slice repository (NS repository) is a database that records at least one piece of the following content: network slice instance configuration information, including network slice subnet instance configuration information and network function configuration information, fault information, a self-repair action, a repair result, and the like. The NS repository may be independent of the NSMF, or may be disposed in the same network device as the NSMF.

FIG. 1 is a schematic diagram of a network management system 10 according to an embodiment of this application. Functions and interfaces of the modules in FIG. 1 are described as follows:

A customer service management function (CSMF) module is responsible for converting a telecommunications service requirement of an operator and/or a third-party customer into a requirement for a network slice, sending the requirement for the network slice to an NSMF, receiving a subscription requirement of the operator and/or the third-party customer for network slice management data (for example, performance data, fault data, and fault repair data), and obtaining management data and the like of the network slice from the NSMF.

A network slice management function (NSMF) module is responsible for receiving a network slice requirement sent by a CSMF, managing a lifecycle, performance, a fault, and the like of a network slice instance (lifecycle, performance, and fault management is referred to as management in the following), orchestrating a composition of the network slice instance, decomposing a requirement for the network slice instance into requirements for network slice subnet instances, sending a network slice subnet instance management request to each NSSMF, and sending a network function management request to an NFM.

The network slice subnet management function (NSSMF) module receives a requirement for a network slice subnet instance from the NSMF, so as to manage a lifecycle, performance, a fault, and the like of the network slice subnet instance (lifecycle, performance, and fault management is referred to as management in the following), and orchestrate a composition of a network slice instance.

The network function management (NFM) module is configured to manage an NF, is a logical entity, may exist independently of the NF, may be located in the NF, or is located in another functional module, and is configured to implement management on the NF, for example, manage a lifecycle of the NF, configure a function parameter of the NF, and allocate a network resource to the NF.

The network management system 10 in FIG. 1 further includes at least one of the following interfaces:

A first interface is an interface between the CSMF and the NSMF, is used by the CSMF to send a requirement of a service for a network slice to the NSMF, and is used by the NSMF to feed back a running status of an NSI and a running status of the service and provide specific management data to the CSMF.

A second interface is an interface between the NSMF and an NSSMF. When managing and orchestrating an NSI, the NSMF transmits, to the NSSMF through the interface, a requirement for an NSSI, for example, creating, modifying, and stopping obtaining management data. The NSSMF feeds back information about the NSSI to the NSMF through the interface.

A third interface is an interface between NSSMFs, is used for mutual coordination between the NSSMFs. An NSSMF requests, through this interface, another NSSMF to manage an NSSI under control of the another NSSMF, including lifecycle management, performance management, fault management, and the like.

A fourth interface is an interface between the NSMF and an NFM, is an interface between the NSMF and an NS repository, and is used by the NSMF to record and read data in the NS repository.

It should be noted that an NSSI is allowed to be nested, that is, one NSSI includes another NSSI, both of which have respective NSSMFs or both are managed by a same NSSMF. If each of the two NSSFs has a respective NSSMF, and it is assumed that an NSI includes a first NSSI, the first NSSI includes a second NSSI, and a first NSSMF and a second NSSMF are respectively managers of the first NSSI and the second NSSI, there are two options for management of the second NSSI: Option 1 is that the first NSSMF sends a request for managing the second NSSI to the second NSSMF, where this option is applicable to a scenario in which a third interface exists between the first NSSMF and the second NSSMF; and option 2 is that the NSMF directly sends a request for managing the second NSSI to the second NSSMF. If the two NSSFs are managed by a same NSSMF, and it is assumed that an NSI includes a first NSSI, and the first NSSI includes a second NSSI, a manner for managing the second NSSI is the same as a manner for managing the first NSSI.

In addition, the NS repository may be a separate entity independent of the NSMF, or may be a database inside the NSMF.

It should be understood that a network slice instance is created by a network management system. One network management system may create a plurality of network slice instances and manage the plurality of network slice instances at the same time, including performance monitoring, fault management, and the like in a running process of the network slice instances. A complete network slice instance can provide a specific network service, for example, provide a complete end-to-end network service. A network slice instance may include a network slice subnet instance and/or a network function.

Figure 2:
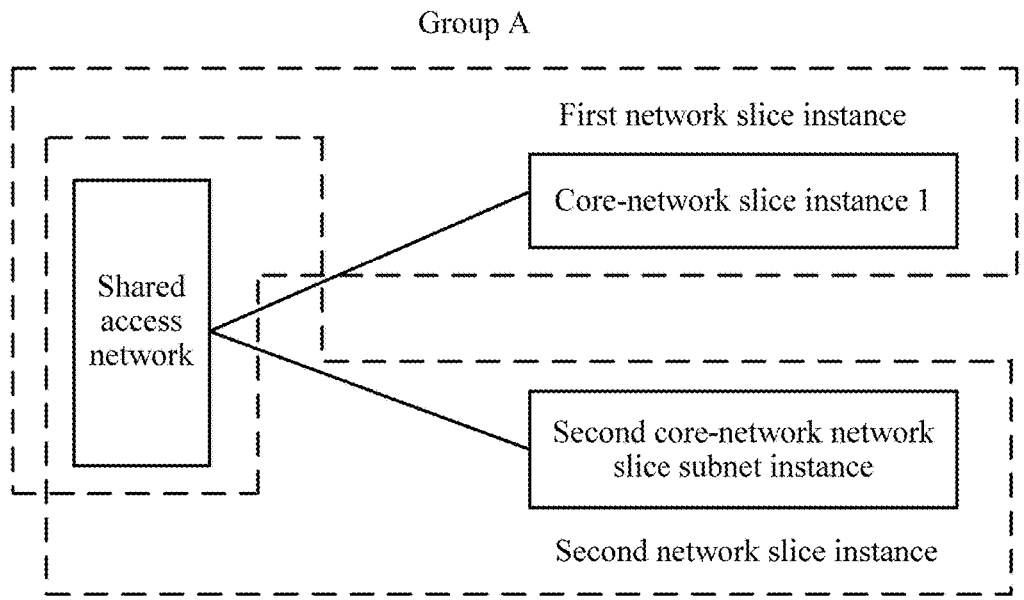
FIG. 2 is a schematic diagram of a network management system according to another embodiment of this application.
Figure 3:
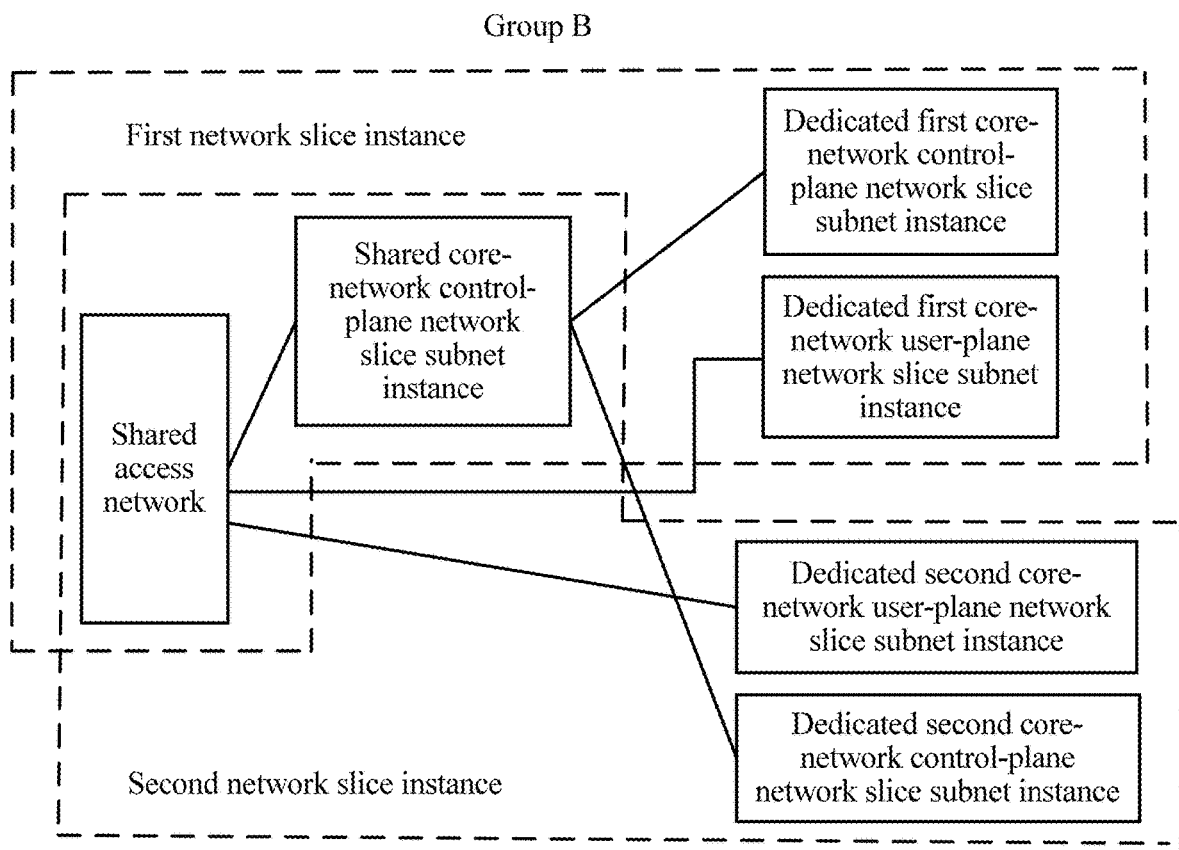
FIG. 3 is a schematic diagram of a network management system according to another embodiment of this application.

When a plurality of network slice instances coexist, the network slice instances may be completely isolated, or may share some network resources and network slice subnet instances/network functions. For coexistence of a plurality of network slice instances, two application scenarios are provided: Group A and Group B. FIG. 2 and FIG. 3 are respectively schematic diagrams of the foregoing two application scenarios.

FIG. 2 is a schematic structural block diagram of network slice instances according to an embodiment of this application. In FIG. 2, a first network slice instance and a second slice instance share a radio access network (RAN). The first network slice instance includes the radio access network and a first core-network network slice subnet instance. The second network slice instance includes the radio access network and a second core-network network slice subnet instance. The first core-network slice instance and the second core-network slice instance are logically completely isolated.

FIG. 3 is a schematic structural block diagram of network slice instances according to another embodiment of this application. In FIG. 3, a first network slice instance and a second network slice instance share a radio access network and a core-network control-plane network slice subnet instance (or may be a core-network control-plane network function), and each network slice instance further includes a dedicated core-network control-plane subnetwork slice instance (or may be a dedicated core-network control-plane network function (slice-specific CP NF)) and a dedicated core-network user-plane subnetwork slice instance (or may be a dedicated core-network user-plane network function (slice-specific UP NF)). The first network slice instance includes the shared radio access network, the shared core-network control-plane network slice subnet instance, a dedicated first core-network control-plane network slice subnet instance, and a dedicated first core-network user-plane network slice subnet instance. The second network slice instance includes the shared radio access network, the shared core-network control-plane network slice subnet instance, a dedicated second core-network control-plane network slice subnet instance, and a dedicated second core-network user-plane network slice subnet instance.

In an example, the foregoing radio access network may also be implemented in a network slice manner. A radio access network of a network slice instance may include network subnet slice instances and/or network functions of the access network that are completely isolated logically, or a radio access network of a network slice instance may include network slice subnet instances and/or network functions that partially share with each other.

In addition, it should be noted that the foregoing introduced functional modules and units are considered from a perspective of functions of the functional modules and units. In one embodiment, the foregoing functional modules may be separate physical modules, or two or more devices may be integrated into one unit. Various equivalent modifications or replacements readily figured out by a person of ordinary skill in the art within the technical scope disclosed in this application shall fall within the protection scope of this application.

The foregoing describes the network management system in the embodiments of this application. The following describes the communication method, the apparatus, and the system in the embodiments of this application with reference to the accompanying drawings.

Figure 4:
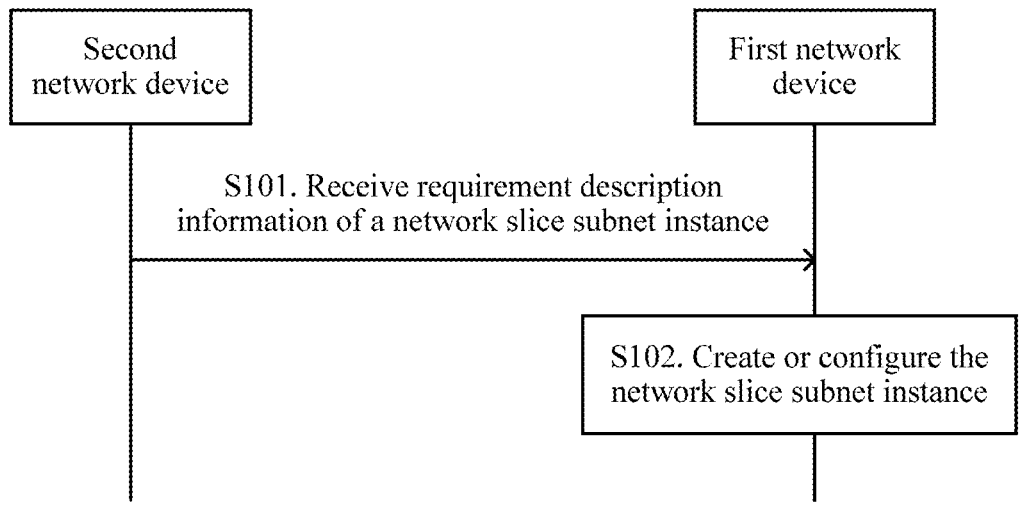
FIG. 4 is a schematic diagram of a communication method according to an embodiment of this application.

FIG. 4 is a schematic flowchart of a communication method 100 according to an embodiment of this application. The method 100 describes a method for creating or configuring a network slice instance. The method 100 is applicable to the network management system 10 shown in FIG. 1. The method 100 may be performed by a first network device. The first network device in the method 100 may include an NSSMF module in the network management system 10. A second network device in the method 100 may include the NSMF module in the network architecture 100. A third network device in the method 100 may include an NSSMF module in the network management system 10.

As shown in FIG. 4, the method 100 includes the following operations.

S101. The first network device that manages a network slice subnet instance receives requirement description information of the network slice subnet instance from the second network device that manages a network slice instance, where the requirement description information of the network slice subnet instance is used to indicate a service requirement for the network slice subnet instance, and the network slice instance includes the network slice subnet instance.

In one embodiment, the requirement description information of the network slice instance may include the service requirement for the network slice subnet instance, and does not need to carry specific configuration information. A specific management function of the second network device is transferred down to the first network device, so as to efficiently manage network slice instances in a centralized manner.

In one embodiment, the second network device may decompose the requirement description information of the network slice subnet instance into requirement description information of at least one network slice subnet instance based on the requirement description information of the network slice subnet instance, and send the requirement description information of the network slice subnet instance to the first network device.

In an example, the requirement description information of the network slice subnet instance includes at least one of the following: a service type of the network slice subnet instance, a service performance requirement for the network slice subnet instance, a service coverage area of the network slice subnet instance, a serving time requirement for the network slice subnet instance, a service volume supported by the network slice subnet instance, a service management requirement for the network slice subnet instance, a service security level of the network slice subnet instance, and a service isolation requirement for the network slice subnet instance.

In a specific example, the service type of the network slice subnet instance may include at least one of the following: a massive Internet of Things (MIoT) type, an ultra-reliable and low-latency (URLLC) type or an enhanced mobile broadband (eMBB) type, a high-definition video service, an industrial Internet of Things service, a home Internet of Things service, a virtual reality (VR) service, a fixed wireless access service, a voice over Internet protocol (VoIP) service, a web browsing service, a meter reading service, or another specific service type.

In a specific example, the performance requirement for the network slice subnet instance may include a performance requirement that needs to be met by the network slice subnet instance, for example, a minimum/maximum uplink/downlink rate, a tolerable end-to-end latency, a jitter, a packet loss rate, and rate support for different moving speeds.

In a specific example, the service coverage area of the network slice subnet instance may be a geographical area that needs to be covered by the network slice subnet instance.

In a specific example, the serving time requirement of a service of the network slice subnet instance may be a start time at which the network slice subnet instance is in an active state and can provide a service.

In a specific example, the service volume supported by the network slice subnet instance may include a quantity of terminal devices supported by the network slice subnet instance, a quantity of supported PDU sessions, a total supported throughput, and the like.

In a specific example, the service management requirement for the network slice subnet instance may include performance and fault parameters that the network slice subnet instance needs to monitor, measure, and report, a monitoring and measurement method, and the like.

In a specific example, the service security level of the network slice subnet instance may include different security requirements for a payment service, a call service, and a file transmission service.

In a specific example, the service isolation requirement for the network slice subnet instance may include whether a service needs a completely isolated network slice instance, that is, the service does not share the network slice instance with another service. Alternatively, it may be understood as whether a shareable attribute is set for an NSSI, for example, the NSSMF may reject a request for sharing the NSSI by another NSI.

In one embodiment, the requirement description information of the network slice subnet instance may further include creation or reuse instruction information. The creation or reuse instruction information may be used to instruct the first network device to create a new NSSI or reuse an existing NSSI based on a requirement. If this type of instruction information is not included, the NSSMF may determine to create a new NSSI or reuse an NSSI according to a specific situation.

In one embodiment, the requirement description information of the network slice subnet instance may further include a technical feature related to a specific service provided by the network slice instance. For example, the technical feature is applicable to only an individual NSSI, and may be, for example, a key frame that needs to be protected for a video service, an uplink/downlink codec manner that is brought by an energy saving requirement of an IoT service, and other possible requirements such as a signal-to-noise ratio threshold, a location update period, a power control parameter, a spectrum, and a bit error rate.

S102. The first network device creates or configures the network slice subnet instance based on configuration information of the network slice subnet instance, where the configuration information of the network slice subnet instance is determined based on the requirement description information of the network slice subnet instance.

In one embodiment, the first network device may recreate a new network slice subnet instance based on the configuration information of the network slice subnet instance. Alternatively, the first network device may configure the network slice subnet instance based on the configuration information of the network slice subnet instance, so as to meet the service requirement for the network slice subnet instance.

In this embodiment of this application, the requirement description information of the network slice subnet instance sent by the second network device that manages the network slice instance only needs to indicate the service requirement for the network slice subnet instance. The first network device that manages the network slice subnet instance may autonomously determine the configuration information of the network slice subnet instance based on the requirement description information of the network slice subnet instance, and the second network device does not need to directly indicate the configuration information of the network slice subnet instance, thereby implementing hierarchical management of the network slice instance, reducing network slice instance management complexity, and improving network slice instance management efficiency.

In one embodiment, the method 100 further includes: sending, by the first network device to a third network device, requirement description information of a nested network slice subnet instance included in the network slice subnet instance, where the third network device is configured to manage the nested network slice subnet instance, and the requirement description information of the nested network slice subnet instance is generated based on the requirement description information of the network slice subnet instance.

In this embodiment of this application, the first network device may determine the requirement description information of the nested network slice subnet instance based on the requirement description information of the network slice subnet instance, and send the requirement description information of the nested network slice subnet instance to the third network device, so as to improve network slice instance management efficiency.

In one embodiment, the method 100 further includes: sending, by the first network device, capability report information to the second network device, where the capability report information is used to indicate a capability of the network slice subnet instance supported by the first network device.

In this embodiment of this application, because the network management system uses a hierarchical management mode, the second network device cannot directly obtain all resources in a network and occupation status thereof. Therefore, before the second network device orchestrates the network slice instance (for example, determines NSSIs included in the NSI, and a function and performance implemented by each NSSI), the second network device needs to let the first network device report the capability of the network slice subnet instance managed by the first network device. For example, the capability may include a quantity of NSSIs supported by the first network device, a function supported by the NSSI, a capacity of the NSSI, and performance of the NSSI. Therefore, network slice instance management efficiency is improved.

In an example, the capability report information includes at least one of the following: a type of the network slice subnet instance supported by the first network device, a quantity of network slice subnet instances supported by the first network device, a capacity of the network slice subnet instance, a function supported by the network slice subnet instance, and performance of the network slice subnet instance.

Figure 5:
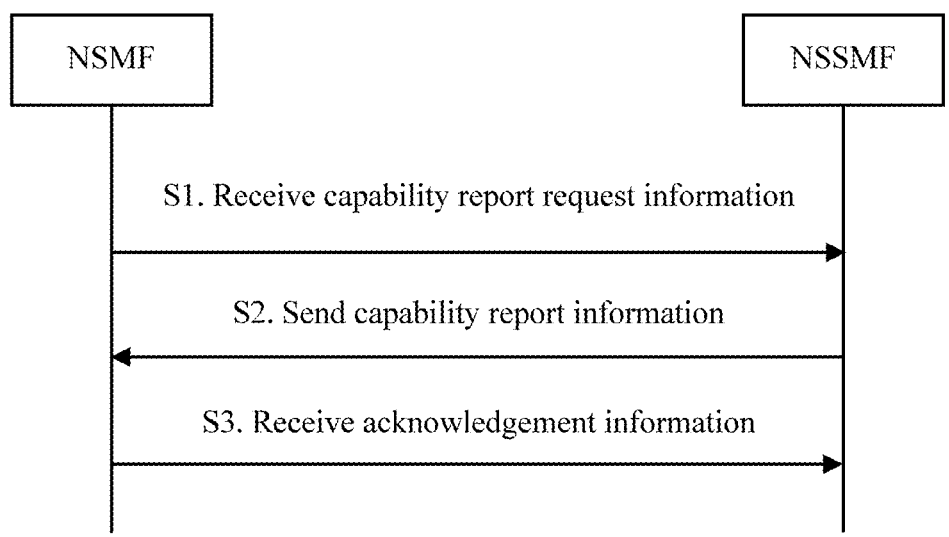
FIG. 5 is a schematic diagram of a communication method according to another embodiment of this application.

In a specific example, FIG. 5 is a schematic flowchart of a method for sending capability report information according to an embodiment of this application. As shown in FIG. 5, the first network device may include an NSSMF module in the network management system 10, the second network device may include the NSMF module in the network management system 10, and the method may include the following operations.

S1. The NSMF sends capability report request information to the NSSMF through a second interface.

The capability report request information may include at least one of the following: a synchronization/asynchronous capability reporting identifier (synchronous capability reporting means that reporting is performed immediately after the NSSMF receives the request, and asynchronous reporting means that reporting is triggered by an event after the NSSMF receives the request, where the triggering event may include expiration of a reporting period, creation of an NSSI, modification of an NSSI, or an NSSI fault), asynchronous reporting trigger condition (this condition is null when the synchronous reporting mode is used), a filter (this filter is used by the NSSMF to determine which capabilities need to be reported; the filter can set filter conditions for one or more capabilities reported by the NSSMF; or the filter may set no filter conditions, and in this case, the NSSMF reports all capabilities).

S2. The NSSMF sends capability report information to the NSMF.

If the request proposed by the NSMF in S1 is a synchronous reporting request, after receiving the capability report request, the NSSMF may report the capability to the NSMF through the second interface. If the request proposed by the NSMF in S1 is an asynchronous reporting request, after receiving the capability report request, the NSSMF may report the capability report information to the NSMF through the second interface after the triggering event occurs. The capability report information may be sent in a form of notification. A filtering condition on which content of the capability report information is based may include at least one of the following: all network functions that can be provided by a subnetwork managed by the NSSMF, such as a mobility management function, a charging function, an encryption function, a session management function, and an authentication function, and degrees of supporting these functions (such as high/medium/low mobility, and several types of authentication); network functions that can be currently provided by the subnetwork managed by the NSSMF; a maximum capacity of the subnetwork managed by the NSSMF, for example, a maximum quantity of users that can be simultaneously supported in handover by the mobility management function, and a maximum quantity of packet data unit (PDU) sessions that can be supported by the session management function; a capacity currently supported by the subnetwork managed by the NSSMF; performance that can be provided by the subnetwork managed by the NSSMF, for example, SLA indicators such as a latency, a bandwidth, a throughput, and a packet loss rate, and a supported security level; performance that can be currently provided by the subnetwork managed by the NSSMF (because the subnetwork of the NSSMF may have instantiated some NSSIs and occupied network resources, a capability of the current subnetwork is different from an entire capability of the subnetwork).

S3. After receiving the capability report information reported by the NSSMF, the NSMF sends an acknowledgment notification to the NSSMF through the second interface.

Figure 6:
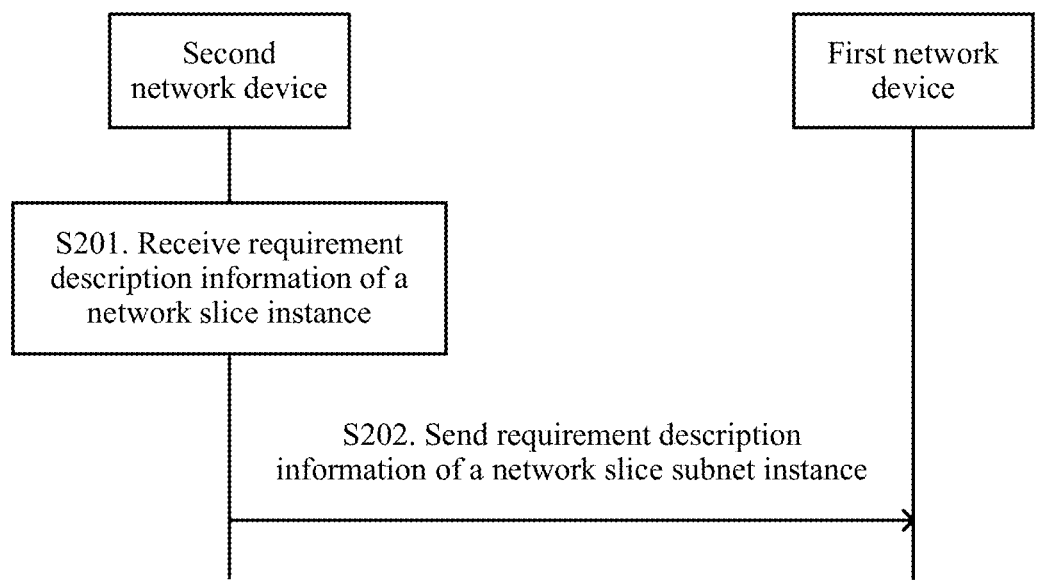
FIG. 6 is a schematic diagram of a communication method according to another embodiment of this application.

FIG. 6 is a schematic flowchart of a communication method 200 according to an embodiment of this application. The method 200 describes a method for creating or configuring a network slice instance. The method 200 is applicable to the network management system 10 shown in FIG. 1. The method 200 may be performed by a second network device. For brevity, content in the method 200 that is the same as or similar to that in the foregoing description is not described herein again. A first network device in the method 200 may include an NSSMF module in the network management system 10. The second network device in the method 200 may include the NSMF module in the network architecture 100. A third network device in the method 200 may include an NSSMF module in the network management system 10. The method 200 includes the following operations.

S201. The second network device that manages a network slice instance receives requirement description information of the network slice instance, where the requirement description information of the network slice instance is used to indicate a service requirement for the network slice instance.

In one embodiment, the requirement description information of the network slice instance includes at least one of the following: a service type of the network slice instance, a service performance requirement for the network slice instance, a service coverage area of the network slice instance, a serving time requirement for the network slice instance, a service volume supported by the network slice instance, a service management requirement for the network slice instance, a service security level of the network slice instance, and a service isolation requirement for the network slice instance.

In a specific example, the service type of the network slice instance may include a video service, a meter reading service, a VoIP service, a web service, an Internet of Vehicles service, or the like.

In a specific example, the performance requirement for the network slice instance may include a minimum bandwidth required by a service, a tolerable end-to-end latency, a jitter, a packet loss rate, time required for initial access, an inter-cell handover success rate, and the like.

In a specific example, the service coverage area of the network slice instance may be a geographical area that needs to be covered by the network slice instance.

In a specific example, the serving time requirement of a service of the network slice instance may be a start time at which the network slice instance is in an active state and can provide a service.

In a specific example, the service volume supported by the network slice instance may include a quantity of supported terminal devices, a quantity of supported PDU sessions, and the like.

In a specific example, the service management requirement for the network slice instance may include performance and fault parameters that need to be monitored to manage a service running status, a specific stipulated configuration parameter, and a parameter monitoring or reporting period.

In a specific example, the service security level of the network slice instance may include different security requirements for a payment service, a call service, and a file transmission service.

In a specific example, the service isolation requirement for the network slice instance may include whether a service needs a completely isolated network slice instance, that is, the service does not share the network slice instance with another service.

S202. The second network device sends requirement description information of the network slice subnet instance to the first network device that manages the network slice subnet instance, where the requirement description information of the network slice subnet instance is used to indicate a service requirement for the network slice subnet instance, so that the first network device creates or configures the network slice subnet instance, and the requirement description information of the network slice subnet instance is generated based on the requirement description information of the network slice instance.

In this embodiment of this application, the second network device sends, to the third network device, requirement description information of a nested network slice subnet instance included in the network slice subnet instance, where the third network device is configured to manage the nested network slice subnet instance, and the requirement description information of the nested network slice subnet instance is determined based on the requirement description information of the network slice subnet instance.

In one embodiment, the method 200 further includes: generating, by the second network device, the requirement description information of the nested network slice subnet instance based on the requirement description information of the network slice subnet instance, where the requirement description information of the nested network slice subnet instance is used to indicate a service requirement for the nested network slice subnet instance, and the network slice subnet instance includes the nested network slice subnet instance; and sending, by the second network device, the requirement description information of the nested network slice subnet instance to the third network device that manages the nested network slice subnet instance.

In this embodiment of this application, the second network device that manages the network slice instance may directly generate the requirement description information of the nested network slice subnet instance based on the requirement description information of the network slice subnet instance, so as to improve network slice management efficiency.

In one embodiment, the method 200 further includes: receiving, by the second network device, capability report information sent by the first network device, where the capability report information is used to indicate a capability of the network slice subnet instance supported by the first network device. That the second network device generates the requirement description information of the network slice subnet instance based on the requirement description information of the network slice instance includes: generating, by the second network device, the requirement description information of the network slice subnet instance based on the requirement description information of the network slice instance and the capability report information.

In one embodiment, in the method 200, before the second network device generates the requirement description information of the nested network slice subnet instance based on the requirement description information of the network slice subnet instance, the second network device may also receive capability report information sent by the third network device that manages the nested network slice subnet instance, where the capability report information sent by the third network device may indicate a capability of the nested network slice subnet instance supported by the third network device. In one embodiment, the second network device may determine the requirement description information of the nested network slice subnet instance based on the capability report information sent by the third network device and the requirement description information of the network slice subnet instance. Therefore, network slice instance management efficiency is improved.

In one embodiment, in the method 200, the capability report information includes at least one of the following: a type of the network slice subnet instance supported by the first network device, a quantity of network slice subnet instances supported by the first network device, a capacity of the network slice subnet instance, a function supported by the network slice subnet instance, and performance of the network slice subnet instance.

In one embodiment, in the method 200, the requirement description information of the network slice subnet instance includes at least one of the following: a service type of the network slice subnet instance, a service performance requirement for the network slice subnet instance, a service coverage area of the network slice subnet instance, a serving time requirement for the network slice subnet instance, a service volume supported by the network slice subnet instance, a service management requirement for the network slice subnet instance, a service security level of the network slice subnet instance, and a service isolation requirement for the network slice subnet instance.

Figure 7:
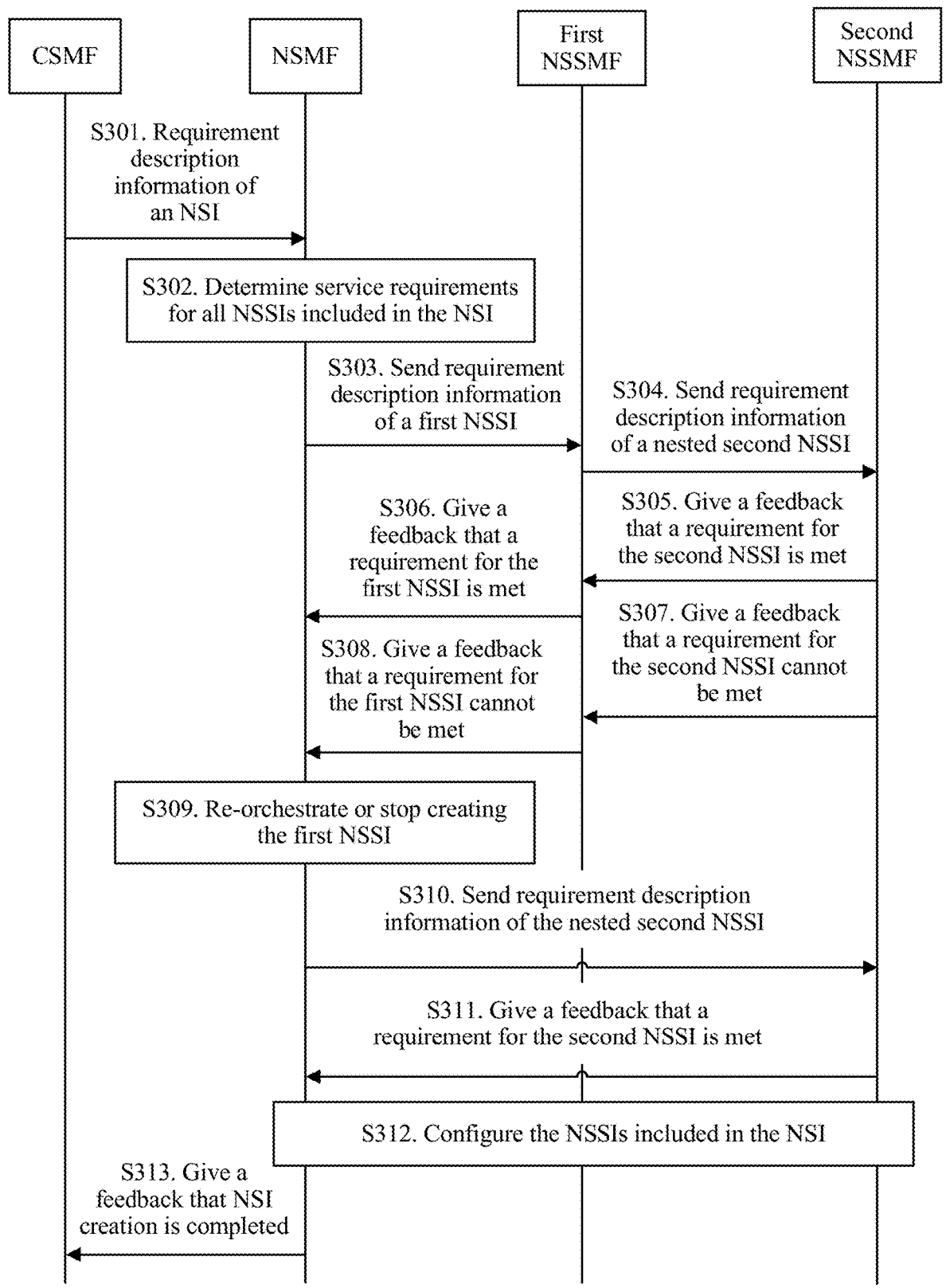
FIG. 7 is a schematic diagram of a communication method according to another embodiment of this application.

In a specific example, FIG. 7 is a schematic flowchart of a communication method 300 according to an embodiment of this application. The method 300 may be used for the network management system 10 shown in FIG. 1. FIG. 7 shows a process of creating or configuring a network slice instance. The first network device in the method 100 or the method 200 may be a first NSSMF module. The second network device in the method 100 or the method 200 may be an NSMF module. The third network device in the method 100 or the method 200 may be a second NSSMF module.

It should be understood that, as shown in FIG. 7, the method 300 includes but is not limited to the following operations.

S301. A CSMF module sends, to the NSMF, requirement description information of a network slice instance, which may also be referred to as a network slice instance create request, where the requirement description information of the network slice instance may include a requirement of a service for a network slice.

S302. The NSMF decomposes the requirement description information of the network slice instance into requirements for network slice subnet instances at a slice level.

In one embodiment, the NSMF may determine a requirement for the network slice instance based on the requirement description information and/or other information of the network slice instance, and convert or decompose the requirement for the network slice instance into requirements for network slice subnet instances at a slice level. The foregoing other information may include, for example, network slice subnet capability information reported by the first NSSMF and/or the second NSSMF.

In an example, the NSMF may determine that a new NSI needs to be created to support a service, determine at least one NSSI included in the NSI, and decompose a requirement of the service for a network slice into a requirement of the service for each NSSI.

Alternatively, in another example, if the NSMF determines that an existing NSI can meet a requirement of a service, and the service of the NSI is allowed to share the NSI with another service, the NSMF configures the existing NSI to support the service.

In one embodiment, when a first NSSI includes a nested second NSSI, the nested NSSI can be managed in two manners. In the first manner (which may be referred to as option 1 in the following), the first NSSMF may manage the nested second NSSI. In the second manner (which may be referred to as option 2 in the following), the NSMF may manage the nested second NSSI. In the first manner, the first NSSMF may be responsible for creating or configuring the nested second NSSI. In the second manner, the NSMF may be responsible for creating or configuring the nested second NSSI.

S303. The NSMF sends requirement description information of the first NSSI to the NSSMF.

S304. When the management manner of option 1 is used, the first NSSMF sends requirement description information of the nested second NSSI to the second NSSMF, where content of the requirement description information of the nested NSSI is described in the method 100 or the method 200.

It should be noted that S304 and S305 are a manner of creating a nested NSSI, that is, the first NSSMF sends requirement description information of the nested NSSI to the second NSSMF. S310 and S311 provide another manner of creating a nested NSSI, that is, the NSMF sends requirement description information of the nested NSSI to the second NSSMF. When a nested NSSI needs to be created, either of the two manners may be used.

S305. When the nested second NSSI can meet a requirement, the second NSSMF sends first feedback information to the first NSSMF, where the first feedback information is used to give a feedback that the requirement for the nested NSSI is met, and the first feedback information may carry information about the nested NSSI, for example, an identifier of the nested second NSSI or a requirement meeting status of the nested second NSSI.

S306. When a network slice subnet managed by the first NSSMF can provide the requirement description information of the network slice subnet instance sent by the NSMF in S303, the first NSSMF creates an NSSI, configures (or reuses) an existing NSSI, or modifies an existing NSSI, and sends second feedback information to the NSMF, where the second feedback information is used to indicate that the network slice subnet instance managed by the first NSSMF meets a related NSSI requirement, and the second feedback information may correspondingly carry specific information related to the NSSI, for example, an identifier of the NSSI, and a meeting status of the NSSI for the requirement description information of the network slice subnet instance sent in S303.

S307. In one embodiment, when a network slice subnet managed by the second NSSMF cannot meet a requirement for a nested NSSI, the second NSSMF may send third feedback information to the first NSSMF, where the third feedback information is used to indicate that the network slice subnet managed by the second NSSMF cannot meet the requirement for a nested NSSI, and the third feedback information may carry a reason why the requirement for a nested NSSI cannot be met, for example, network resources are insufficient to meet a capacity requirement, and an isolation requirement cannot be met.

S308. In one embodiment, when a network slice subnet managed by the first NSSMF cannot meet a requirement for an NSSI or the second NSSMF cannot meet a requirement for a nested NSSI, the first NSSMF may send fourth feedback information to the NSMF, where the fourth feedback information is used to indicate that the network slice subnet managed by the first NSSMF cannot meet the requirement for an NSSI.

In one embodiment, the fourth feedback information may carry a reason why the NSSI cannot be created, for example, network resources are insufficient to meet a capacity requirement, and an isolation requirement cannot be met.

S309. In one embodiment, after the NSMF receives the fourth feedback information of the first NSSMF, the NSMF may re-orchestrate the NSSI or stop creating the NSSI according to the reason why the NSSI cannot be created that is carried in the fourth feedback information.

For example, the NSSI may modify a capacity, performance, and other requirements of the NSSI within an allowed range to recreate the NSSI. Alternatively, the NSMF may select another NSSMF according to a known network status and resend the requirement description information of the NSSI.

S310. When the management manner of option 2 is used, the NSMF may directly send requirement description information of the nested second NSSI to the second NSSMF, where the requirement description information of the nested NSSI may include content of the requirement description information of the NSSI in S303, and may further include a relationship between nested subnets, for example, a connection relationship.

S311. When the second NSSMF meets a requirement for a nested NSSI, the second NSSMF may send fifth feedback information to the NSMF, where the fifth feedback information is used to indicate that the nested second NSSI can meet the requirement for a nested NSSI.

In one embodiment, when the second NSSMF does not meet the requirement for a nested NSSI, the second NSSMF may send sixth feedback information to the NSMF, where the sixth feedback information is used to indicate that the nested NSSI cannot meet the requirement for a nested NSSI.

In one embodiment, after the sixth feedback information is received, the NSMF may also re-orchestrate the NSSI or stop creating the NSSI.

S312. After all NSSIs that are included in the NSI are created or configured, the NSMF may send an indication message to each NSSMF, where the indication message is used to configure the NSSI.

For example, the indication information may be used to implement a topology connection relationship between network slice subnet instances.

S313. The NSMF sends creation feedback information to the CSMF, where the creation feedback information is used to indicate that NSI creation is completed.

Figure 8:
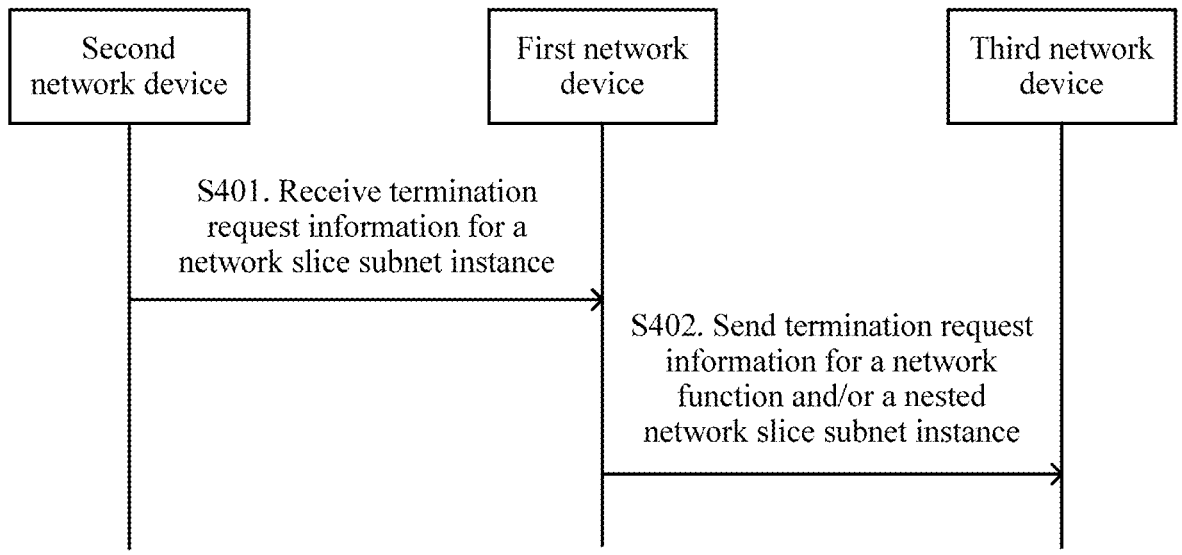
FIG. 8 is a schematic diagram of a communication method according to another embodiment of this application.

FIG. 8 is a schematic flowchart of a communication method 400 according to an embodiment of this application. The method 400 describes a process of terminating a network slice instance, and is applicable to the network management system 10 shown in FIG. 1. The method 400 may be performed by a first network device. For brevity, content in the method 400 that is the same as or similar to that in the foregoing description is not described herein again. The first network device in the method 400 may include an NSSMF module in the network management system 10. A second network device in the method 400 may include the NSMF module in the network architecture 100. A third network device in the method 400 may include an NSSMF module or an NFM module in the network management system 10. The method 400 includes the following operations.

S401. The first network device that manages a network slice subnet instance receives termination request information for the network slice subnet instance from the second network device that manages a network slice instance, where the termination request information for the network slice subnet instance is used to instruct to terminate the network slice subnet instance, and the network slice instance includes the network slice subnet instance.

In one embodiment, the termination request information for the network slice subnet instance may include deregistration request information for the network slice subnet instance. After receiving the deregistration request information for the network slice subnet instance, the first network device may mark the network slice subnet instance as a deregistered state, and stop a service running on the network slice subnet instance.

S402. When the network function and/or the nested network slice subnet instance need/needs to be terminated, the first network device sends termination request information for the network function and/or the nested network slice subnet instance to the third network device that manages the network function and/or the nested network slice subnet instance, where the termination request information for the network function and/or the nested network slice subnet instance is used to request to terminate the network function and/or the nested network slice subnet instance.

In one embodiment, terminating the network function and/or the nested network slice subnet instance may include marking the network function and/or the nested network slice subnet instance as a deregistered state, and stopping a service/services running on the network function and/or the nested network slice subnet instance.

In one embodiment, the foregoing third network device that manages the network function and/or the nested network slice subnet instance may be a same device, or may be different devices. This is not limited in this embodiment of this application.

In this embodiment of this application, in a case of terminating the network slice instance, the first network device that manages the network slice subnet instance may determine whether to terminate a network function and/or a nested network slice subnet instance that are/is included in the network slice subnet instance. The second network device that manages the network slice instance does not need to determine whether to terminate the network function and/or the nested network slice subnet instance that are/is included in the network slice subnet instance. Therefore, network slice hierarchical management is implemented, and network slice instance management efficiency is improved.

In one embodiment, the method 400 further includes: determining, by the first network device, whether the network function and/or the nested network slice subnet instance that are/is included in the network slice subnet instance need/needs to be terminated.

In one embodiment, in the method 400, the determining, by the first network device, whether the network function and/or the nested network slice subnet instance that are/is included in the network slice subnet instance need/needs to be terminated includes: when the network function and/or the nested network slice subnet instance are/is a dedicated network function and/or nested network slice subnet instance, determining to terminate the network function and/or the nested network slice subnet instance; when the network function and/or the nested network slice subnet instance are/is a shared network function and/or nested network slice subnet instance, determining that there is no need to terminate the network function and/or the nested network slice subnet instance.

In one embodiment, the nested network slice subnet instance may be terminated in two manners. In one manner, the first network device that manages the network slice subnet instance determines whether to terminate the nested network slice subnet instance, and sends termination request information for the nested network slice subnet instance to the third network device that manages the nested network slice subnet instance. In the other manner, the second network device that manages the network slice instance determines whether to terminate the nested network slice subnet instance, and sends termination request information for the nested network slice subnet instance to the third network device that manages the nested network slice subnet instance.

In one embodiment, in the method 400, the determining, by the first network device, whether the network function and/or the nested network slice subnet instance that are/is included in the network slice subnet instance need/needs to be terminated includes: when the network function and/or the nested network slice subnet instance are/is a dedicated network function and/or nested network slice subnet instance, terminating, by the first network device, a correlation relationship between the network slice instance and the network function and/or the nested network slice subnet instance, and reserving functions/a function of the network function and/or the nested network slice subnet instance, so that the network function and/or the nested network slice subnet instance can be provided to another network slice instance for use.

In one embodiment, the reserving functions/a function of the network function and/or the nested network slice subnet instance may be understood as not releasing network resources of the network function and/or the nested network slice subnet instance, so that the network function and/or the nested network slice subnet instance can be used for a newly created network slice subnet instance or another reconfigured network slice subnet instance, thereby improving network slice instance management efficiency.

Figure 9:
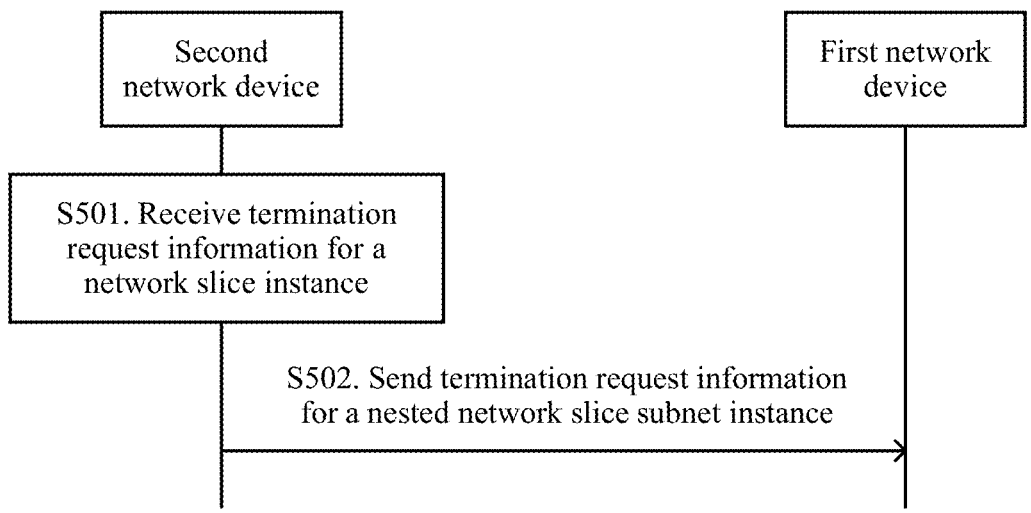
FIG. 9 is a schematic diagram of a communication method according to another embodiment of this application.

FIG. 9 is a schematic flowchart of a communication method 500 according to an embodiment of this application. The method 500 describes a process of terminating a network slice instance, and is applicable to the network management system 10 shown in FIG. 1. The method 500 may be performed by a second network device. For brevity, content in the method 500 that is the same as or similar to that in the foregoing description is not described herein again. The first network device in the method 500 may include an NSSMF module in the network management system 10. A second network device in the method 500 may include the NSMF module in the network architecture 100. A third network device in the method 500 may include an NSSMF module in the network management system 10. The method 500 includes the following operations.

S501. The second network device that manages a network slice instance receives termination request information for the network slice instance, where the termination request information for the network slice instance is used to request to terminate the network slice instance, the network slice instance includes a network slice subnet instance, and the network slice subnet instance includes a nested network slice subnet instance.

In one embodiment, the termination request information for the network slice instance of the second network device may be received from the CSMF module in the network management system 10.

In one embodiment, the termination request message for the network slice instance may include at least one piece of the following information: an identity of the network slice instance, execution time of terminating the network slice instance, a possibility of creating a similar network slice instance again (for example, the message may be used by the NSMF to determine whether to terminate the network slice subnet instance or reserve network resources of the network slice instance for another network slice instance), and the like.

S502. When the nested network slice subnet instance needs to be terminated, the second network device sends termination request information for the nested network slice subnet instance to the third network device that manages the nested network slice instance, where the termination request information for the nested network slice subnet instance is used to request to terminate the nested network slice subnet instance.

In this embodiment of this application, in a case of network slice hierarchical management, the second network device that manages the network slice instance may determine whether to terminate the nested network slice subnet instance included in the network slice subnet instance. When the nested network slice subnet instance needs to be terminated, the second network device sends the termination request information for the nested network slice subnet instance to the third network device that manages the nested network slice subnet instance, thereby improving network slice instance management efficiency.

Figure 10A:
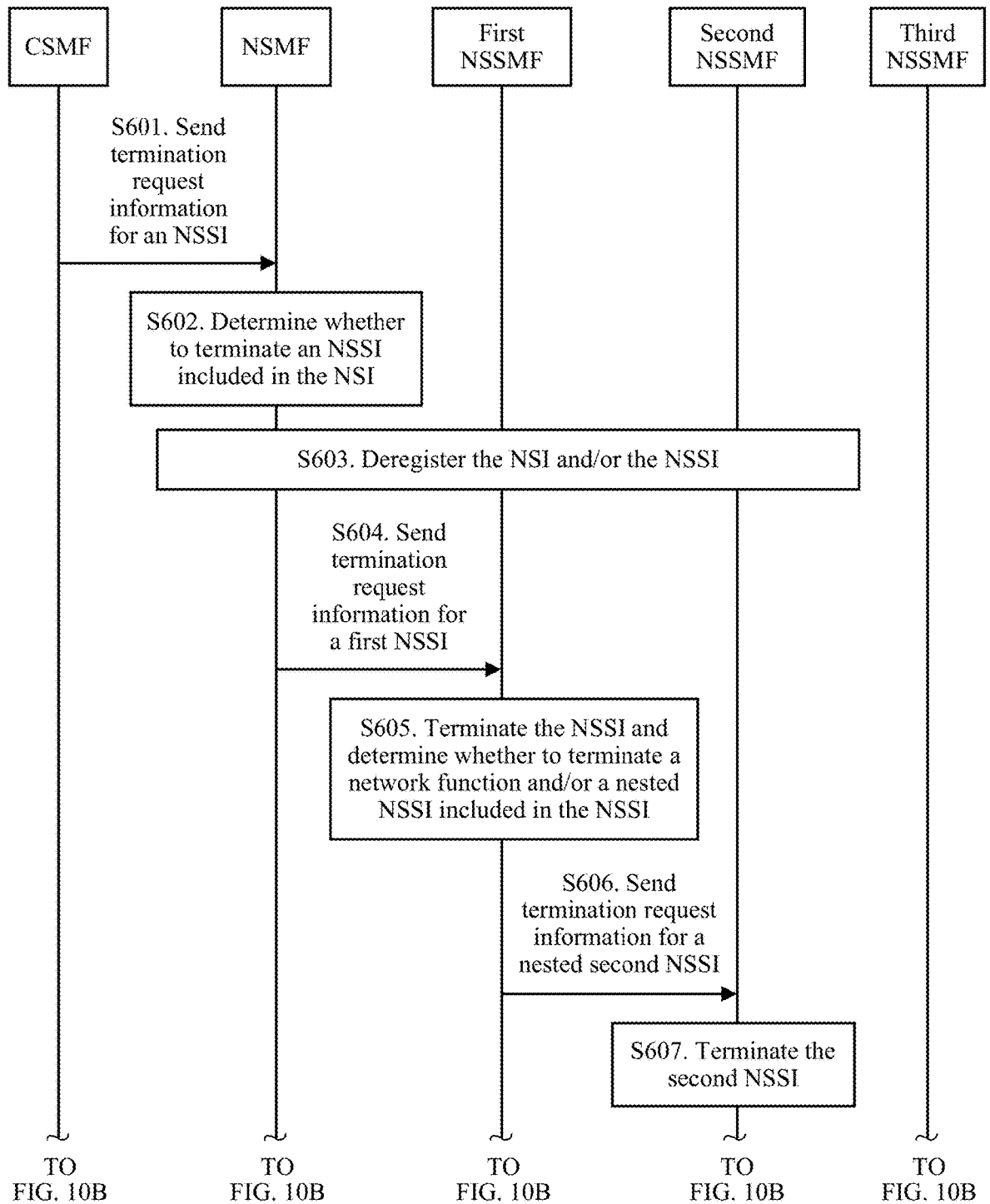
FIG. 10A and FIG. 10B are a schematic diagram of a communication method according to another embodiment of this application.
Figure 10B:
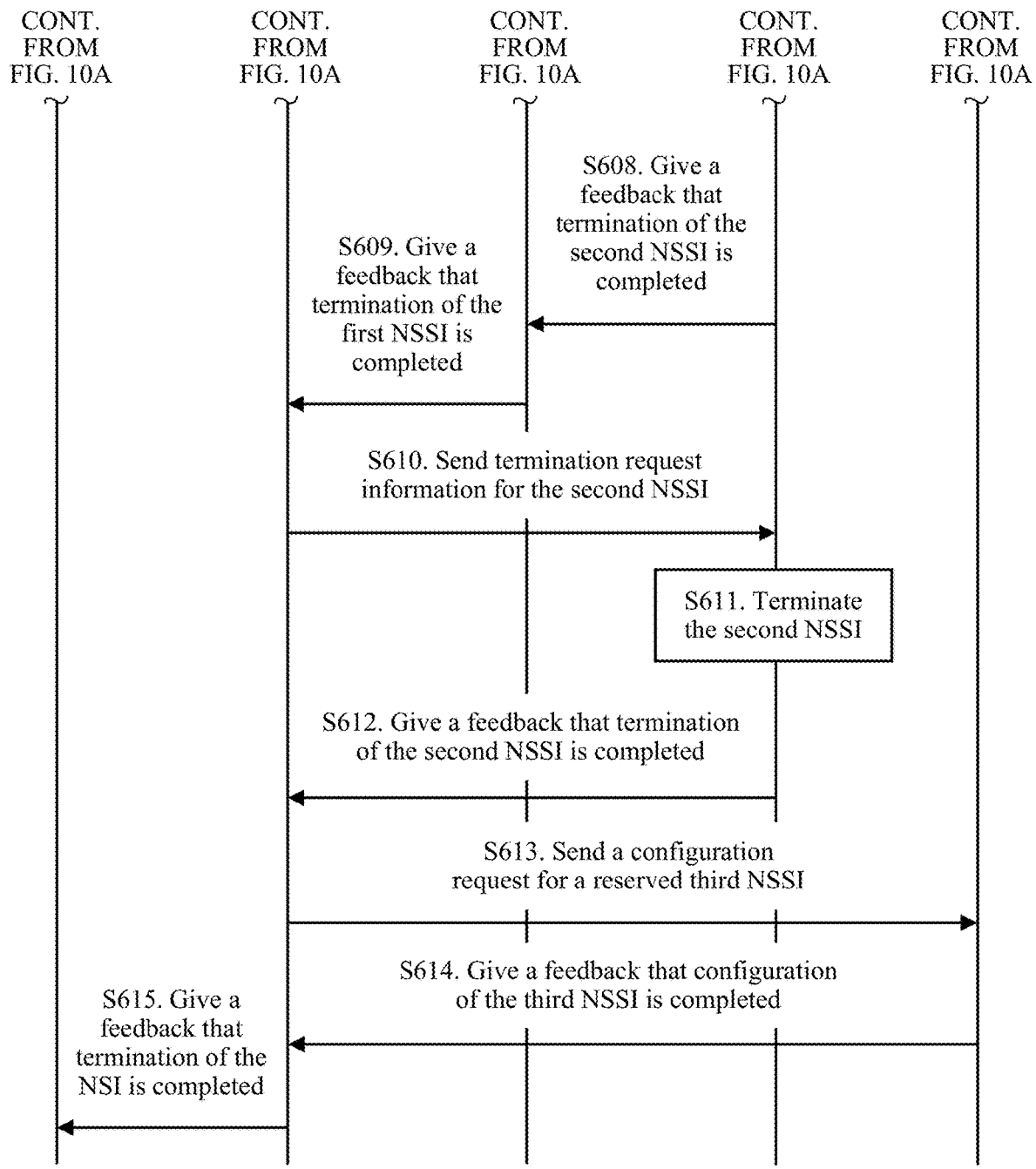

In a specific example, FIG. 10A and FIG. 10B are a schematic flowchart of a communication method 600 according to an embodiment of this application. The method 600 may be used for the network management system 10 shown in FIG. 1. FIG. 10A and FIG. 10B show a process of terminating a network slice instance. The first network device in the method 400 or the method 500 may be a first NSSMF module. The second network device in the method 400 or the method 500 may be an NSMF module. The third network device in the method 400 or the method 500 may be a second NSSMF module.

As shown in FIG. 10A and FIG. 10B, the method 600 includes but is not limited to the following operations.

S601. A CSMF module sends termination request information for a network slice instance to the NSMF module.

In one embodiment, after the CSMF module receives a service termination request of an operator or a third-party tenant, or after the CSMF determines, according to a built-in algorithm, that a network slice service does not need to be provided any more, the CSMF module may send the termination request information for the network slice instance to the NSMF module. The termination request message for the network slice instance may include at least one piece of the following information: an identity of the network slice instance, execution time of terminating the network slice instance, a possibility of creating a similar network slice instance again (for example, the message may be used by the NSMF to determine whether to terminate a network slice subnet instance or reserve network resources of the network slice instance for another network slice instance), and the like.

S602. After receiving the termination request information for the network slice instance, the NSMF module decomposes the termination request information for the network slice instance into a termination request of at least one network slice subnet instance.

Specifically, the NSMF module may determine the to-be-terminated network slice instance and network slice subnet instances that are included in the network slice instance, determine whether the network slice subnet instances are dedicated network slice subnet instances of the network slice instance or are being shared by another network slice instance, and determine whether the network slice subnet instances need to be terminated, or determine whether network resources of the network slice subnet instances need to be reserved for use by another network slice instance.

It should be noted that the operation of determining the network slice subnet instances that are included in the to-be-terminated network slice instance may be completed by the NSMF module by detecting information about the network slice instance and the network slice subnet instances that is stored in an internal memory, or may be completed by the NSMF module by reading the information about the network slice instance and the network slice subnet instances from an NS repository. For example, the NS repository may send the following information to the NSMF module through a fourth interface: a state (active, deregistered, faulty, and the like) of the network slice instance, identities and states of the network slice subnet instances that are included in the network slice instance, and information about whether the network slice subnet instances or network functions are shared by a plurality of network slice instances.

In an example, in the example of FIG. 10A and FIG. 10B, it is assumed that the NSI includes a first NSSI, a nested second NSSI, and a third NSSI, and a determining result of the NSMF module is that the first NSSI and the second NSSI need to be terminated, and the third NSSI does not need to be terminated.

In one embodiment, when the first NSSI includes the nested second NSSI, the nested NSSI can be managed in two manners. In the first manner (which may be referred to as option 1 in the following), the first NSSMF may manage the nested second NSSI. In the second manner (which may be referred to as option 2 in the following), the NSMF may manage the nested second NSSI. In the first manner, the first NSSMF is responsible for terminating the nested second NSSI. In the second manner, the NSMF is responsible for terminating the nested second NSSI.

S603. The NSMF module deregisters the network slice instance and/or the network slice subnet instance.

In a specific example, if the NS repository is an external memory, the NSMF module may mark, through the fourth interface between the NSMF and the NS repository, a state of the network slice instance in the NS repository as a deregistered state. If the NS repository is a built-in memory of the NSMF, the NSMF performs internal execution to mark a state of the network slice instance as a deregistered state. If the to-be-terminated network slice subnet instance has not been deregistered, the NSMF module sends a request message through a second interface between the NSMF module and the NSSMF, to request the NSSMF to deregister the network slice subnet instance. The operation of deregistering the NSSI may include marking the NSSI as a deregistered state and stopping a service running on the NSSI.

S604. The NSMF module sends termination request information for the network slice subnet instance to the first NSSMF module that manages the first NSSI, where in some embodiments, the termination request information for the network slice subnet instance may include an identity of the first NSSI.

S605. The first NSSMF module terminates the first NSSI after receiving the termination request information for the network slice subnet instance sent by the NSMF.

In one embodiment, the first NSSMF may determine whether a network function and/or a nested network slice subnet instance that are/is included in the first NSSI need/needs to be terminated. When the network function and/or the nested network slice subnet instance need/needs to be terminated, the first NSSMF module may send termination request information for the network function to a management device that manages the network function and/or the nested network slice subnet instance, so as to terminate the network function.

In a specific example, that the first NSSMF terminates the first NSSI includes: terminating a virtual network function that is dedicated to the first NSSI and that is included in the first NSSI, configuring another network function that needs to be reserved and that is included in the first NSSI to stop serving the first NSSI, deleting a configuration file, and the like.

In one embodiment, the first NSSMF may terminate an association relationship between the first NSSI and the network function and/or the nested network slice subnet instance that are/is included in the first NSSI, and reserve functions/a function of the network function and/or the nested network slice subnet instance, so that the network function and/or the nested network slice subnet instance can be provided to another network slice instance for use.

S606. When the management manner of option 1 is used, the first NSSMF module determines whether to terminate the nested second NSSI; and when determining to terminate the second NSSI, the first NSSMF module sends termination request information for the nested second NSSI to the second NSSMF module, where in some embodiments, the termination request information for the second NSSI includes an identity of the second NSSI.

S607. After receiving the termination request information for the second NSSI sent by the first NSSMF, the second NSSMF module terminates the second NSSI.

In a specific example, the terminating the nested second NSSI includes: terminating a virtual network function that is dedicated to the second NSSI and that is included in the second NSSI, configuring another network function that needs to be reserved and that is included in the second NSSI to stop serving the second NSSI, deleting a configuration file, and the like.

S608. The second NSSMF sends first feedback information to the first NSSMF, where the first feedback information is used to give a feedback that termination of the second NSSI is completed.

It should be noted that S606 and S608 are a manner of terminating a nested NSSI, that is, the first NSSMF sends requirement description information of the nested NSSI to the second NSSMF. S611 and S612 provide another manner of terminating a nested NSSI, that is, the NSMF sends termination request information for the nested NSSI to the second NSSMF. When a nested NSSI needs to be terminated, either of the two manners may be used.

S609. After determining that the first NSSI is terminated, the first NSSMF sends second feedback information to the NSMF, where the second feedback information is used to indicate that termination of the first NSSI is completed.

S610. In one embodiment, when the management manner of option 2 is used, the NSMF may send termination request information for the second NSSI to the second NSSMF that manages the nested second NSSI.

S611. After receiving the termination request information for the second NSSI sent by the NSMF, the second NSSMF terminates the second NSSI.

S612. The second NSSMF sends, to the NSMF, a feedback that termination of the second NSSI is completed.

S613. The NSMF sends, to the third NSSMF module that manages the third NSSI that does not need to be terminated, termination request information for configuring the third NSSI.

In an example, the termination request information for the third NSSI may be used to instruct the third NSSI to stop serving the to-be-terminated NSI, delete a policy and configuration information related to the NSI, and disable a possible connection relationship between the third NSSI and another NSSI. In one embodiment, the third NSSMF may reserve network resources of the third NSSI, so that the third NSSI can be provided to another network slice instance for use.

S614. The third NSSMF module configures a network function or a nested network slice subnet instance included in the third NSSI based on a requirement of the NSMF, and sends feedback information to the NSMF, so as to indicate that the configuration is completed.

S615. The NSMF sends termination feedback information to the CSMF, where the termination feedback information is used to give a feedback that termination of the network slice instance is completed.

Figure 11:
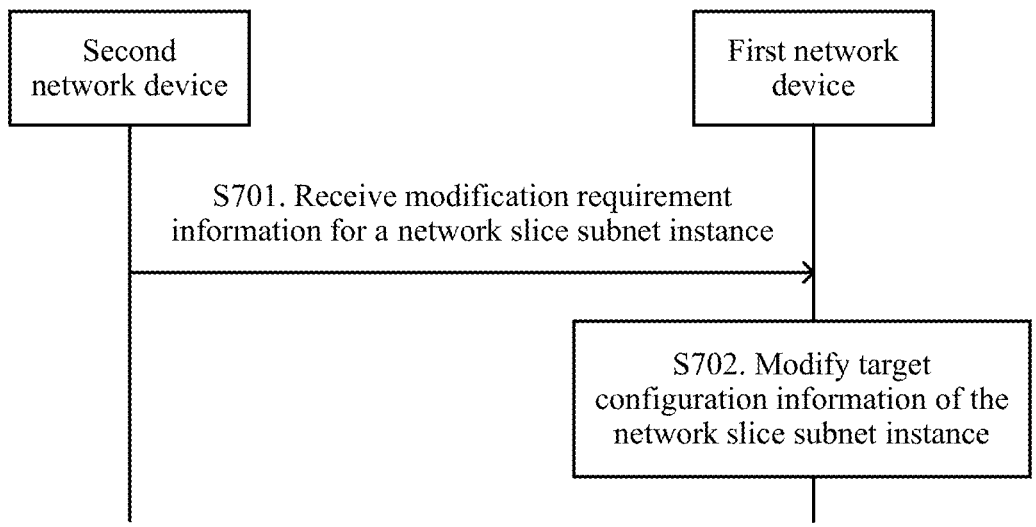
FIG. 11 is a schematic diagram of a communication method according to another embodiment of this application.

FIG. 11 is a schematic flowchart of a communication method 700 according to an embodiment of this application. The method 700 describes a method for modifying a network slice instance. The method 700 is applicable to the network management system 10 shown in FIG. 1. The method 700 may be performed by a first network device. For brevity, content in the method 700 that is the same as or similar to that in the foregoing description is not described herein again. The first network device in the method 700 may include an NSSMF module in the network management system 10. A second network device in the method 700 may include the NSMF module in the network architecture 100. A third network device in the method 700 may include an NSSMF module in the network management system 10. The method 700 includes the following operations.

S701. The first network device that manages a network slice subnet instance receives modification requirement information for the network slice subnet instance from the second network device that manages a network slice instance, where the modification requirement information for the network slice subnet instance is used to indicate a service modification requirement for the network slice subnet instance, and the network slice instance includes the network slice subnet instance.

S702. The first network device modifies target configuration information of the network slice subnet instance based on the modification requirement information.

In this embodiment of this application, the modification requirement information for the network slice subnet instance sent by the second network device that manages the network slice instance only needs to indicate the modification requirement for the network slice subnet instance. The first network device that manages the network slice subnet instance may autonomously determine, based on the modification requirement information for the network slice subnet instance, the target configuration information of the network slice subnet instance that needs to be modified, and the second network device does not need to directly indicate the configuration information of the network slice subnet instance that needs to be modified, thereby implementing hierarchical management of the network slice instance, reducing network slice instance management complexity, and improving network slice instance management efficiency.

In one embodiment, in the method 700, that the first network device modifies target configuration information of the network slice subnet instance based on the modification requirement information includes: determining, by the first network device based on the modification requirement information for the network slice subnet instance, that the target configuration information of the network slice subnet instance needs to be modified; and modifying, by the first network device, the target configuration information of the network slice subnet instance.

In one embodiment, in the method 700, the first network device determines, based on the modification requirement information for the network slice subnet instance, modification requirement information for a nested network slice subnet instance included in the network slice subnet instance, where the modification requirement information for the nested network slice subnet instance is used to indicate a service modification requirement for the nested network slice subnet instance, and the network slice subnet instance includes the nested network slice subnet instance; and the first network device sends the modification requirement information for the nested network slice subnet instance to the third network device that manages the nested network slice subnet instance.

In one embodiment, in the method 700, the modification requirement information for the network slice subnet instance includes at least one of the following: modification information of a service type of the network slice subnet instance, modification information of a service performance requirement for the network slice subnet instance, modification requirement information for a service coverage area and/or serving time of the network slice subnet instance, modification requirement information for a service volume supported by the network slice instance, modification information of a service management requirement for the network slice subnet instance, modification requirement information for a service security level of the network slice subnet instance, and modification information of a service isolation requirement for the network slice subnet instance.

Figure 12:
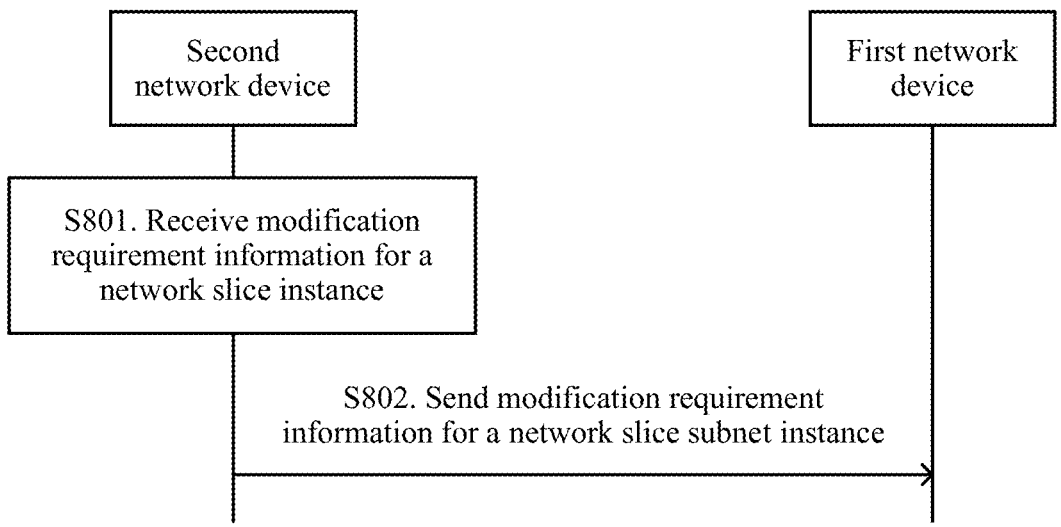
FIG. 12 is a schematic diagram of a communication method according to another embodiment of this application.

FIG. 12 is a schematic flowchart of a communication method 800 according to an embodiment of this application. The method 800 describes a method for modifying a network slice instance. The method 800 is applicable to the network management system 10 shown in FIG. 1. The method 800 may be performed by a second network device. For brevity, content in the method 800 that is the same as or similar to that in the foregoing description is not described herein again. A first network device in the method 800 may include an NSSMF module in the network management system 10. The second network device in the method 800 may include the NSMF module in the network architecture 100. A third network device in the method 800 may include an NSSMF module in the network management system 10. The method 800 includes the following operations.

S801. The second network device that manages a network slice instance determines modification requirement information for the network slice instance, where the modification requirement information for the network slice instance is used to indicate a modification requirement for the network slice instance, and the network slice instance includes the network slice subnet instance.

In one embodiment, the second network device may determine the modification requirement information for the network slice instance by itself based on a result of performance detection. Alternatively, the second network device may receive the modification requirement information for the network slice instance sent by a CSMF module.

S802. The second network device sends modification requirement information for the network slice subnet instance to the first network device that manages the network slice subnet instance, so that the first network device modifies the network slice subnet instance, where the modification requirement information for the network slice subnet instance is used to indicate a modification requirement for the network slice subnet instance, and the modification requirement information for the network slice subnet instance is determined based on the modification requirement information for the network slice instance.

In this embodiment of this application, the modification requirement information for the network slice subnet instance sent by the second network device that manages the network slice instance only needs to indicate the modification requirement for the network slice subnet instance. The second network device autonomously generates the modification requirement information for the network slice subnet instance based on the modification requirement information for the network slice instance, and sends the modification requirement information for the network slice subnet instance to the first network device. This implements hierarchical management of the network slice instance, reduces network slice instance management complexity, and improves network slice instance management efficiency.

In one embodiment, in the method 800, the second network device sends modification requirement information for a nested network slice subnet instance to the third network device that manages the nested network slice subnet instance, where the modification requirement information for the nested network slice subnet instance is used to indicate a modification requirement for the nested network slice subnet instance, and the network slice subnet instance includes the nested network slice subnet instance.

In one embodiment, in the method 800, the modification requirement information for the network slice subnet instance includes at least one of the following: modification information of a service type of the network slice subnet instance, modification information of a service performance requirement for the network slice subnet instance, modification requirement information for a service coverage area and/or serving time of the network slice subnet instance, modification requirement information for a service volume supported by the network slice instance, modification information of a service management requirement for the network slice subnet instance, modification requirement information for a service security level of the network slice subnet instance, and modification information of a service isolation requirement for the network slice subnet instance.

Figure 13A:
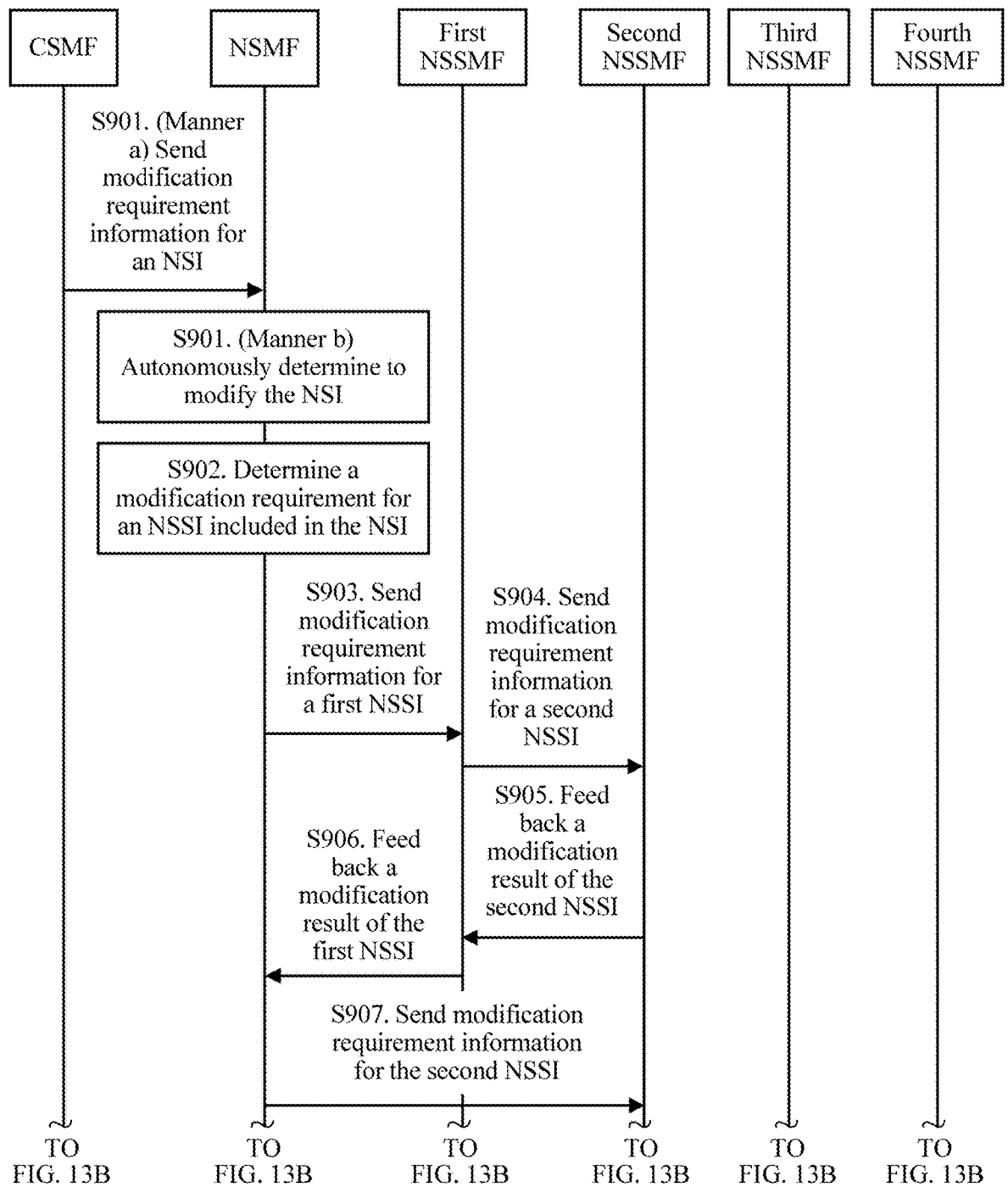
FIG. 13A and FIG. 13B are a schematic diagram of a communication method according to another embodiment of this application.
Figure 13B:
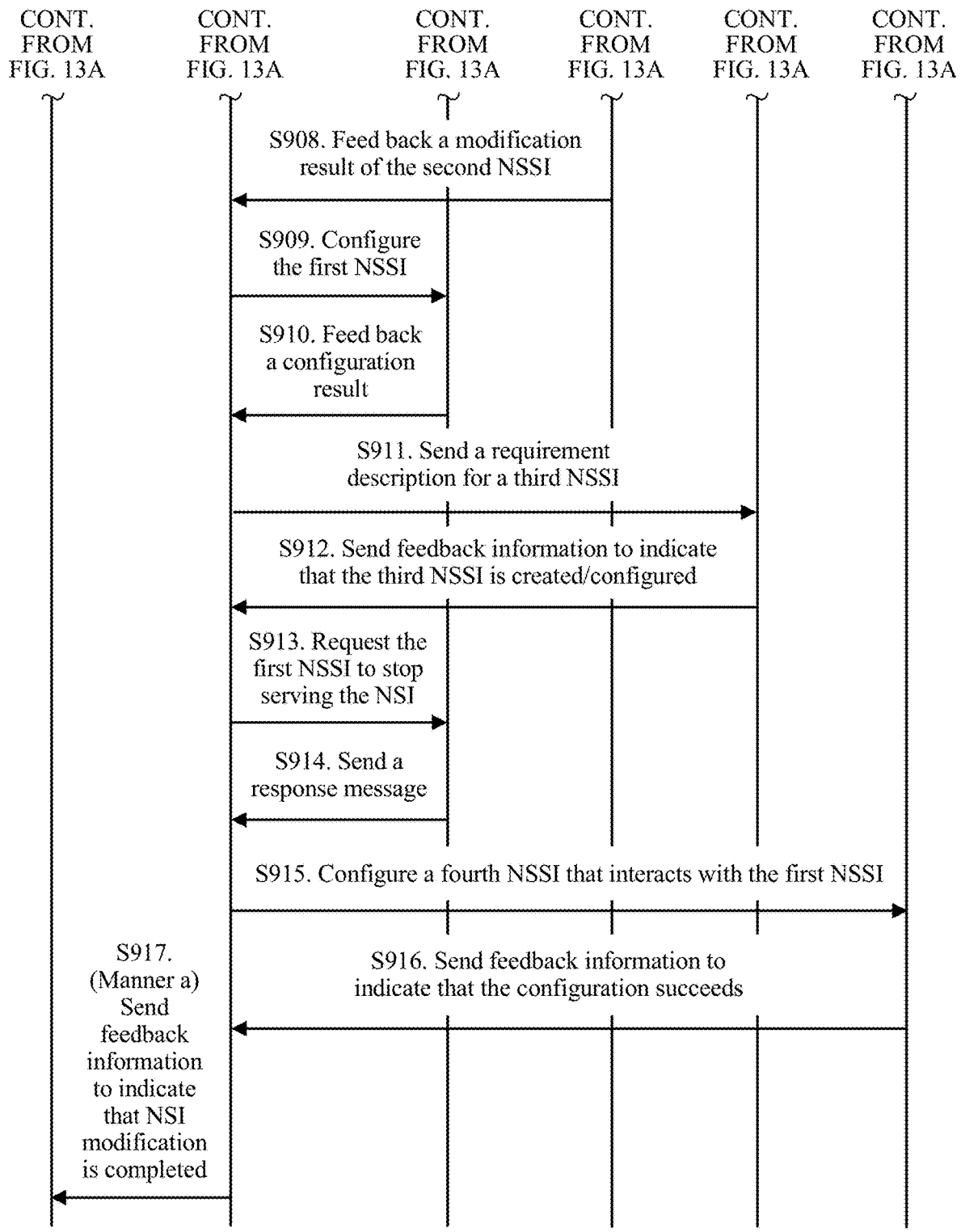

In a specific example, FIG. 13A and FIG. 13B are a schematic flowchart of a communication method 900 according to an embodiment of this application. The method 900 may be used for the network management system 10 shown in FIG. 1. FIG. 13A and FIG. 13B show a process of modifying a network slice instance. The first network device in the method 700 or the method 800 may be a first NSSMF module. The second network device in the method 700 or the method 800 may be an NSMF module. The third network device in the method 700 or the method 800 may be a second NSSMF module.

As shown in FIG. 13A and FIG. 13B, the method 900 includes but is not limited to the following operations.

S901. The NSMF determines modification requirement information for an NSI.

In one embodiment, the NSMF may determine the modification requirement information for the NSI in two manners. In manner (a), the NSMF may receive the modification requirement information for the NSI sent by a CSMF. In manner (b), the NSMF may determine the modification requirement information for the NSI by itself.

In an example, in manner (a), a possible event that triggers modification of the network slice instance is that after receiving a service requirement change request sent by an operator or a network slice tenant, the CSMF converts the service requirement change into a change of a network slice requirement, and sends the requirement information for the network slice instance to the NSMF. In another example, in manner (b), another possible case that triggers modification of the network slice instance is that the NSMF autonomously determines, based on a running status of the network slice instance and a preset rule policy, that the network slice instance needs to be modified, and generates a corresponding modification requirement. The modification requirement includes a performance requirement change, a management requirement change, and another requirement change.

In one embodiment, the modification requirement information for the network slice instance may be used to indicate at least one of the following: a requirement change of a service supported by the NSI, an NSI performance requirement change, an NSI management requirement change, or another requirement change.

In a specific example, a service requirement for the NSI may include at least one piece of the following content: a service type of the NSI, a service-related performance requirement for the NSI, and a geographical range and time that the service of the NSI needs to cover.

The service type of the NSI may include a high-definition video service, an industrial Internet of Things service, a home Internet of Things service, a VR service, a fixed wireless access service, a VoIP service, a web browsing service, and a meter reading service. In addition, the service requirement change of the NSI may further include a change of a corresponding technology that may be caused by the service type change of the NSI, for example, a key frame that needs to be protected in a video service, a change of an uplink/downlink codec manner that is caused by an energy saving requirement of an Internet of Things service, and a change of a monitored channel. The service-related performance requirement for the NSI may include a call drop rate of a voice service or a congestion rate of a voice service.

In a specific example, a performance requirement for the NSI may include at least one piece of the following content: a quantity of users that can be supported for simultaneous access, a tolerable maximum latency, an uplink/downlink rate of a still user, an uplink/downlink rate of a low-speed mobile user, an uplink/downlink rate of a high-speed mobile user, a jitter, a packet loss rate, time required for initial access, an inter-cell handover success rate, and the like.

In a specific example, the management requirement change of the NSI may refer to performance of the NSI that needs to be monitored to know a service running status, for example, monitoring fault data of the NSI, and setting parameters of the NSI and a monitoring and reporting period.

In a specific example, other requirements of the NSI may include a signal-to-noise ratio threshold, a location update period, a power control parameter, a spectrum, a bit error rate, and the like.

S902. The NSMF determines an NSI that needs to be modified in the NSI.

In a specific example, the NSMF may determine NSSIs that are included in the to-be-modified NSI, determine the NSSI that needs to be modified, determine whether the NSSI is shared by a plurality of network slice instances, and decompose a modification requirement for the NSI to each NSSI. For example, requirements such as power control, a bit error rate, and a jitter are related to only an access network NSSI, and a latency, an uplink/downlink rate, and the like are related to both an access network NSSI and a core network NSSI.

In one embodiment, when a first NSSI includes a nested second NSSI, the nested NSSI can be managed in two manners. In the first manner (which may be referred to as option 1 in the following), the first NSSMF may manage the nested second NSSI. In the second manner (which may be referred to as option 2 in the following), the NSMF may manage the nested second NSSI. In the first manner, the NSMF does not decompose the requirement to the second NSSI, but decomposes the requirement to only the first NSSI. In the second manner, the NSMF decomposes the requirement to the first NSSI and the second NSSI.

S903. The NSMF sends modification requirement information for the first NSSI to the first NSSMF.

In one embodiment, the modification requirement information for the first NSSI may include an identifier of the first NSSI, or a service requirement change, a performance requirement change, a management requirement change, or another requirement change of the first NSSI. The first NSSMF may modify the first NSSI based on the modification requirement information for the first NSSI.

S904. When the management manner of option 1 is used, the first NSSMF sends modification requirement information for the nested second NSSI to the second NSSMF.

In one embodiment, if the first NSSI is to be modified, the nested second NSSI may need to be modified. The first NSSMF may autonomously generate the modification requirement information for the second NSSI, and send the modification requirement information for the second NSSI to the second NSSMF.

Alternatively, in another case, the first NSSMF may autonomously determine, based on a running status of the network slice subnet instance and a preset rule policy, that the second NSSI needs to be modified, and generate a corresponding modification requirement. In this case, the network slice subnet instance is modified, not the network slice instance.

S905. When the management manner of option 1 is used, the second NSSMF sends, to the first NSSMF, a feedback that modification of the second NSSI is completed.

S906. The first NSSMF sends, to the NSMF, a feedback that modification of the first NSSI is completed.

S907. When the management manner of option 2 is used, the NSMF sends modification requirement information for the nested second NSSI to the second NSSMF.

S908. When the management manner of option 2 is used, the second NSSMF feeds back a result of the modification of the second NSSI to the NSMF.

S909. In one embodiment, when the management manner of option 2 is used, after receiving, from the second NSSMF, feedback information indicating that modification of the second NSSI is completed, the NSMF sends a request for configuring the first NSSI to the first NSMF.

In one embodiment, the first NSSI needs to be configured to cooperate with modification of the second NSSI. For example, when a capacity of the second NSSI shrinks, a forwarding rate of an interface between another network function and/or network slice subnet instance in the first NSSI and the second NSSI needs to be correspondingly reduced. Therefore, the NSMF may send a modification status of the second NSSI to the first NSSMF and request to configure the first NSSI. For example, configuration content includes configuring another network function and/or network slice subnet instance in the first NSSI other than second NSSI to cooperate with the modification of the second NSSI.

S910. After the first NSSI is modified according to the indication in S909, the first NSSMF sends, to the NSMF, a feedback that configuration of the first NSSI is completed.

In one embodiment, the method shown in S903 to S910 is applicable to the following cases:

(A) The first NSSI is a network slice subnet instance dedicated to the to-be-modified NSI, and the first NSSMF can complete the modification requested by the NSMF.

(B) The first NSSI is a network slice subnet instance shared by a plurality of NSIs; in S902, the NSMF determines that modifying the first NSSI does not affect another NSI sharing the first NSSI; and the first NSSMF can complete the modification requested by the NSMF.

When neither of the foregoing cases is met, for example, when the first NSSMF gives, to the NSMF, a feedback that the first NSSMF cannot complete the modification of the first NSSMF, or when the NSMF determines that the modification of the first NSSI may affect another NSI sharing the first NSSI, operations S911 to S914 may be performed.

S911. The NSMF sends requirement description information of an NSSI to the third NSSMF, and the third NSSMF determines to create a third NSSI that can meet a modification requirement, and configures the third NSSI to serve the NSI; or the third NSSMF configures an existing third NSSI, and enables the third NSSI to meet a requirement for the modified NSSI, where for content that needs to be included in the requirement description information, refer to Embodiment 1 of the present invention. Details are not described herein again.

S912. The third NSSMF sends feedback information to the NSMF to indicate that the third NSSI is created or configured and can meet a new NSSI requirement.

S913. The NSMF sends, to the first NSSMF, a request for configuring the first NSSI to stop serving the NSI. Details are not described herein.

S914. The first NSSMF sends a configuration complete message to the NSMF.

S915. In one embodiment, if a fourth NSSI interacts with the first NSSI, the NSMF sends a configuration message to a fourth NSSMF that manages the fourth NSSI.

If S903 to S910 need be executed, the fourth NSSI may be configured to cooperate with the modification of the first NSSI in S915. If operations S911 to S914 need to be performed, the fourth NSSI may be configured to switch interaction and an interface from the first NSSI to the third NSSI in S915.

S916. The fourth NSSMF configures the fourth NSSI.

S917. When the modification requirement information for the NSI is initiated by the CSMF, the NSMF sends feedback information to the CSMF to indicate that modification of the NSI is completed, where the feedback information may include an identifier of the NSI and a feature of the modified NSI.

Figure 14:
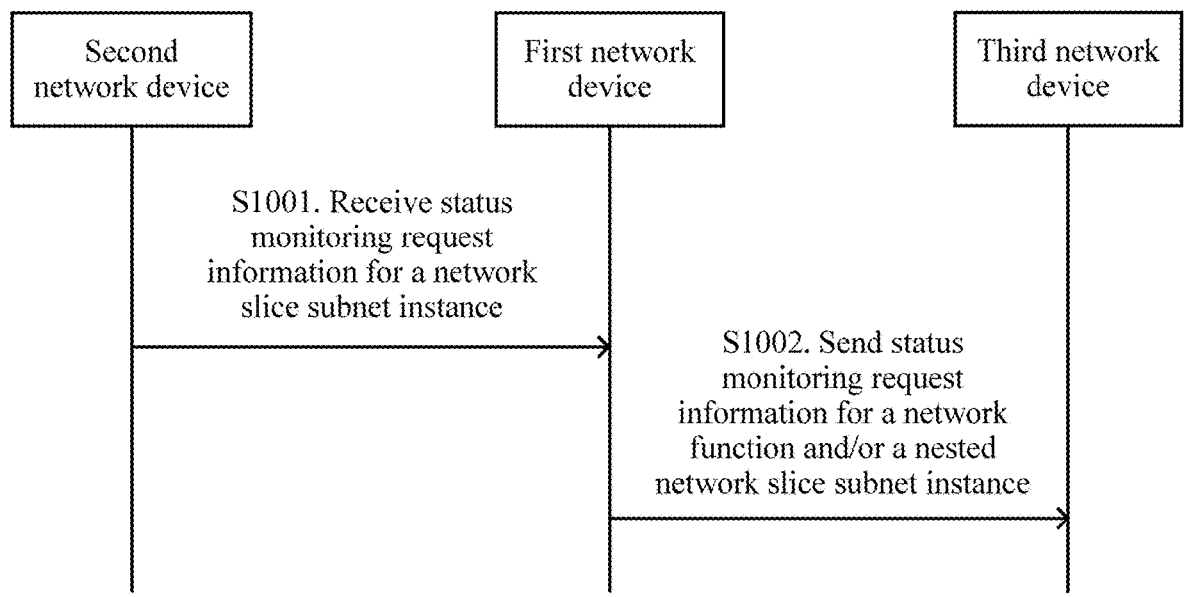
FIG. 14 is a schematic diagram of a communication method according to another embodiment of this application.

FIG. 14 is a schematic flowchart of a communication method 1000 according to an embodiment of this application. The method 1000 describes a method for monitoring performance of a network slice instance. The method 1000 is applicable to the network management system 10 shown in FIG. 1. The method 1000 may be performed by a first network device. For brevity, content in the method 1000 that is the same as or similar to that in the foregoing description is not described herein again. The first network device in the method 1000 may include an NSSMF module in the network management system 10. A second network device in the method 1000 may include the NSMF module in the network architecture 100. A third network device in the method 1000 may include an NSSMF module in the network management system 10. The method 1000 includes the following operations.

S1001. The first network device that manages a network slice subnet instance receives status monitoring request information for the network slice subnet instance from the second network device that manages a network slice instance, where the status monitoring request information for the network slice subnet instance is used to instruct to measure and/or monitor performance of the network slice subnet instance, the network slice instance includes the network slice subnet instance, and the network slice subnet instance includes a network function and/or a nested network slice subnet instance.

In one embodiment, in a specific example, the status monitoring request information for the NSSI may include a performance measurement request for the NSSI or a performance monitoring request for the NSSI.

In a specific example, the performance measurement request for the NSSI may be used to request the first network device to perform measurement in the NSSI. The performance measurement request for the NSI may include a performance measurement type of the NSSI, a load status of the NSSI, and measurement planning information of the NSSI. The performance measurement type of the NSI may instruct the first network device to obtain performance measurement data of the NSI based on the measurement type. For example, the performance measurement type of the NSI may include a QoS parameter of service data. The QoS parameter may include a latency, a jitter, a packet loss rate, an uplink/downlink rate, or the like. The load status of the NSSI may include an amount of signaling, total data traffic, or the like. The measurement planning information of the NSSI may include a measurement time period, a measurement execution interval, a measurement result reporting time, and the like.

In a specific example, the performance monitoring request for the NSSI may be used to request the first network device to monitor one or more performance parameters in the NSSI. For example, when the parameter exceeds a threshold, the first network device may send an alarm message to the NSMF, and the performance monitoring request for the NSSI may include a monitoring parameter of the NSSI, a load status of the NSSI, a threshold of the parameter, or an alarm severity corresponding to the monitoring parameter of the NSSI. For example, the monitoring parameter of the NSSI may include a QoS parameter of service data. The QoS parameter includes a latency, a jitter, a packet loss rate, an uplink/downlink rate, or the like. The load status of the NSSI may include an amount of signaling, total data traffic, or the like.

In one embodiment, the status monitoring request information for the NSSI may further include an identifier of the NSI. When the NSSI is shared by a plurality of NSIs, the NSMF may request the first network device to distinguish performance measurement data of different NSIs. The status monitoring request information for the NSSI may further include an identifier of the NSSI. When the NSSMF manages a plurality of NSSIs, the NSSI identifier may be used to indicate the NSSI for measurement.

S1002. The first network device sends status monitoring request information for the network function and/or the nested network slice subnet instance to the third network device that manages the network function and/or the nested network slice subnet instance, where the status monitoring request information for the network function and/or the nested network slice subnet instance is used to instruct to measure and/or monitor performance of the network function and/or the nested network slice subnet instance.

In this embodiment of this application, the second network device that manages the network slice instance does not need to monitor performance information of the network function and/or the nested network slice subnet instance that are/is included in the network slice subnet instance, and the first network device that manages the network slice subnet instance autonomously generates the status monitoring information for the network function and/or the nested network slice subnet instance based on the status monitoring request information for the network slice subnet instance, thereby implementing hierarchical management of the network slice instance, reducing network slice instance management complexity, and improving network slice instance management efficiency.

In one embodiment, when the NSSI includes a nested NSSI, the nested NSSI can be managed in two manners. In the first manner (which may be referred to as option 1 in the following), the first network device may manage the nested NSSI. In the second manner (which may be referred to as option 2 in the following), the second network device may manage the nested NSSI. In the first manner, the first network device is responsible for managing and monitoring performance of the nested NSSI. In the second manner, the second network device is responsible for managing and monitoring performance of the nested NSSI.

In one embodiment, in the method 1000, the first network device receives status monitoring feedback information that is for the network function and/or the nested network slice subnet instance and that is sent by the third network device, where the status monitoring feedback information for the network function and/or the nested network slice subnet instance is used to indicate a result of measuring and/or monitoring the performance of the network function and/or the nested network slice subnet instance.

In one embodiment, the status monitoring feedback information for the network function and/or the nested network slice subnet instance may include performance measurement data of the network function and/or the nested network slice subnet instance. Alternatively, the status monitoring feedback information for the network function and/or the nested network slice subnet instance may further include alarm information.

In a specific example, the third network device may report the performance measurement data of the nested NSSI to the first network device in a specified time period. The performance measurement data of the nested NSSI may include a measurement result of the performance of the nested NSSI. For example, the performance measurement data of the nested NSSI may include a QoS measurement result of a service of the nested NSSI and a load status in the nested NSSI. Alternatively, the feedback information may further include an identifier of the nested NSSI, so as to indicate that the performance measurement data is from the nested NSSI.

In a specific example, when detecting, through monitoring, that a monitoring parameter exceeds a specified threshold, the second NSSMF may report alarm information, where the alarm information may include a specific performance parameter, a specific threshold description, and an alarm severity description. In one embodiment, the alarm information may further include an identifier of the nested second NSSI, so as to indicate that the alarm information is from the nested second NSSI.

In one embodiment, the method 1000 further includes: sending, by the first network device, status feedback information for the network slice subnet instance to the second network device, where the status feedback information for the network slice subnet instance is used to indicate a result of measuring and/or monitoring the performance of the network slice subnet instance.

Figure 15:
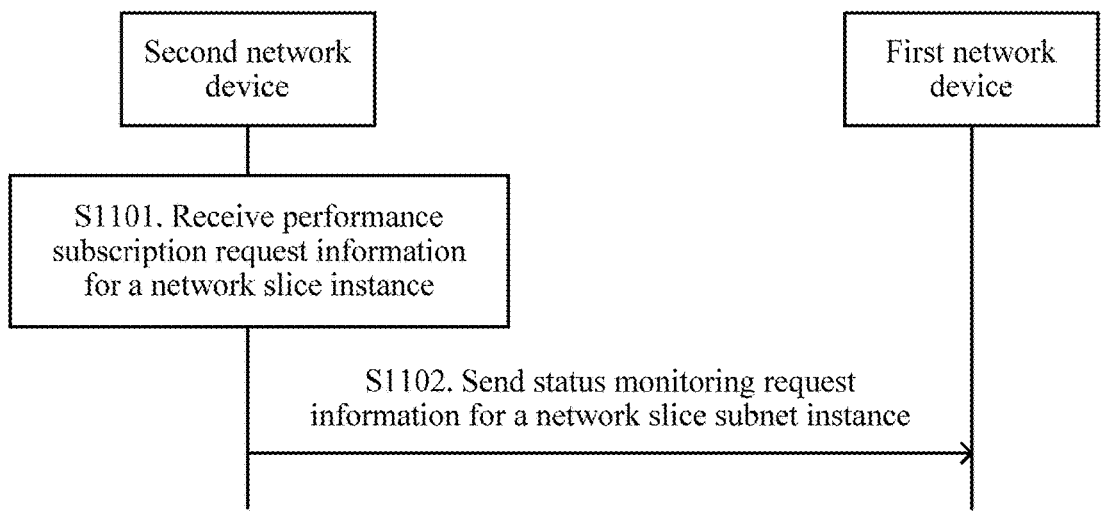
FIG. 15 is a schematic diagram of a communication method according to another embodiment of this application.

FIG. 15 is a schematic flowchart of a communication method 1100 according to an embodiment of this application. The method 1100 describes a method for monitoring performance of a network slice instance. The method 1100 is applicable to the network management system 10 shown in FIG. 1. The method 1100 may be performed by a second network device. For brevity, content in the method 1100 that is the same as or similar to that in the foregoing description is not described herein again. A first network device in the method 1100 may include an NSSMF module in the network management system 10. The second network device in the method 1100 may include the NSMF module in the network architecture 100. A third network device in the method 1100 may include an NSSMF module in the network management system 10. The method 1100 includes the following operations.

S1101. The second network device that manages a network slice instance receives performance subscription request information for the network slice instance, where the performance subscription request information for the network slice instance is used to request to obtain performance information of the network slice instance, and the network slice instance includes the network slice subnet instance.

S1102. The second network device sends status monitoring request information for the network slice subnet instance to the first network device that manages the network slice subnet instance, where the status monitoring request information for the network slice subnet instance is used to instruct to measure and/or monitor performance of the network slice subnet instance, and the status monitoring request information for the network slice subnet instance is determined based on the performance subscription request information for the network slice instance.

In this embodiment of this application, the second network device that manages the network slice instance does not need to monitor performance information of a network function and/or a nested network slice subnet instance that are/is included in the network slice subnet instance, and the second network device autonomously generates the status monitoring request information for the network slice subnet instance based on the performance subscription request information for the network slice instance, and sends the status monitoring request information to the first network device that manages the network slice subnet instance, thereby implementing hierarchical management of the network slice instance, reducing network slice instance management complexity, and improving network slice instance management efficiency.

In one embodiment, in the method 1100, the network slice subnet instance further includes a nested network slice subnet instance. The method further includes: sending, by the second network device, status monitoring request information for the nested network slice subnet instance to the third network device that manages the nested network slice subnet instance, where the status monitoring request information for the nested network slice subnet instance is used to instruct to measure and/or monitor performance of the nested network slice subnet instance.

In one embodiment, the method 1100 further includes: receiving, by the second network device, status monitoring feedback information for the nested network slice subnet instance sent by the third network device, where the status feedback information for the nested network slice subnet instance is used to indicate a result of measuring and/or monitoring the performance of the nested network slice subnet instance.

In one embodiment, the method 1100 further includes: receiving, by the second network device, status feedback information for the network slice subnet instance sent by the first network device, where the status feedback information for the network slice subnet instance is used to indicate a result of measuring and/or monitoring the performance of the network slice subnet instance.

Figure 16:
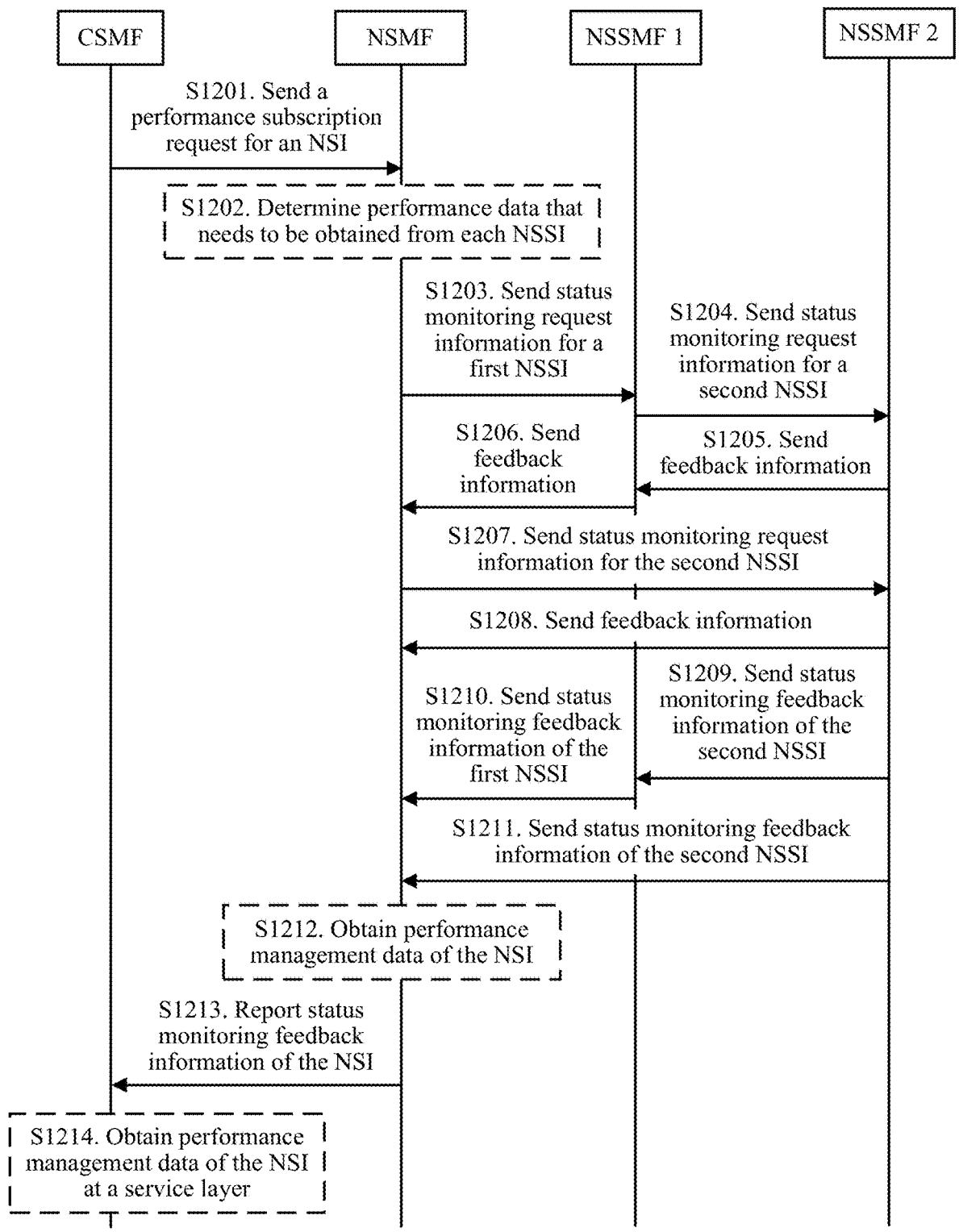
FIG. 16 is a schematic diagram of a communication method according to another embodiment of this application.

In a specific example, FIG. 16 is a schematic flowchart of a communication method 1200 according to an embodiment of this application. The method 1200 may be used for the network management system 10 shown in FIG. 1. FIG. 16 shows a process of modifying a network slice instance. The first network device in the method 1000 or the method 1100 may be a first NSSMF module. The second network device in the method 1000 or the method 1100 may be an NSMF module. The third network device in the method 1000 or the method 1100 may be a second NSSMF module.

As shown in FIG. 16, the method 1000 includes but is not limited to the following operations.

S1201. In one embodiment, a CSMF sends a performance subscription request for an NSI to the NSMF, where the performance subscription request for the NSI is used to request to obtain service-related management data, so as to know a service running status.

In one embodiment, the performance subscription request for the NSI may be sent simultaneously with a request for creating the network slice instance, or may be sent after the NSI has run.

The subscription request for the NSI may include one or more pieces of the following content: an identifier of the NSI, an expected performance data type of the NSI, and other data indicating a meeting status of the service-level agreement (SLA).

In a specific example, when the NSI has run, the subscription request for the NSI may include an identifier of the NSI. If the NSI is not running, for example, when the subscription request for the NSI and the request for creating the NSI are simultaneously sent, the subscription request for the NSI may not include the identifier of the NSI.

In a specific example, the performance data type of the NSI may include a quality of service (QoS) parameter of service data of the NSI. The QoS parameter may include a latency, a jitter, a packet loss rate, an uplink/downlink rate, or the like.

In a specific example, the foregoing other data that indicates the SLA meeting status may include information such as a service expiration time, a call drop rate, and a start/end time or a time interval for obtaining performance management data.

S1202. The NSMF determines performance data that needs to be obtained from each NSSI.

In one embodiment, the NSMF may determine, based on the request of the CSMF and/or a slice management requirement of the NSMF, performance data that needs to be obtained from the NSSI. First, the NSMF may decide which NSI performance data needs to be obtained. For example, the performance data may include: a QoS parameter of a service supported by the NSI, and a resource occupation status of the NSI. The resource occupation status of the NSI may include data plane traffic, an amount of control plane signaling, and the like. Then, the NSMF may determine the performance data that needs to be obtained from each NSSI.

S1203. The NSMF sends status monitoring request information for an NSSI to the first NSSMF, where the status monitoring request information for the NSSI may instruct to measure and/or monitor performance of the network slice subnet instance.

In one embodiment, in a specific example, the status monitoring request information for the NSSI may include a performance measurement request for the NSSI or a performance monitoring request for the NSSI.

In a specific example, the performance measurement request for the NSSI may be used to request the first NSSMF to perform measurement in the NSSI. The performance measurement request for the NSI may include a performance measurement type of the NSSI, a load status of the NSSI, and measurement planning information of the NSSI. The performance measurement type of the NSI may instruct the first NSSMF to obtain performance measurement data of the NSI based on the measurement type. For example, the performance measurement type of the NSI may include a QoS parameter of service data. The QoS parameter may include a latency, a jitter, a packet loss rate, an uplink/downlink rate, or the like. The load status of the NSSI may include an amount of signaling, total data traffic, or the like. The measurement planning information of the NSSI may include a measurement time period, a measurement execution interval, a measurement result reporting time, and the like.

In a specific example, the performance monitoring request for the NSSI may be used to request the first NSSMF to monitor one or more performance parameters in the NSSI. For example, when the parameter exceeds a threshold, the first NSSMF may send an alarm message to the NSMF, and the performance monitoring request for the NSSI may include a monitoring parameter of the NSSI, a load status of the NSSI, a threshold of the parameter, or an alarm severity corresponding to the monitoring parameter of the NSSI. For example, the monitoring parameter of the NSSI may include a QoS parameter of service data. The QoS parameter includes a latency, a jitter, a packet loss rate, an uplink/downlink rate, or the like. The load status of the NSSI may include an amount of signaling, total data traffic, or the like.

In one embodiment, the status monitoring request information for the NSSI may further include an identifier of the NSI. When the NSSI is shared by a plurality of NSIs, the NSMF may request the first NSSMF to distinguish performance measurement data of different NSIs. The status monitoring request information for the NSSI may further include an identifier of the NSSI. When the NSSMF manages a plurality of NSSIs, the NSSI identifier may be used to indicate the NSSI for measurement.

In one embodiment, when a first NSSI includes a nested second NSSI, the nested NSSI can be managed in two manners. In the first manner (which may be referred to as option 1 in the following), the first NSSMF may manage the nested second NSSI. In the second manner (which may be referred to as option 2 in the following), the NSMF may manage the nested second NSSI. In the first manner, the first NSSMF is responsible for managing and monitoring performance of the nested second NSSI. In the second manner, the NSMF is responsible for managing and monitoring performance of the nested second NSSI.

S1204. When the management manner of option 1 is used, the first NSSMF sends status monitoring request information for the second NSSI to the second NSSMF, where the status monitoring request information for the second NSSI may be used to instruct to measure or monitor performance of the second NSSI. Content of the status monitoring request information for the second NSSI is similar to content of the status monitoring request information for the first NSSI in S1203. A difference lies in that the status monitoring request information for the second NSSI may not carry the NSI. In one embodiment, the status monitoring request information for the second NSSI may carry the identifier of the first NSSI, or may carry an identifier of an upper-layer NSSI of the nested NSSI.

S1205. When the management manner of option 1 is used, the second NSSMF sends feedback information to the first NSSMF, so as to feed back a result of creating a performance management/monitoring task for the nested second NSSI.

S1206. When the management manner of option 1 is used, after the first NSSMF successfully creates performance measurement and/or monitoring tasks in the first NSSI managed by the first NSSMF and the nested second NSSI, the first NSSMF sends feedback information to the NSMF, so as to feed back a message indicating that the performance management and monitoring task is successfully created in the first NSSI.

S1207. When the management manner of option 2 is used, the NSMF sends status monitoring request information for the second NSSI to the second NSSMF, where the status monitoring request information for the second NSSI may be used to instruct to measure or monitor performance of the second NSSI. Content of the status monitoring request information for the second NSSI is similar to content of the status monitoring request information for the first NSSI in S1203.

S1208. When the management manner of option 2 is used, the second NSSMF sends feedback information to the NSMF, so as to feed back a message indicating that a performance management and/or monitoring task is successfully created in the second NSSI.

In one embodiment, both the NSMF and the first NSSMF may obtain measurement data of the nested second NSSI.

S1209. When the management manner of option 1 is used, based on the status monitoring request information for the second NSSI in S1204, the second NSSMF obtains performance data of the first NSSI, or monitors a performance parameter, and sends status monitoring feedback information to the first NSSMF to feed back performance measurement data of the nested second NSSI.

In one embodiment, the status monitoring feedback information may include the performance measurement data or monitoring data of the second NSSI. Alternatively, the status monitoring feedback information may further include alarm information.

In a specific example, the second NSSMF may report the performance measurement data of the second NSSI to the first NSSMF in a specified time period. The performance measurement data of the second NSSI may include a measurement result of the performance of the second NSSI. For example, the performance measurement data of the second NSSI may include a QoS measurement result of a service of the second NSSI and a load status in the nested second NSSI. Alternatively, the status monitoring feedback information may further include an identifier of the nested second NSSI, so as to indicate that the performance measurement data is from the second NSSI.

In a specific example, when detecting, through monitoring, that a monitoring parameter exceeds a specified threshold, the second NSSMF may report alarm information. The alarm information may include a specific performance parameter, a specific threshold description, and an alarm severity description. In one embodiment, the alarm information may further include an identifier of the nested second NSSI, so as to indicate that the alarm information is from the nested second NSSI.

S1210. The first NSSMF sends status monitoring feedback information for the first NSSI to the NSMF, so as to feed back performance measurement data of the first NSSI.

In one embodiment, the status monitoring feedback information may include the performance measurement data or monitoring data of the first NSSI. Alternatively, the status monitoring feedback information may further include alarm information.

In a specific example, the first NSSMF may report the performance measurement data of the first NSSI to the NSMF in a specified time period. The performance measurement data of the first NSSI may include a measurement result of the performance of the first NSSI. For example, the performance measurement data of the first NSSI may include a QoS measurement result of a service of the first NSSI and a load status in the first NSSI. Alternatively, the status monitoring feedback information may further include an identifier of the first NSSI, so as to indicate that the performance measurement data is from the first NSSI.

In a specific example, when detecting, through monitoring, that a monitoring parameter exceeds a specified threshold, the first NSSMF may report alarm information, where the alarm information may include a specific performance parameter, a specific threshold description, and an alarm severity description. In one embodiment, the alarm information may further include the identifier of the first NSSI, so as to indicate that the alarm information is from the first NSSI.

S1211. When the management manner of option 2 is used, the second NSSMF sends status monitoring feedback information for the second NSSI to the NSMF.

In one embodiment, the status monitoring feedback information may include performance measurement data or monitoring data of the second NSSI. Alternatively, the status monitoring feedback information may further include alarm information.

In a specific example, the second NSSMF may report the performance measurement data of the second NSSI to the first NSSMF in a specified time period. The performance measurement data of the second NSSI may include a measurement result of the performance of the second NSSI. For example, the performance measurement data of the second NSSI may include a QoS measurement result of a service of the second NSSI and a load status in the nested second NSSI. Alternatively, the status monitoring feedback information may further include an identifier of the nested second NSSI, so as to indicate that the performance measurement data is from the second NSSI.

In a specific example, when detecting, through monitoring, that a monitoring parameter exceeds a specified threshold, the second NSSMF may report alarm information. The alarm information may include a specific performance parameter, a specific threshold description, and an alarm severity description. In one embodiment, the alarm information may further include an identifier of the nested second NSSI, so as to indicate that the alarm information is from the nested second NSSI.

S1212. After receiving status monitoring feedback information from all NSSIs, the NSMF integrates data and associates the data with the NSI, to obtain performance data of the NSI.

In a specific example, the NSMF may obtain a latency of services in the entire NSI based on a latency of a service in each NSSI. Alternatively, the NSMF may obtain bottleneck bandwidth of the entire NSI based on bandwidth of the service in each NSSI. In addition, the NSMF may further obtain performance management data of an NSI service level, for example, QoS data of a service supported by the NSI.

S1213. In one embodiment, the NSMF may report status monitoring feedback information of the NSI to the CSMF based on the performance subscription request for the NSI in S1201, where the status monitoring feedback information for the NSI may include one or more pieces of the following content: the identifier of the NSI, and the obtained performance data of the NSI, the performance data of the NSI may include measurement data or alarm information of the NSI.

S1214. The CSMF obtains the performance management data of the NSI service level based on the status monitoring feedback information for the NSI reported by the NSMF. For example, the performance management data of the NSI service level may include a QoS assurance status obtained for each service of the NSI.

Figure 17:
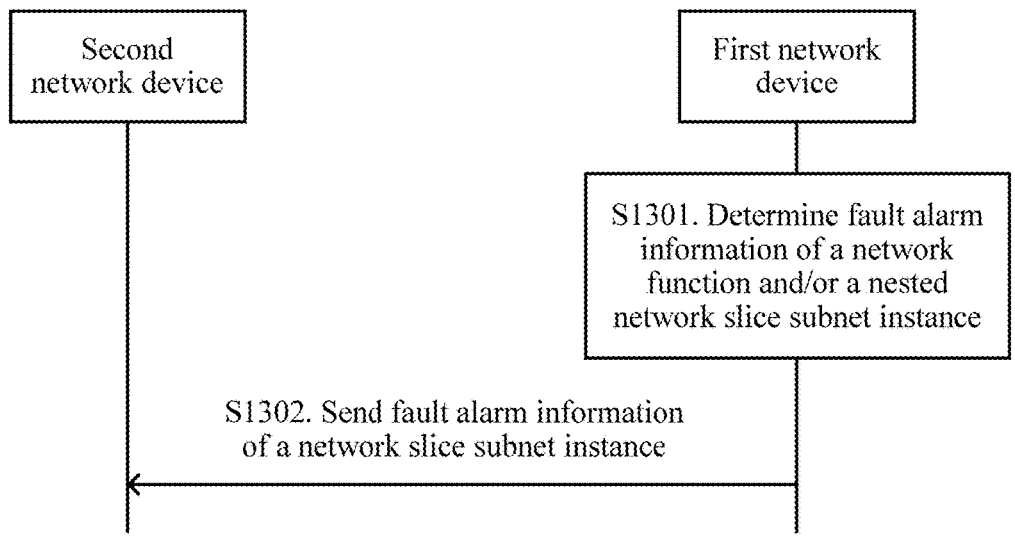
FIG. 17 is a schematic diagram of a communication method according to another embodiment of this application.

FIG. 17 is a schematic flowchart of a communication method 1300 according to an embodiment of this application. The method 1300 describes a method for managing a fault of a network slice instance. The method 1300 is applicable to the network management system 10 shown in FIG. 1. The method 1300 may be performed by a first network device. For brevity, content in the method 1300 that is the same as or similar to that in the foregoing description is not described herein again. The first network device in the method 1300 may include an NSSMF module in the network management system 10. A second network device in the method 1300 may include the NSMF module in the network architecture 100. A third network device in the method 1300 may include an NSSMF module in the network management system 10. A fourth network device in the method 1300 may include the CSMF module in the network management system 10. The method 1300 includes the following operations.

S1301. The first network device that manages a network slice subnet instance determines fault alarm information of a network function and/or a nested network slice subnet instance, where the fault alarm information of the network function and/or the nested network slice subnet instance is used to indicate that the network function and/or the nested network slice subnet instance that are/is included in the network slice subnet instance are/is faulty.

S1302. The first network device sends fault alarm information of the network slice subnet instance to the second network device that manages the network slice instance, where the network slice instance includes the network slice subnet instance, and the fault alarm information of the network slice subnet instance is used to indicate that the network slice subnet instance is faulty.

In this embodiment of this application, the second network device that manages the network slice instance does not need to perceive fault information of the network function and/or the nested network slice subnet instance that are/is included in the network slice subnet instance, and after obtaining the fault alarm information of the network function and/or the nested network slice subnet instance, the first network device that manages the network slice subnet instance autonomously generates the fault alarm information of the network slice subnet instance, and sends the fault alarm information to the second network device, thereby implementing hierarchical management of the network slice instance, reducing network slice instance management complexity, and improving network slice instance management efficiency.

In one embodiment, when the NSSI includes the nested NSSI, the nested NSSI can be managed in two manners. In the first manner (which may be referred to as option 1 in the following), the first network device may manage the nested NSSI. In the second manner (which may be referred to as option 2 in the following), the second network device may manage the nested NSSI. In the first manner, the first network device is responsible for fault management of the nested NSSI. In the second manner, the second network device is responsible for fault management of the nested NSSI.

In one embodiment, in the method 1300, the first network device receives alarm reporting request information for the network slice subnet instance from the second network device that manages the network slice instance, where the alarm reporting request information for the network slice subnet instance is used to instruct the first network device to report the fault alarm information of the network slice subnet instance.

In one embodiment, the method 1300 further includes: The first network device receives alarm reporting request information for the network slice subnet instance from the second network device that manages the network slice instance, where the alarm reporting request information for the network slice subnet instance is used to instruct the first network device to report the fault alarm information of the network slice subnet instance.

Figure 18:
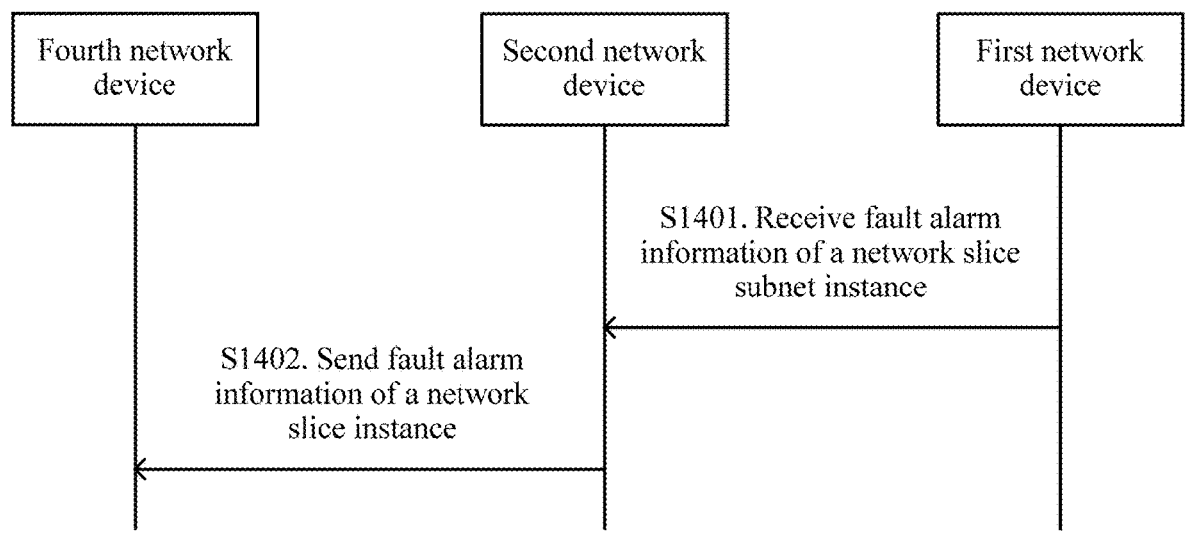
FIG. 18 is a schematic diagram of a communication method according to another embodiment of this application.

FIG. 18 is a schematic flowchart of a communication method 1400 according to an embodiment of this application. The method 1400 describes a method for managing a fault of a network slice instance. The method 1400 is applicable to the network management system 10 shown in FIG. 1. The method 1400 may be performed by a second network device. For brevity, content in the method 1400 that is the same as or similar to that in the foregoing description is not described herein again. A first network device in the method 1400 may include an NSSMF module in the network management system 10. The second network device in the method 1400 may include the NSMF module in the network architecture 100. A third network device in the method 1400 may include an NSSMF module in the network management system 10. A fourth network device in the method 1400 may include the CSMF module in the network management system 10. The method 1400 includes the following operations.

S1401. The second network device that manages a network slice instance receives fault alarm information of a network slice subnet instance sent by the first network device that manages the network slice subnet instance, where the fault alarm information of the network slice subnet instance is used to indicate that the network slice subnet instance is faulty, and the network slice instance includes the network slice subnet instance.

S1402. The second network device sends fault alarm information of the network slice instance to the fourth network device, where the fault alarm information of the network slice instance is used to indicate that the network slice instance is faulty.

The second network device that manages the network slice instance does not need to perceive fault information of the network function and/or the nested network slice subnet instance that are/is included in the network slice subnet instance. After receiving the fault alarm information of the network slice subnet instance sent by the first network device, the second network device autonomously generates the fault alarm information of the network slice subnet instance, and sends the fault alarm information to the fourth network device, thereby implementing hierarchical management of the network slice instance, reducing network slice instance management complexity, and improving network slice instance management efficiency.

In one embodiment, the method 1400 further includes: receiving, by the second network device, fault subscription request information for the network slice instance from the fourth network device, where the fault subscription request information for the network slice instance is used to request to obtain the fault alarm information of the network slice instance; generating, by the second network device, alarm reporting request information for the network slice subnet instance based on the fault subscription request information for the network slice instance, where the alarm reporting request information for the network slice subnet instance is used to instruct the first network device to report the fault alarm information of the network slice subnet instance; and sending, by the second network device, the alarm reporting request information for the network slice subnet instance to the first network device.

Figure 19:
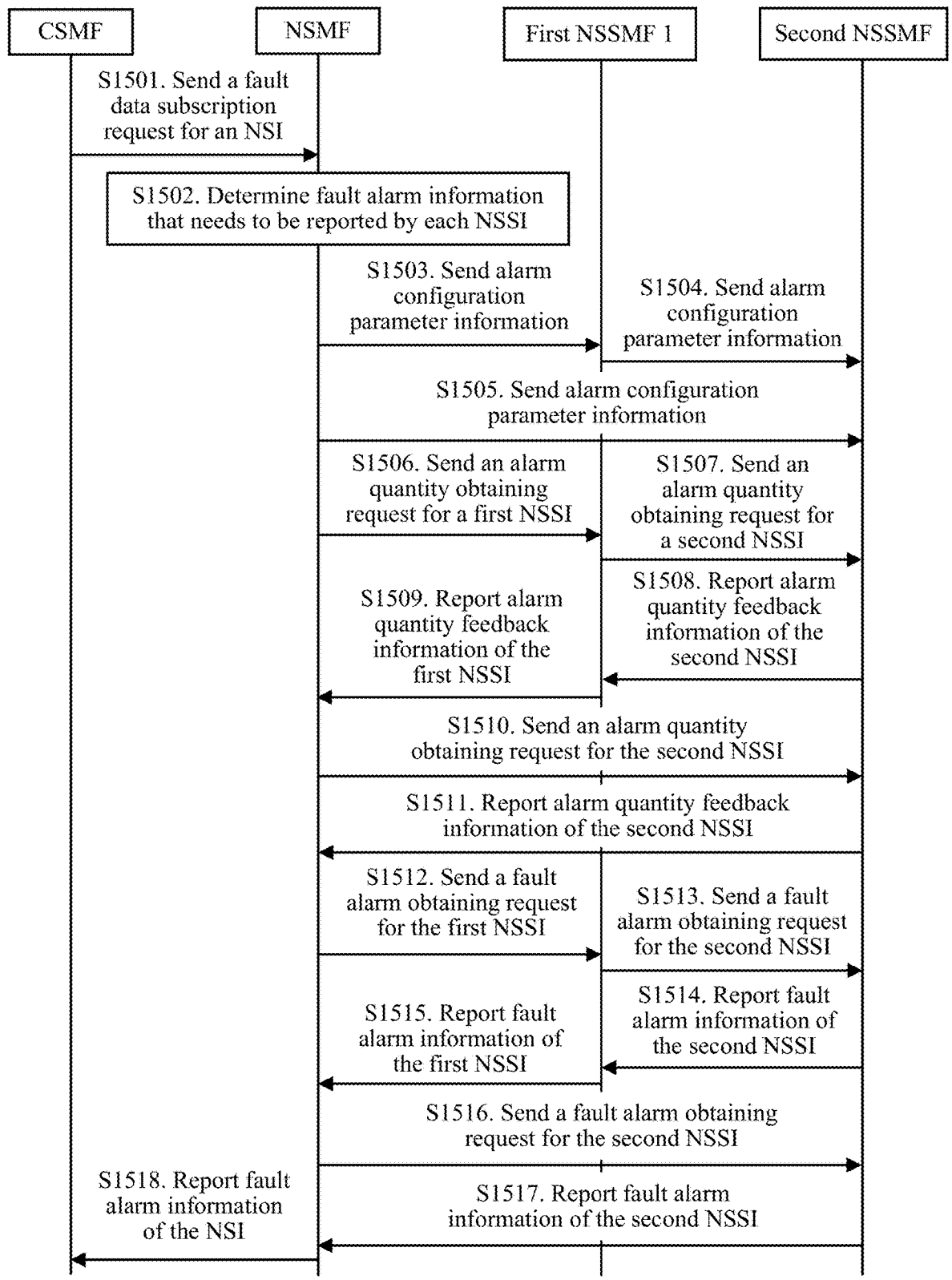
FIG. 19 is a schematic diagram of a communication method according to another embodiment of this application.

In a specific example, FIG. 19 is a schematic flowchart of a communication method 1500 according to an embodiment of this application. The method 1500 may be used for the network management system 10 shown in FIG. 1. FIG. 19 shows a process of managing a fault of a network slice instance. The first network device in the method 1300 or the method 1400 may be a first NSSMF module. The second network device in the method 1300 or the method 1400 may be an NSMF module. The third network device in the method 1300 or the method 1400 may be a second NSSMF module.

As shown in FIG. 19, the method 1500 includes but is not limited to the following operations.

S1501. In one embodiment, a CSMF sends a fault data subscription request for an NSI to the NSMF.

In a specific example, when an operator or a third-party tenant expects to know fault data of the NSI, the operator or the third-party tenant may send the fault data subscription request for the network slice to the CSMF. In this case, the CSMF may send the fault data subscription requirement for the NSI to the NSMF. A requirement for the NSI includes at least one piece of the following content: an identity of the network slice instance, a frequency and timeliness of reporting fault data, and content required for fault data. The content required for the fault data may include a fault source, a fault occurrence time, a severity, impact on a service, a recommended repair method, and the like.

S1502. The NSMF determines, based on a fault management requirement for the NSI and a fault data subscription requirement of the operator or the third-party tenant for the NSI, fault alarm information that needs to be obtained from each NSSI.

S1503. The NSMF sends alarm configuration parameter information to the first NSSMF, where the alarm configuration parameter information is used to configure an alarm configuration parameter of a first NSSI managed by the first NSSMF.

In an example, the alarm configuration parameter information may include a method for calculating a value of a parameter and/or a parameter in a fault alarm. A configurable alarm parameter indicated by the alarm configuration parameter information includes at least one of the following: an identity of the first NSSI, an identity of a network slice instance affected by a fault (when the first NSSI is a shared NSSI, the fault may affect only an individual NSI), an identity of a network function in which a fault occurs in the first NSSI, an action taken by the first NSSMF on the fault, an SLA impact of the fault on the first NSSI (when the first NSSI is a shared NSSI, the first NSSI needs to meet different SLA requirements of a plurality of NSIs, and an impact of the fault on each NSI may be different; herein, there may be a plurality of SLA impacts corresponding to NSIs), an identifier of a monitored abnormal performance parameter, an abnormal performance indicator, a threshold for determining whether a performance indicator is abnormal, a fault change trend, a feasible repairing method, and the like.

In a specific example, the first NSSMF may execute the fault alarm configuration. After the first NSSI is faulty, the first NSSMF generates a fault alarm of the first NSSI based on the fault alarm configuration and stores the fault alarm in an alarm list. When the fault is repaired, the first NSSMF may clear the corresponding fault alarm from the fault list.

In a specific example, the NSMF may send the fault alarm configuration information to the first NSSMF when any one of the following cases occurs: A life cycle of the network slice instance or a network slice subnet instance included in the network slice instance changes, for example, the NSI or an NSSI is created, modified, or terminated; another event that changes a fault management requirement for a network slice occurs, for example, a subscription requirement of a third-party tenant for fault data changes, and a reliability requirement of a service for the network slice changes.

In one embodiment, when the first NSSI includes a nested second NSSI, the nested NSSI can be managed in two manners. In the first manner (which may be referred to as option 1 in the following), the first NSSMF may manage the nested second NSSI. In the second manner (which may be referred to as option 2 in the following), the NSMF may manage the nested second NSSI. In the first manner, the first NSSMF is responsible for managing and monitoring performance of the nested NSSI. In the second manner, the NSMF is responsible for managing and monitoring performance of the nested second NSSI.

S1504. When the management manner of option 1 is used, the first NSSMF sends alarm parameter configuration information to the second NSSMF, where the alarm parameter configuration information is used to configure an alarm parameter of the nested second NSSI managed by the second NSSMF.

In one embodiment, the first NSSMF may configure a parameter in a fault alarm generated by the second NSSMF based on the fault management requirement for the first NSSI.

In a specific example, a configurable alarm parameter indicated by the alarm configuration parameter information includes at least one of the following: an identity of the second NSSI, an identity of a network slice instance affected by a fault (the nested second NSSI may be nested by a plurality of NSSIs at the same time, and a fault of the second NSSI may affect only an individual NSSI), an identity of a network function in which a fault occurs in the second NSSI, an action taken by the second NSSMF on the fault, an SLA impact of the fault on the second NSSI (the nested second NSSI may be nested by a plurality of NSSIs at the same time, and needs to meet different SLA requirements of a plurality of NSIs in this case; an impact of the fault on each NSI may be different, and herein, there may be a plurality of SLA impacts corresponding to the sharing NSIs), an identifier of a monitored abnormal performance parameter, a specific abnormal performance indicator, a threshold for determining whether the indicator is abnormal, a fault change trend, a feasible repairing method, and the like.

In one embodiment, the second NSSMF performs the fault alarm configuration. After the second NSSI is faulty, the second NSSMF may generate a fault alarm of the second NSSI based on the fault alarm configuration and store the fault alarm in an alarm list. When the fault is repaired, the second NSSMF may clear the corresponding fault alarm from the fault list.

S1505. When the management manner of option 2 is used, the NSMF directly sends alarm parameter configuration information to the second NSSMF, where the alarm parameter configuration information is used to configure an alarm parameter of the nested second NSSI managed by the second NSSMF.

In one embodiment, content of the alarm parameter configuration information may be the same as content of the alarm parameter configuration information in S1504.

In one embodiment, after the network function in the network slice subnet instance is faulty, the second NSSMF generates a fault alarm of the network function and reports the fault alarm to the NSMF. The NSMF may generate a fault alarm of the network slice subnet instance based on the fault alarm of the network function, and store the fault alarm of the network slice subnet instance in a local fault alarm list.

S1506. In one embodiment, the NSMF may send an alarm quantity obtaining request to the first NSSMF, where the alarm quantity obtaining request may include an alarm filter, and the alarm filter may set a filtering condition for any one or more parameters in alarm information. In one embodiment, when the second NSSI is nested in the first NSSI, the alarm quantity obtaining request may further be used to obtain an alarm quantity of the nested second NSSI. Similarly, the obtaining an alarm quantity of the nested second NSSI may also include a filter. The filter may be the same as or different from the filter corresponding to the first NSSI.

S1507. In one embodiment, the first NSSMF may send an alarm quantity obtaining request to the second NSSMF, so as to request to obtain an alarm quantity of the second NSSI, where the request may include an alarm filter.

S1508. After receiving the alarm quantity obtaining request, the second NSSMF reports alarm quantity feedback information for the second NSSI to the first NSSMF, to report a quantity of alarms that meet a filtering condition (or that are not filtered out) in the alarm list.

S1509. The first NSSMF reports alarm quantity feedback information for the first NSSI to the NSMF, and reports a quantity of alarms that meet a filtering condition (that are not filtered out) in the alarm list, where the alarm quantity feedback information for the first NSSI may include the alarm quantity feedback information for the second NSSI.

S1510. When the management manner of option 2 is used, the NSMF may directly send an alarm quantity obtaining request to the second NSSMF, to obtain an alarm quantity of the second NSSI, where the request may include an alarm filter.

S1511. After receiving the alarm quantity obtaining request, the second NSSMF directly reports, to the NSMF, a quantity of alarms that meet a filtering condition (that are not filtered out) in the alarm list.

S1512. The NSMF sends a fault alarm obtaining request for the first NSSI to the first NSSMF, where the fault alarm obtaining request is used to request to obtain fault alarm information of the first NSSI.

In one embodiment, the fault alarm obtaining request may include an alarm filter, and the alarm filter may set a filtering condition for any one or more parameters in alarm information.

In one embodiment, when the first NSSI includes the nested second NSSI, the fault alarm obtaining request may further be used to obtain alarm information of the nested second NSSI. Similarly, the obtaining alarm information of the nested second NSSI may also include a filter. The filter may be the same as or different from the filter corresponding to the nested first NSSI.

It should be noted that the fault alarm obtaining request may instruct the first NSSMF to report alarm information that meets a condition in an existing alarm list of the first NSSI immediately after receiving the alarm information obtaining request (or synchronous reporting), or may instruct the first NSSMF to report alarm information that meets a condition immediately when generating new alarm information of the first NSSI (or asynchronous reporting).

S1513. When the management manner of option 1 is used, the first NSSMF sends a fault alarm obtaining request for the second NSSI to the second NSSMF, where the fault alarm obtaining request for the second NSSI is used to request to obtain alarm information of the second NSSI, where the fault alarm obtaining request may include an alarm filter, the alarm filter may set a filtering condition for any one or more parameters in the alarm information.

S1514. The second NSSMF reports fault alarm information of the second NSSI that meets a filtering condition (that is not filtered out) in the alarm list to the first NSSMF.

In one embodiment, the second NSSMF may report the fault alarm information of the second NSSI in a synchronous or asynchronous manner.

S1515. The first NSSMF reports fault alarm information of the first NSSI that meets a filtering condition (that is not filtered out) in the alarm list to the NSMF.

S1516. In one embodiment, when the management manner of option 2 is used, the NSMF may directly send a fault alarm obtaining request for the second NSSI to the second NSSMF, so as to obtain the fault alarm information of the second NSSI, where the fault alarm obtaining request for the second NSSI may include an alarm filter.

S1517. When the management manner of option 2 is used, after receiving the fault alarm obtaining request, the second NSSMF directly reports, to the NSMF, fault alarm information of the second NSSI that meets a filtering condition (that is not filtered out) in the alarm list.

S1518. After receiving fault alarm information reported by each NSSMF, the NSMF analyzes the fault alarm information and integrates the fault alarm information into fault alarm information of the NSI, and reports the fault alarm information of the NSI to the CSMF.

The foregoing describes the communication method and the network management architecture of the embodiments of this application in detail with reference to FIG. 1 to FIG. 19. The following describes the network device of the embodiments of this application in detail with reference to FIG. 20 to FIG. 39.

Figure 20:
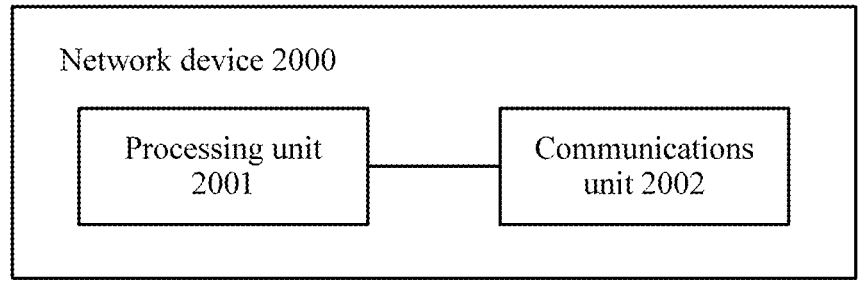
FIG. 20 is a schematic diagram of a network device according to an embodiment of this application.

FIG. 20 is a schematic block diagram of a network device 2000 according to an embodiment of this application. It should be understood that the network device 2000 can perform operations performed by the first network device in the methods in FIG. 1 to FIG. 19. To avoid repetition, details are not described herein again. The network device 2000 includes a processing unit 2001 and a communications unit 2002.

The processing unit 2001 is configured to receive, by using the communications unit 2002, requirement description information of the network slice subnet instance from a second network device that manages a network slice instance, where the requirement description information of the network slice subnet instance is used to indicate a service requirement for the network slice subnet instance, and the network slice instance includes the network slice subnet instance; and create or configure the network slice subnet instance based on configuration information of the network slice subnet instance, where the configuration information of the network slice subnet instance is determined based on the requirement description information of the network slice subnet instance.

Figure 21:
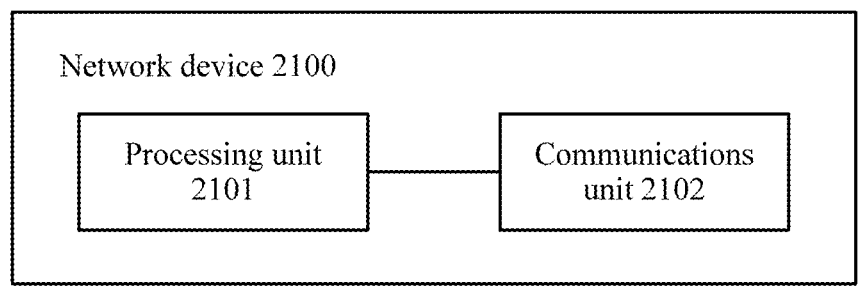
FIG. 21 is a schematic diagram of a network device according to another embodiment of this application.

FIG. 21 is a schematic block diagram of a network device 2100 according to an embodiment of this application. It should be understood that the network device 2100 can perform operations performed by the second network device in the methods in FIG. 1 to FIG. 19. To avoid repetition, details are not described herein again. The network device 2100 includes a processing unit 2101 and a communications unit 2102.

The processing unit 2101 is configured to: receive, by using the communications unit 2102, requirement description information of the network slice instance, where the requirement description information of the network slice instance is used to indicate a service requirement for the network slice instance; and send, by using the communications unit 2102, requirement description information of the network slice subnet instance to a first network device that manages the network slice subnet instance, so that the first network device creates or configures the network slice subnet instance, and the requirement description information of the network slice subnet instance is generated based on the requirement description information of the network slice instance.

Figure 22:
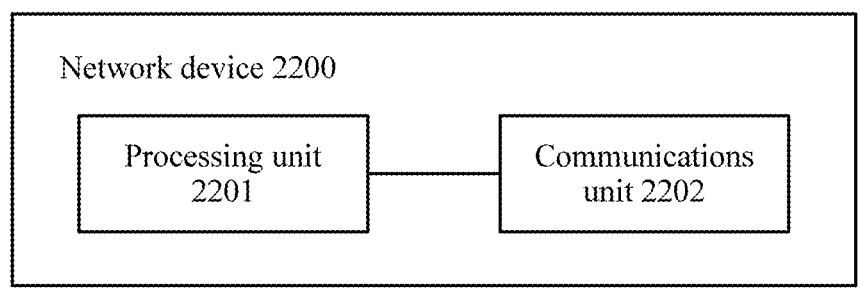
FIG. 22 is a schematic diagram of a network device according to another embodiment of this application.

FIG. 22 is a schematic block diagram of a network device 2200 according to an embodiment of this application. It should be understood that the network device 2200 can perform operations performed by the first network device in the methods in FIG. 1 to FIG. 19. To avoid repetition, details are not described herein again. The network device 2200 includes a processing unit 2201 and a communications unit 2202.

The processing unit 2201 is configured to receive, by using the communications unit 2202, termination request information for the network slice subnet instance from a second network device that manages a network slice instance, where the termination request information for the network slice subnet instance is used to instruct to terminate the network slice subnet instance, and the network slice instance includes the network slice subnet instance; and when the network function and/or the nested network slice subnet instance need/needs to be terminated, send, by using the communications unit 2202, termination request information for the network function and/or the nested network slice subnet instance to a third network device that manages the network function and/or the nested network slice subnet instance, where the termination request information for the network function and/or the nested network slice subnet instance is used to request to terminate the network function and/or the nested network slice subnet instance.

Figure 23:
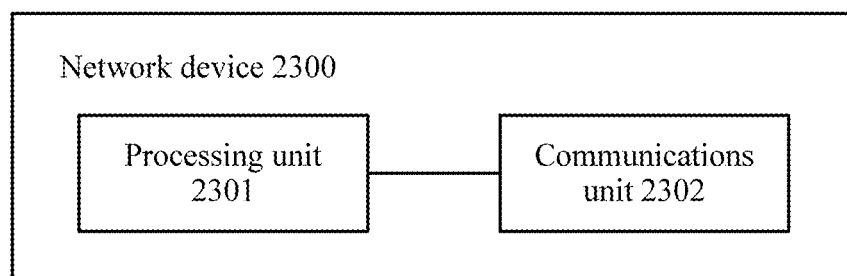
FIG. 23 is a schematic diagram of a network device according to another embodiment of this application.

FIG. 23 is a schematic block diagram of a network device 2300 according to an embodiment of this application. It should be understood that the network device 2300 can perform operations performed by the second network device in the methods in FIG. 1 to FIG. 19. To avoid repetition, details are not described herein again. The network device 2300 includes a processing unit 2301 and a communications unit 2302.

The processing unit 2301 is configured to receive termination request information for a network slice instance by using the communications unit 2302, where the termination request information for the network slice instance is used to request to terminate the network slice instance, the network slice instance includes a network slice subnet instance, and the network slice subnet instance includes a nested network slice subnet instance; and when the nested network slice subnet instance needs to be terminated, send, by using the communications unit 2302, termination request information for the nested network slice subnet instance to a third network device that manages the nested network slice instance, where the termination request information for the nested network slice subnet instance is used to request to terminate the nested network slice subnet instance.

Figure 24:
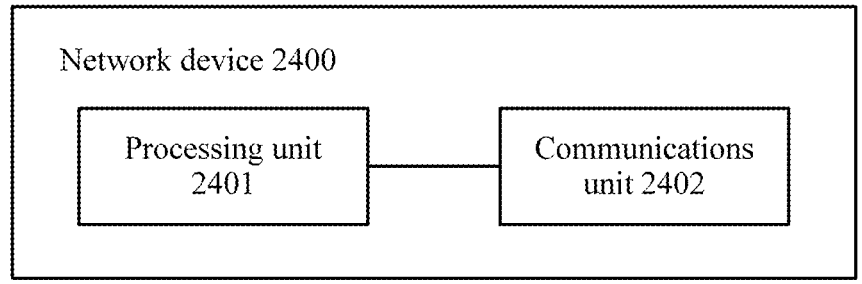
FIG. 24 is a schematic diagram of a network device according to another embodiment of this application.

FIG. 24 is a schematic block diagram of a network device 2400 according to an embodiment of this application. It should be understood that the network device 2400 can perform operations performed by the first network device in the methods in FIG. 1 to FIG. 19. To avoid repetition, details are not described herein again. The network device 2400 includes a processing unit 2401 and a communications unit 2402.

The processing unit 2401 is configured to receive, by using the communications unit 2402, modification requirement information for the network slice subnet instance from a second network device that manages a network slice instance, where the modification requirement information for the network slice subnet instance is used to indicate a service modification requirement for the network slice subnet instance, and the network slice instance includes the network slice subnet instance; and modify target configuration information of the network slice subnet instance based on the modification requirement information.

Figure 25:
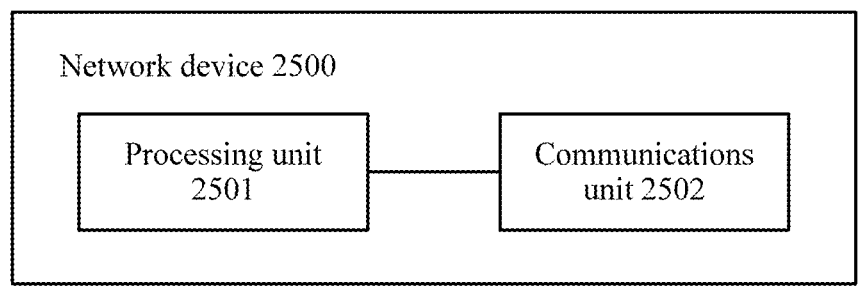
FIG. 25 is a schematic diagram of a network device according to another embodiment of this application.

FIG. 25 is a schematic block diagram of a network device 2500 according to an embodiment of this application. It should be understood that the network device 2500 can perform operations performed by the second network device in the methods in FIG. 1 to FIG. 19. To avoid repetition, details are not described herein again. The network device 2500 includes a processing unit 2501 and a communications unit 2502.

The processing unit 2501 is configured to determine modification requirement information for a network slice instance, where the modification requirement information for the network slice instance is used to indicate a modification requirement for the network slice instance, and the network slice instance includes the network slice subnet instance; and send, by using the communications unit 2502, modification requirement information for the network slice subnet instance to a first network device that manages the network slice subnet instance, so that the first network device modifies the network slice subnet instance, where the modification requirement information for the network slice subnet instance is used to indicate a modification requirement for the network slice subnet instance, and the modification requirement information for the network slice subnet instance is determined based on the modification requirement information for the network slice instance.

Figure 26:
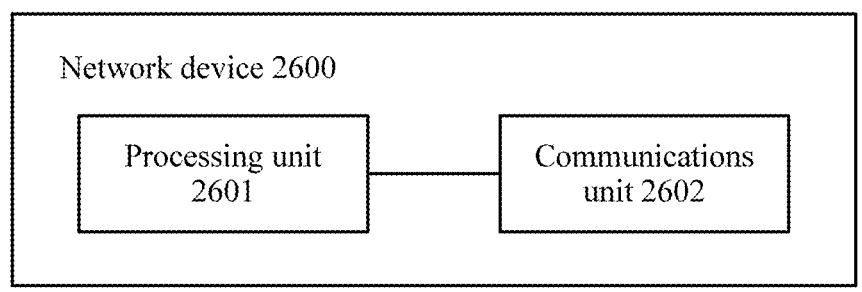
FIG. 26 is a schematic diagram of a network device according to another embodiment of this application.

FIG. 26 is a schematic block diagram of a network device 2600 according to an embodiment of this application. It should be understood that the network device 2600 can perform operations performed by the first network device in the methods in FIG. 1 to FIG. 19. To avoid repetition, details are not described herein again. The network device 2600 includes a processing unit 2601 and a communications unit 2602.

The processing unit 2601 is configured to: receive, by using the communications unit 2602, status monitoring request information for the network slice subnet instance from a second network device that manages a network slice instance, where the status monitoring request information for the network slice subnet instance is used to instruct to measure and/or monitor performance of the network slice subnet instance, the network slice instance includes the network slice subnet instance, and the network slice subnet instance includes a network function and/or a nested network slice subnet instance; and send, by using the communications unit 2602, status monitoring request information for the network function and/or the nested network slice subnet instance to a third network device that manages the network function and/or the nested network slice subnet instance, where the status monitoring request information for the network function and/or the nested network slice subnet instance is used to instruct to measure and/or monitor performance of the network function and/or the nested network slice subnet instance.

Figure 27:
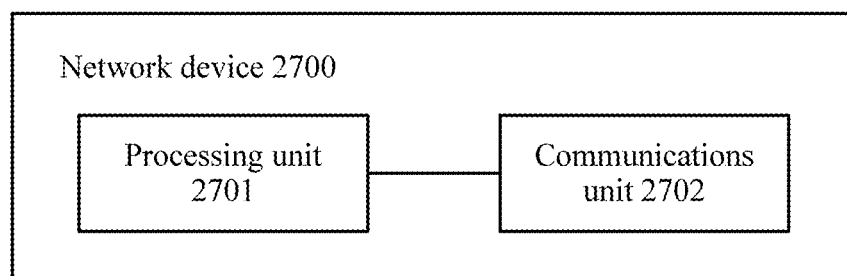
FIG. 27 is a schematic diagram of a network device according to another embodiment of this application.

FIG. 27 is a schematic block diagram of a network device 2700 according to an embodiment of this application. It should be understood that the network device 2700 can perform operations performed by the second network device in the methods in FIG. 1 to FIG. 19. To avoid repetition, details are not described herein again. The network device 2700 includes a processing unit 2701 and a communications unit 2702.

The processing unit 2701 is configured to receive performance subscription request information for a network slice instance by using the communications unit 2702, where the performance subscription request information for the network slice instance is used to request to obtain performance information of the network slice instance, and the network slice instance includes the network slice subnet instance; and send, by using the communications unit 2702, status monitoring request information for the network slice subnet instance to the first network device that manages the network slice subnet instance, where the status monitoring request information for the network slice subnet instance is used to instruct to measure and/or monitor performance of the network slice subnet instance, and the status monitoring request information for the network slice subnet instance is determined based on the performance subscription request information for the network slice instance.

Figure 28:
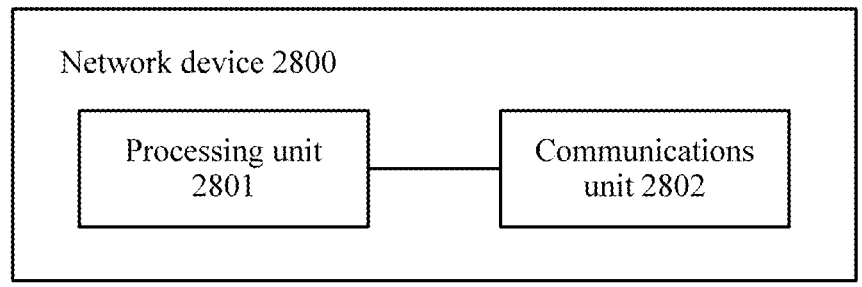
FIG. 28 is a schematic diagram of a network device according to another embodiment of this application.

FIG. 28 is a schematic block diagram of a network device 2800 according to an embodiment of this application. It should be understood that the network device 2800 can perform operations performed by the first network device in the methods in FIG. 1 to FIG. 19. To avoid repetition, details are not described herein again. The network device 2800 includes a processing unit 2801 and a communications unit 2802.

The processing unit 2801 is configured to determine fault alarm information of a network function and/or a nested network slice subnet instance, where the fault alarm information of the network function and/or the nested network slice subnet instance is used to indicate that the network function and/or the nested network slice subnet instance that are/is included in the network slice subnet instance are/is faulty; and send, by using the communications unit 2802, fault alarm information of the network slice subnet instance to a second network device that manages the network slice instance, where the network slice instance includes the network slice subnet instance, and the fault alarm information of the network slice subnet instance is used to indicate that the network slice subnet instance is faulty.

Figure 29:
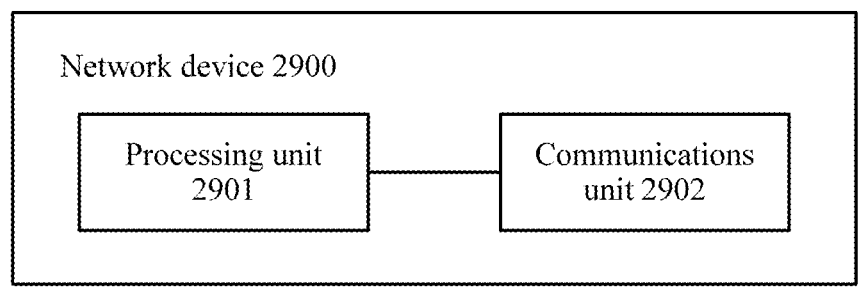
FIG. 29 is a schematic diagram of a network device according to another embodiment of this application.

FIG. 29 is a schematic block diagram of a network device 2900 according to an embodiment of this application. It should be understood that the network device 2900 can perform operations performed by the second network device in the methods in FIG. 1 to FIG. 19. To avoid repetition, details are not described herein again. The network device 2900 includes a processing unit 2901 and a communications unit 2902.

The processing unit 2901 is configured to receive, by using the communications unit 2902, fault alarm information of a network slice subnet instance sent by a first network device that manages the network slice subnet instance, where the fault alarm information of the network slice subnet instance is used to indicate that the network slice subnet instance is faulty, and the network slice instance includes the network slice subnet instance; and send fault alarm information of the network slice instance to a fourth network device by using the communications unit 2902, where the fault alarm information of the network slice instance is used to indicate that the network slice instance is faulty.

Figure 30:
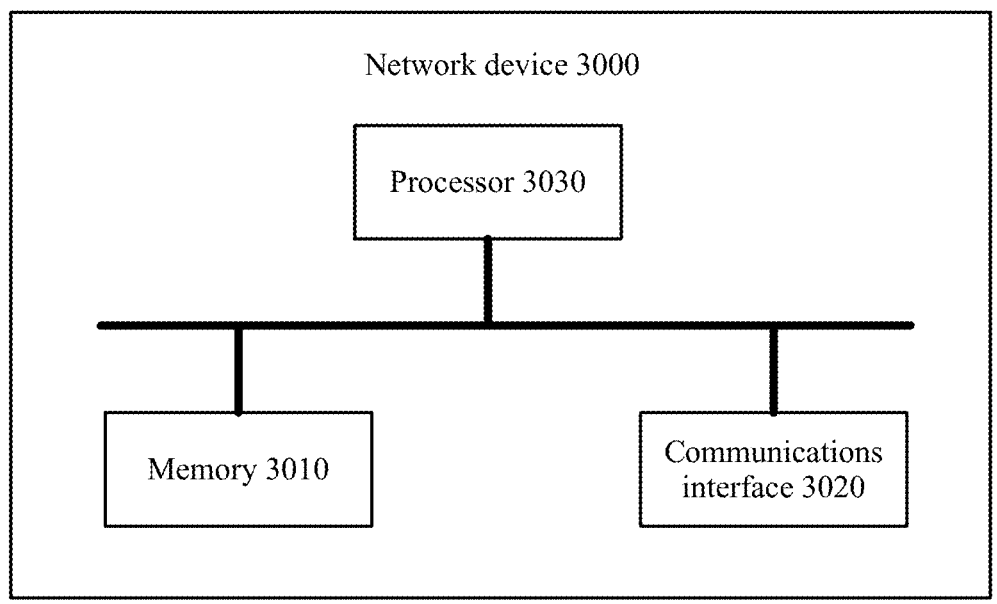
FIG. 30 is a schematic diagram of a network device according to another embodiment of this application.

FIG. 30 is a schematic block diagram of a network device 3000 according to an embodiment of this application. It should be understood that the network device 3000 can perform operations performed by the first network device in the methods in FIG. 1 to FIG. 19. To avoid repetition, details are not described herein again. The network device 3000 includes:

a memory 3010, configured to store a program;

a communications interface 3020, configured to communicate with another device; and a processor 3030, configured to execute the program in the memory 3010, where when the program is executed, the processor 3030 is configured to: receive, by using the communications interface 3020, requirement description information of the network slice subnet instance from a second network device that manages a network slice instance, where the requirement description information of the network slice subnet instance is used to indicate a service requirement for the network slice subnet instance, and the network slice instance includes the network slice subnet instance; and create or configure the network slice subnet instance based on configuration information of the network slice subnet instance, where the configuration information of the network slice subnet instance is determined based on the requirement description information of the network slice subnet instance.

Figure 31:
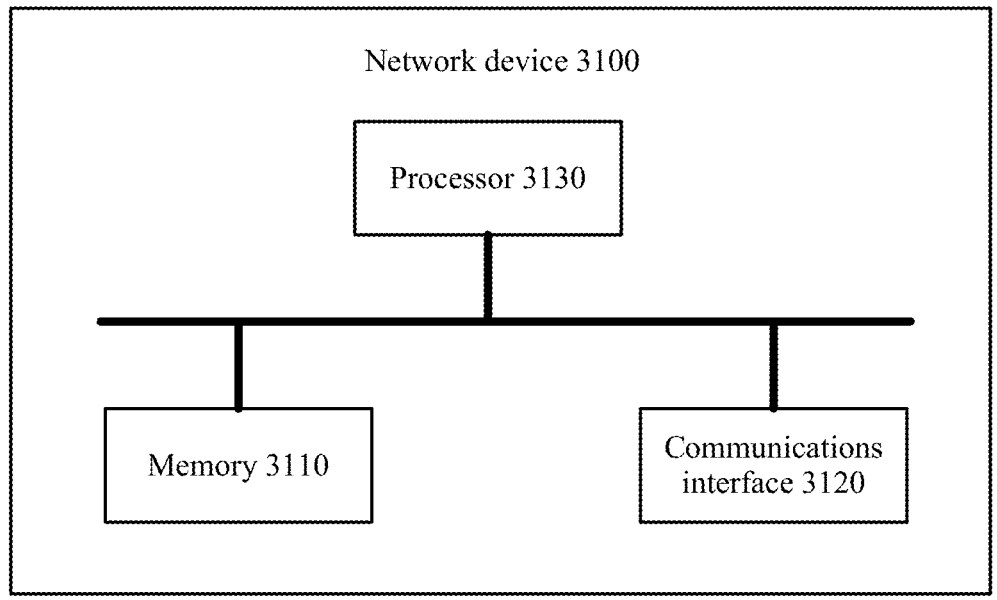
FIG. 31 is a schematic diagram of a network device according to another embodiment of this application.

FIG. 31 is a schematic block diagram of a network device 3100 according to an embodiment of this application. It should be understood that the network device 3100 can perform operations performed by the second network device in the methods in FIG. 1 to FIG. 19. To avoid repetition, details are not described herein again. The network device 3100 includes:

a memory 3110, configured to store a program;

a communications interface 3120, configured to communicate with another device; and a processor 3130, configured to execute the program in the memory 3110, where when the program is executed, the processor 3130 is configured to: receive requirement description information of the network slice instance by using the communications interface 3120, where the requirement description information of the network slice instance is used to indicate a service requirement for the network slice instance; and send, by using the communications interface 3120, requirement description information of the network slice subnet instance to a first network device that manages the network slice subnet instance, so that the first network device creates or configures the network slice subnet instance, where the requirement description information of the network slice subnet instance is generated based on the requirement description information of the network slice instance.

Figure 32:
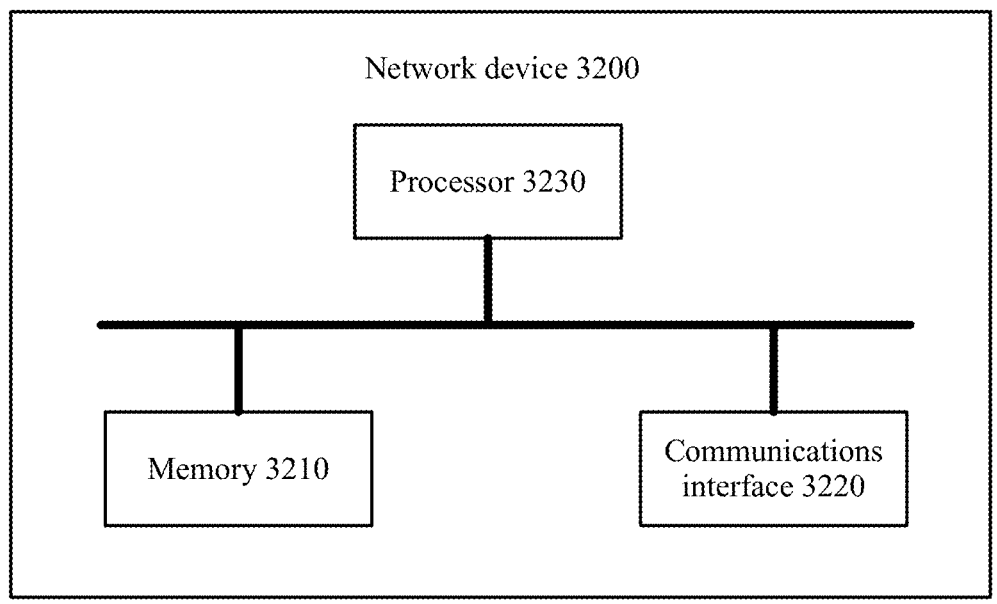
FIG. 32 is a schematic diagram of a network device according to another embodiment of this application.

FIG. 32 is a schematic block diagram of a network device 3200 according to an embodiment of this application. It should be understood that the network device 3200 can perform operations performed by the first network device in the methods in FIG. 1 to FIG. 19. To avoid repetition, details are not described herein again. The network device 3200 includes:

a memory 3210, configured to store a program;

a communications interface 3220, configured to communicate with another device; and a processor 3230, configured to execute the program in the memory 3210, where when the program is executed, the processor 3230 is configured to: receive, by using the communications interface 3220, termination request information for the network slice subnet instance from a second network device that manages a network slice instance, where the termination request information for the network slice subnet instance is used to instruct to terminate the network slice subnet instance, and the network slice instance includes the network slice subnet instance; and when the network function and/or the nested network slice subnet instance need/needs to be terminated, send, by using the communications interface 3220, termination request information for the network function and/or the nested network slice subnet instance to a third network device that manages the network function and/or the nested network slice subnet instance, where the termination request information for the network function and/or the nested network slice subnet instance is used to request to terminate the network function and/or the nested network slice subnet instance.

Figure 33:
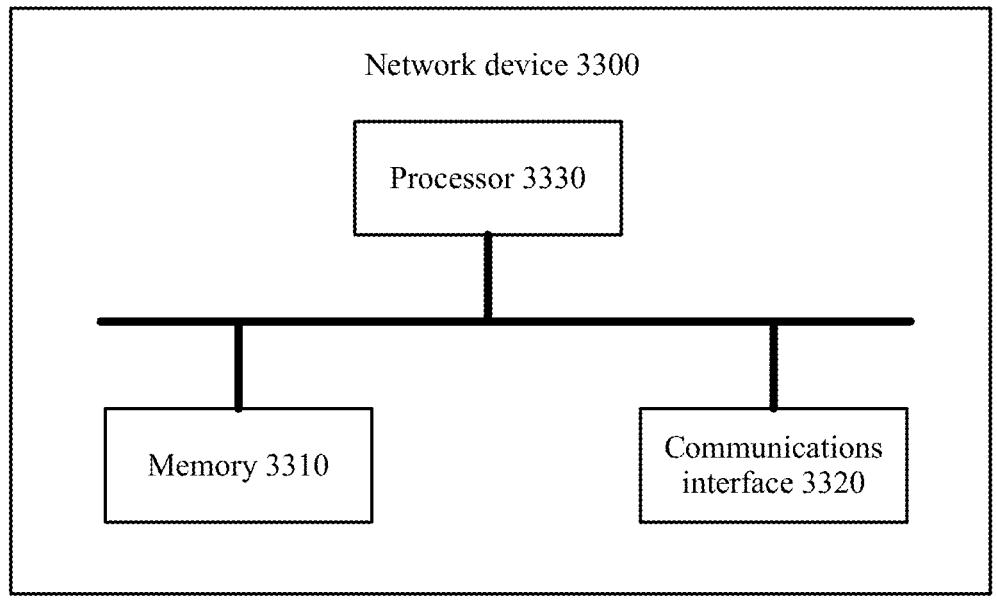
FIG. 33 is a schematic diagram of a network device according to another embodiment of this application.

FIG. 33 is a schematic block diagram of a network device 3300 according to an embodiment of this application. It should be understood that the network device 3300 can perform operations performed by the second network device in the methods in FIG. 1 to FIG. 19. To avoid repetition, details are not described herein again. The network device 3300 includes:

a memory 3310, configured to store a program;

a communications interface 3320, configured to communicate with another device; and a processor 3330, configured to execute the program in the memory 3310, where when the program is executed, the processor 3330 is configured to: receive termination request information for a network slice instance by using the communications interface 3320, where the termination request information for the network slice instance is used to request to terminate the network slice instance, the network slice instance includes a network slice subnet instance, and the network slice subnet instance includes a nested network slice subnet instance; and when the nested network slice subnet instance needs to be terminated, send, by using the communications interface 3320, termination request information for the nested network slice subnet instance to a third network device that manages the nested network slice instance, where the termination request information for the nested network slice subnet instance is used to request to terminate the nested network slice subnet instance.

Figure 34:
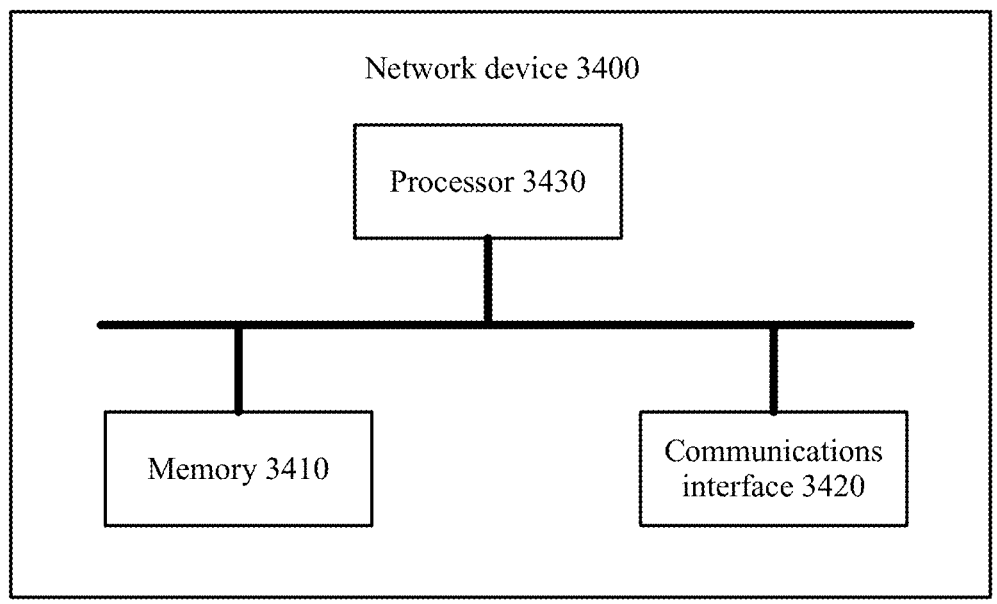
FIG. 34 is a schematic diagram of a network device according to another embodiment of this application.

FIG. 34 is a schematic block diagram of a network device 3400 according to an embodiment of this application. It should be understood that the network device 3400 can perform operations performed by the first network device in the methods in FIG. 1 to FIG. 19. To avoid repetition, details are not described herein again. The network device 3400 includes:

a memory 3410, configured to store a program;

a communications interface 3420, configured to communicate with another device; and a processor 3430, configured to execute the program in the memory 3410, where when the program is executed, the processor 3030 is configured to: receive, by using the communications interface 3420, modification requirement information for the network slice subnet instance from a second network device that manages a network slice instance, where the modification requirement information for the network slice subnet instance is used to indicate a service modification requirement for the network slice subnet instance, and the network slice instance includes the network slice subnet instance; and modify target configuration information of the network slice subnet instance based on the modification requirement information.

Figure 35:
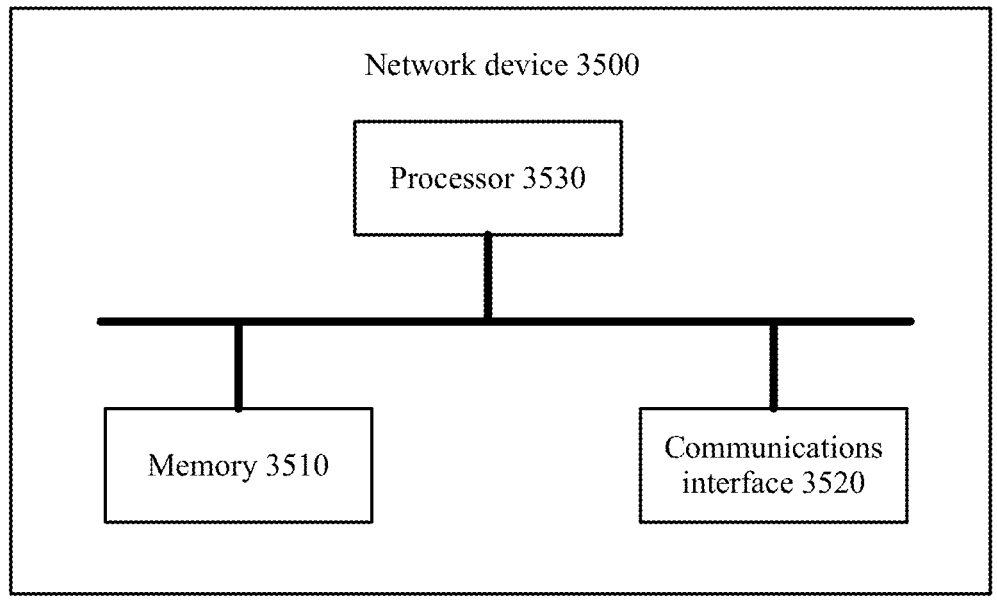
FIG. 35 is a schematic diagram of a network device according to another embodiment of this application.

FIG. 35 is a schematic block diagram of a network device 3500 according to an embodiment of this application. It should be understood that the network device 3500 can perform operations performed by the second network device in the methods in FIG. 1 to FIG. 19. To avoid repetition, details are not described herein again. The network device 3500 includes:

a memory 3510, configured to store a program;

a communications interface 3520, configured to communicate with another device; and a processor 3530, configured to execute the program in the memory 3510, where when the program is executed, the processor 3530 is configured to: determine modification requirement information for a network slice instance, where the modification requirement information for the network slice instance is used to indicate a modification requirement for the network slice instance, and the network slice instance includes the network slice subnet instance; and send, by using the communications interface 3520, modification requirement information for the network slice subnet instance to a first network device that manages the network slice subnet instance, so that the first network device modifies the network slice subnet instance, where the modification requirement information for the network slice subnet instance is used to indicate a modification requirement for the network slice subnet instance, and the modification requirement information for the network slice subnet instance is determined based on the modification requirement information for the network slice instance.

Figure 36:
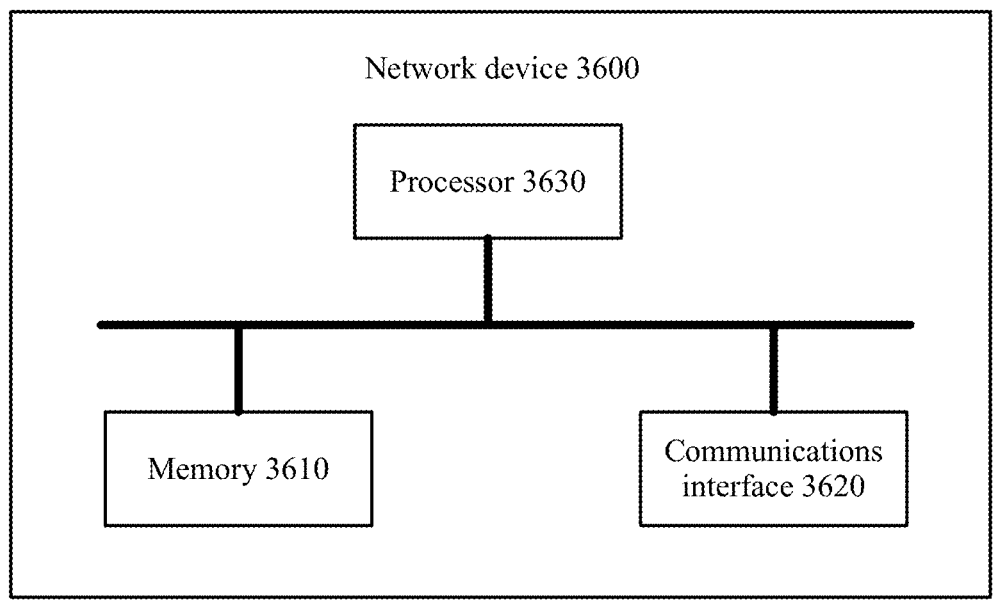
FIG. 36 is a schematic diagram of a network device according to another embodiment of this application.

FIG. 36 is a schematic block diagram of a network device 3600 according to an embodiment of this application. It should be understood that the network device 3600 can perform operations performed by the first network device in the methods in FIG. 1 to FIG. 19. To avoid repetition, details are not described herein again. The network device 3600 includes:

a memory 3610, configured to store a program;

a communications interface 3620, configured to communicate with another device; and a processor 3630, configured to execute the program in the memory 3610, where when the program is executed, the processor 3630 is configured to: receive, by using the communications interface 3620, status monitoring request information for the network slice subnet instance from a second network device that manages a network slice instance, where the status monitoring request information for the network slice subnet instance is used to instruct to measure and/or monitor performance of the network slice subnet instance, the network slice instance includes the network slice subnet instance, and the network slice subnet instance includes a network function and/or a nested network slice subnet instance; and send, by using the communications interface 3620, status monitoring request information for the network function and/or the nested network slice subnet instance to a third network device that manages the network function and/or the nested network slice subnet instance, where the status monitoring request information for the network function and/or the nested network slice subnet instance is used to instruct to measure and/or monitor performance of the network function and/or the nested network slice subnet instance.

Figure 37:
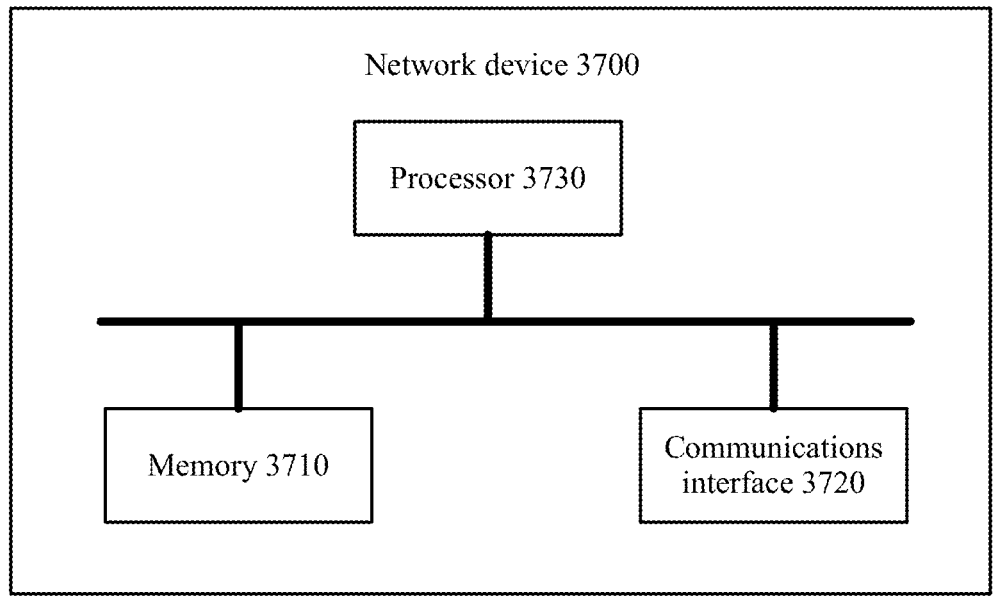
FIG. 37 is a schematic diagram of a network device according to another embodiment of this application.

FIG. 37 is a schematic block diagram of a network device 3700 according to an embodiment of this application. It should be understood that the network device 3700 can perform operations performed by the second network device in the methods in FIG. 1 to FIG. 19. To avoid repetition, details are not described herein again. The network device 3700 includes:

a memory 3710, configured to store a program;

a communications interface 3720, configured to communicate with another device; and a processor 3730, configured to execute the program in the memory 3710, where when the program is executed, the processor 3730 is configured to: receive performance subscription request information for a network slice instance by using the communications interface 3720, where the performance subscription request information for the network slice instance is used to request to obtain performance information of the network slice instance, and the network slice instance includes the network slice subnet instance; and send, by using the communications interface 3720, status monitoring request information for the network slice subnet instance to the first network device that manages the network slice subnet instance, where the status monitoring request information for the network slice subnet instance is used to instruct to measure and/or monitor performance of the network slice subnet instance, and the status monitoring request information for the network slice subnet instance is determined based on the performance subscription request information for the network slice instance.

Figure 38:
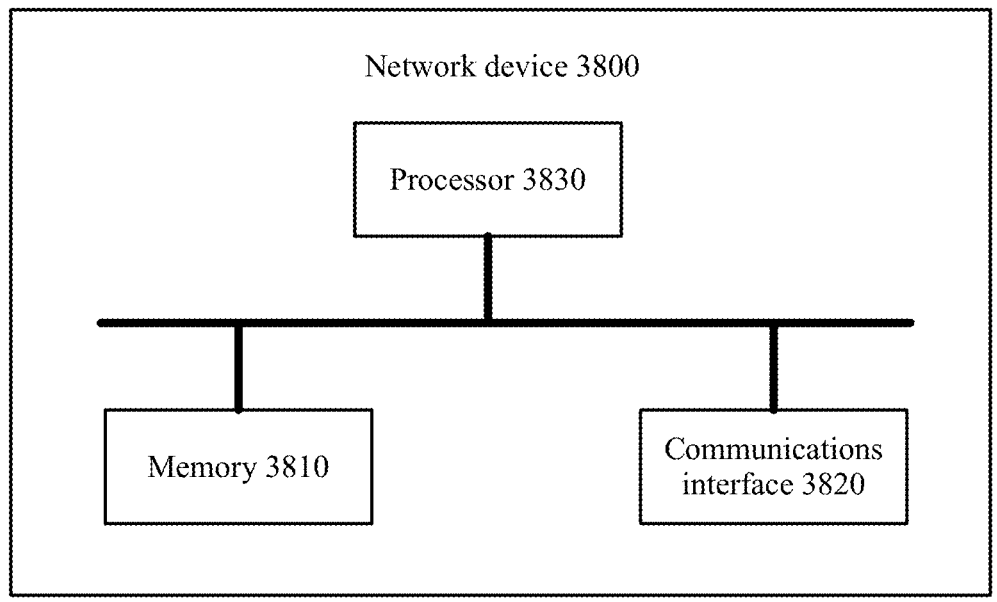
FIG. 38 is a schematic diagram of a network device according to another embodiment of this application.

FIG. 38 is a schematic block diagram of a network device 3800 according to an embodiment of this application. It should be understood that the network device 3800 can perform operations performed by the first network device in the methods in FIG. 1 to FIG. 19. To avoid repetition, details are not described herein again. The network device 3800 includes:

a memory 3810, configured to store a program;
a communications interface 3820, configured to communicate with another device; and
a processor 3030, configured to execute the program in the memory 3810, where when the program is executed, the processor 3830 is configured to: determine fault alarm information of a network function and/or a nested network slice subnet instance, where the fault alarm information of the network function and/or the nested network slice subnet instance is used to indicate that the network function and/or the nested network slice subnet instance that are/is included in the network slice subnet instance are/is faulty; and send, by using the communications interface 3820, fault alarm information of the network slice subnet instance to a second network device that manages the network slice instance, where the network slice instance includes the network slice subnet instance, and the fault alarm information of the network slice subnet instance is used to indicate that the network slice subnet instance is faulty.

Figure 39:
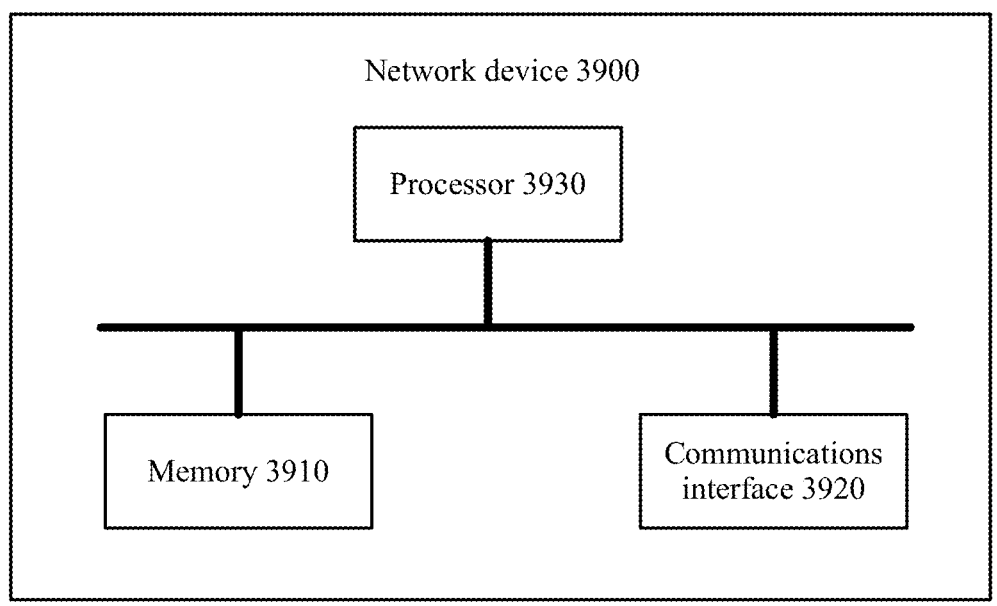
FIG. 39 is a schematic diagram of a network device according to another embodiment of this application.

FIG. 39 is a schematic block diagram of a network device 3900 according to an embodiment of this application. It should be understood that the network device 3900 can perform operations performed by the second network device in the methods in FIG. 1 to FIG. 19. To avoid repetition, details are not described herein again. The network device 3900 includes:

a memory 3910, configured to store a program;
a communications interface 3920, configured to communicate with another device; and
a processor 3930, configured to execute the program in the memory 3910, where when the program is executed, the processor 3930 is configured to: receive, by using the communications interface 3920, fault alarm information of a network slice subnet instance sent by a first network device that manages the network slice subnet instance, where the fault alarm information of the network slice subnet instance is used to indicate that the network slice subnet instance is faulty, and the network slice instance includes the network slice subnet instance; and send fault alarm information of the network slice instance to a fourth network device by using the communications interface 3920, where the fault alarm information of the network slice instance is used to indicate that the network slice instance is faulty.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in some embodiments. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A communication method, comprising:
receiving, by a first network device that manages a network slice subnet instance, requirement description information of the network slice subnet instance from a second network device that manages a network slice instance, wherein the requirement description information of the network slice subnet instance is used to indicate a service requirement for the network slice subnet instance, and the network slice instance comprises the network slice subnet instance;

creating or configuring, by the first network device, the network slice subnet instance based on configuration information of the network slice subnet instance, wherein the configuration information of the network slice subnet instance is determined based on the requirement description information of the network slice subnet instance;

receiving, by the first network device, modification requirement information for the network slice subnet instance from the second network device that manages a network slice instance;

modifying, by the first network device, the configuration information of the network slice subnet instance based on the modification requirement information; and sending, by the first network device to a third network device, requirement description information of a nested network slice subnet instance comprised in the network slice subnet instance, wherein the third network device is configured to manage the nested network slice subnet instance, and the requirement description information of the nested network slice subnet instance is generated based on the requirement description information of the network slice subnet instance.

2. The method according to claim 1, wherein the method further comprises:

sending, by the first network device, capability report information to the second network device, wherein the capability report information is used to indicate a capability of the network slice subnet instance supported by the first network device.

3. The method according to claim 2, wherein the capability report information comprises at least one of the following: a type of the network slice subnet instance supported by the first network device, a quantity of network slice subnet instances supported by the first network device, a capacity of the network slice subnet instance, a function supported by the network slice subnet instance, and performance of the network slice subnet instance.

4. The method according to claim 1, wherein the requirement description information of the network slice subnet instance comprises at least one of the following: a service type of the network slice subnet instance, a service performance requirement for the network slice subnet instance, a service coverage area of the network slice subnet instance, a serving time requirement for the network slice subnet instance, a service volume supported by the network slice subnet instance, a service management requirement for the network slice subnet instance, a service security level of the network slice subnet instance, and a service isolation requirement for the network slice subnet instance.

5. The method according to claim 1, further comprising creating the nested network slice subnet instance by:

sending, using a first network slice subnet management function, requirement description information of the nested network slice subnet instance to a second network slice subnet management function; or sending, using a first network slice management function, requirement description information of the nested network slice subnet instance to the second network slice subnet management function.

6. A communication method, comprising:

receiving, by a second network device that manages a network slice instance, requirement description information of the network slice instance, wherein the requirement description information of the network slice instance is used to indicate a service requirement for the network slice instance;

sending, by the second network device, requirement description information of the network slice subnet instance to a first network device that manages the network slice subnet instance, wherein the requirement description information of the network slice subnet instance is used to indicate a service requirement for the network slice subnet instance, so that the first network device creates or configures the network slice subnet instance, and the requirement description information of the network slice subnet instance is generated based on the requirement description information of the network slice instance;

receiving, by the first network device, modification requirement information for the network slice subnet instance from the second network device that manages a network slice instance;

modifying, by the first network device, configuration information of the network slice subnet instance based on the modification requirement information; and sending, by the second network device to a third network device, requirement description information of a nested network slice subnet instance comprised in the network slice subnet instance, wherein the third network device is configured to manage the nested network slice subnet instance, and the requirement description information of the nested network slice subnet instance is determined based on the requirement description information of the network slice subnet instance.

7. The method according to claim 6, wherein the method further comprises:

receiving, by the second network device, capability report information sent by the first network device, wherein the capability report information is used to indicate a capability of the network slice subnet instance supported by the first network device.

8. The method according to claim 7, wherein the capability report information comprises at least one of the following: a type of the network slice subnet instance supported by the first network device, a quantity of network slice subnet instances supported by the first network device, a capacity of the network slice subnet instance, a function supported by the network slice subnet instance, and performance of the network slice subnet instance.

9. The method according to claim 6, wherein the requirement description information of the network slice subnet instance comprises at least one of the following: a service type of the network slice subnet instance, a service performance requirement for the network slice subnet instance, a service coverage area of the network slice subnet instance, a serving time requirement for the network slice subnet instance, a service volume supported by the network slice subnet instance, a service management requirement for the network slice instance, a service security level of the network slice instance, and a service isolation requirement for the network slice instance.

10. The method according to claim 5, further comprising creating the nested network slice subnet instance by:

sending, using a first network slice subnet management function, requirement description information of the nested network slice subnet instance to a second network slice subnet management function; or sending, using a first network slice management function, requirement description information of the nested network slice subnet instance to the second network slice subnet management function.

11. A network device operating as a first network device, comprising:
- a communications interface;
- a memory, configured to store an instruction;
- a processor, separately connected to the memory and the communications interface, configured to execute the instruction stored in the memory, so as to execute the following operations when the instruction is executed:
- receive, by using the communications interface, requirement description information of the network slice subnet instance from a second network device that manages a network slice instance, wherein the requirement description information of the network slice subnet instance is used to indicate a service requirement for the network slice subnet instance, and the network slice instance comprises the network slice subnet instance;
- create or configure the network slice subnet instance based on configuration information of the network slice subnet instance, wherein the configuration information of the network slice subnet instance is determined based on the requirement description information of the network slice subnet instance;
- receive, by using the communications interface, modification requirement information for the network slice subnet instance from the second network device that manages a network slice instance;
- modify the configuration information of the network slice subnet instance based on the modification requirement information;
- send, to a third network device by using the communications interface, requirement description information of a nested network slice subnet instance comprised in the network slice subnet instance, wherein the third network device is configured to manage the nested network slice subnet instance, and the requirement description information of the nested network slice subnet instance is generated based on the requirement description information of the network slice subnet instance.

12. The network device according to claim 11, wherein the processor is further configured to send capability report information to the second network device by using the communications interface, wherein the capability report information is used to indicate a capability of the network slice subnet instance supported by the first network device.

13. The network device according to claim 12, wherein the capability report information comprises at least one of the following: a type of the network slice subnet instance supported by the first network device, a quantity of network slice subnet instances supported by the first network device, a capacity of the network slice subnet instance, a function supported by the network slice subnet instance, and performance of the network slice subnet instance.

14. The network device according to claim 11, wherein the requirement description information of the network slice subnet instance comprises at least one of the following: a service type of the network slice subnet instance, a service performance requirement for the network slice subnet instance, a service coverage area of the network slice subnet instance, a serving time requirement for the network slice subnet instance, a service volume supported by the network slice subnet instance, a service management requirement for the network slice subnet instance, a service security level of the network slice subnet instance, and a service isolation requirement for the network slice subnet instance.

15. The network device according to claim 11, wherein the processor is further configured to create the nested network slice subnet instance by:
- sending, using a first network slice subnet management function, requirement description information of the nested network slice subnet instance to a second network slice subnet management function; or
- sending, using a first network slice management function, requirement description information of the nested network slice subnet instance to the second network slice subnet management function.

* * * * *

UNITED STATES PATENT AND TRADEMARK OFFICE
CERTIFICATE OF CORRECTION

PATENT NO. : 11,140,037 B2
APPLICATION NO. : 16/663618
DATED : October 5, 2021
INVENTOR(S) : Wei Lu, Shuigen Yang and Wenqi Sun Page 1 of 1

It is certified that error appears in the above-identified patent and that said Letters Patent is hereby corrected as shown below:

In the Claims

In Claim 10, Column 62, Line 58, "The method according to claim 5," should be --The method according to claim 6,--.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*